(12) United States Patent
Davis

(10) Patent No.: US 9,262,383 B2
(45) Date of Patent: *Feb. 16, 2016

(54) SYSTEM, METHOD, AND COMPUTER PROGRAM PRODUCT FOR PROCESSING A MARKUP DOCUMENT

(71) Applicant: e-Numerate Solutions, Inc., Great Falls, VA (US)

(72) Inventor: Russell T Davis, Bethesda, MD (US)

(73) Assignee: e-Numerate Solutions, Inc., Great Falls, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,792

(22) Filed: May 28, 2015

(65) Prior Publication Data

US 2015/0261727 A1 Sep. 17, 2015

Related U.S. Application Data

(60) Continuation-in-part of application No. 12/222,751, filed on Aug. 15, 2008, which is a division of application No. 09/573,778, filed on May 18, 2000, now Pat. No. 7,421,648.

(60) Provisional application No. 60/183,152, filed on Feb. 17, 2000, provisional application No. 60/135,525, filed on May 21, 1999.

(51) Int. Cl.
*G06F 3/00* (2006.01)
*G06F 17/21* (2006.01)
(Continued)

(52) U.S. Cl.
CPC .......... *G06F 17/218* (2013.01); *G06F 17/2252* (2013.01); *G06F 17/30014* (2013.01); *G06F 17/30882* (2013.01)

(58) Field of Classification Search
CPC .............. G06F 17/218; G06F 17/2252; G06F 17/30014; G06F 17/30882
See application file for complete search history.

(56) References Cited

U.S. PATENT DOCUMENTS

| 4,674,043 A | 6/1987 | Hernandez et al. |
| 5,008,853 A | 4/1991 | Bly et al. |

(Continued)

FOREIGN PATENT DOCUMENTS

| WO | 0072197 A2 | 11/2000 |
| WO | 0161568 A2 | 8/2001 |

OTHER PUBLICATIONS

Non-Final Office Action from U.S. Appl. No. 11/819,125, dated Mar. 25, 2014.

(Continued)

*Primary Examiner* — Kyle Stork

(57) ABSTRACT

A system, method, and computer program product are provided for identifying a first markup document including first numerical values and first tags reflecting first characteristics of the first numerical values associated with a first unit of measure, and a second markup document including second numerical values and second tags reflecting second characteristics of the second numerical values associated with a second unit of measure. The first characteristics of the first numerical values associated with the first unit of measure are different from the second characteristics of the second numerical values associated with the second unit of measure. At least a portion of the numerical values of at least one of the first markup document or the second markup document are automatically transformed, so that the at least some of the first numerical values of the first markup document and at least some of the second numerical values of the second markup document have a common unit of measure. Further, at least a part of the first markup document and at least a part of the second markup document are processed, resulting in a single markup document, for display.

18 Claims, 40 Drawing Sheets

(51) Int. Cl.
*G06F 17/22* (2006.01)
*G06F 17/30* (2006.01)

(56) References Cited

U.S. PATENT DOCUMENTS

| | | | |
|---|---|---|---|
| 5,276,776 A | 1/1994 | Grady et al. |
| 5,339,392 A | 8/1994 | Risberg et al. |
| 5,371,675 A | 12/1994 | Greif et al. |
| 5,423,032 A | 6/1995 | Byrd et al. |
| 5,434,541 A | 7/1995 | Knoedl, Jr. |
| 5,461,708 A | 10/1995 | Kahn |
| 5,519,617 A | 5/1996 | Hughes et al. |
| 5,530,794 A | 6/1996 | Luebbert |
| 5,530,942 A | 6/1996 | Tzou et al. |
| 5,548,749 A * | 8/1996 | Kroenke et al. |
| 5,551,381 A | 9/1996 | Losel et al. |
| 5,581,685 A | 12/1996 | Sakurai |
| 5,581,686 A | 12/1996 | Koppolu et al. |
| 5,603,021 A | 2/1997 | Spencer et al. |
| 5,613,131 A | 3/1997 | Moss et al. |
| 5,701,400 A | 12/1997 | Amado |
| 5,706,502 A | 1/1998 | Foley et al. |
| 5,721,847 A | 2/1998 | Johnson |
| 5,737,592 A | 4/1998 | Nguyen et al. |
| 5,737,739 A | 4/1998 | Shirley et al. |
| 5,748,188 A | 5/1998 | Hu et al. |
| 5,754,939 A | 5/1998 | Herz et al. |
| 5,822,587 A | 10/1998 | McDonald et al. |
| 5,838,906 A | 11/1998 | Doyle et al. |
| 5,838,965 A | 11/1998 | Kavanagh et al. |
| 5,881,381 A | 3/1999 | Yamashita et al. |
| 5,893,109 A | 4/1999 | DeRose et al. |
| 5,894,311 A | 4/1999 | Jackson |
| 5,895,476 A | 4/1999 | Orr et al. |
| 5,907,820 A | 5/1999 | Pan |
| 5,911,145 A | 6/1999 | Arora et al. |
| 5,913,214 A | 6/1999 | Madnick et al. |
| 5,917,485 A | 6/1999 | Spellman et al. |
| 5,920,828 A | 7/1999 | Norris et al. |
| 5,948,113 A | 9/1999 | Johnson et al. |
| 5,950,196 A | 9/1999 | Pyreddy et al. |
| 5,953,724 A | 9/1999 | Lowry |
| 5,956,737 A | 9/1999 | King et al. |
| 5,974,413 A | 10/1999 | Beauregard et al. |
| 5,983,247 A | 11/1999 | Yamanaka et al. |
| 5,987,469 A | 11/1999 | Lewis et al. |
| 5,999,944 A | 12/1999 | Lipkin |
| 6,006,242 A | 12/1999 | Poole et al. |
| 6,009,436 A | 12/1999 | Motoyama et al. |
| 6,009,443 A * | 12/1999 | Kawamura ............... 715/246 |
| 6,014,643 A | 1/2000 | Minton |
| 6,014,661 A | 1/2000 | Ahlberg et al. |
| 6,026,388 A | 2/2000 | Liddy et al. |
| 6,026,397 A | 2/2000 | Sheppard |
| 6,034,676 A | 3/2000 | Egan et al. |
| 6,038,574 A | 3/2000 | Pitkow et al. |
| 6,052,710 A | 4/2000 | Saliba et al. |
| 6,058,385 A | 5/2000 | Koza et al. |
| 6,065,012 A | 5/2000 | Balsara et al. |
| 6,065,026 A | 5/2000 | Cornelia et al. |
| 6,075,530 A | 6/2000 | Lucas et al. |
| 6,092,036 A | 7/2000 | Hamann |
| 6,097,888 A | 8/2000 | Simonyi |
| 6,108,662 A | 8/2000 | Hoskins et al. |
| 6,112,242 A | 8/2000 | Jois et al. |
| 6,121,924 A | 9/2000 | Meek et al. |
| 6,125,391 A | 9/2000 | Meltzer et al. |
| 6,134,563 A | 10/2000 | Clancey et al. |
| 6,148,330 A | 11/2000 | Puri et al. |
| 6,160,549 A | 12/2000 | Touma et al. |
| 6,167,409 A | 12/2000 | DeRose et al. |
| 6,173,272 B1 | 1/2001 | Thomas et al. |
| 6,173,284 B1 | 1/2001 | Brown |
| 6,173,316 B1 | 1/2001 | De Boor et al. |
| 6,185,573 B1 | 2/2001 | Angelucci et al. |
| 6,185,816 B1 | 2/2001 | Freund et al. |
| 6,192,362 B1 | 2/2001 | Schneck et al. |
| 6,195,665 B1 | 2/2001 | Jarett |
| 6,195,676 B1 | 2/2001 | Spix et al. |
| 6,199,046 B1 * | 3/2001 | Heinzle et al. ............... 705/39 |
| 6,199,080 B1 | 3/2001 | Nielsen |
| 6,206,388 B1 | 3/2001 | Ouboter |
| 6,212,494 B1 | 4/2001 | Boguraev |
| 6,223,189 B1 | 4/2001 | Steffens et al. |
| 6,226,675 B1 | 5/2001 | Meltzer et al. |
| 6,240,407 B1 | 5/2001 | Chang et al. |
| 6,243,698 B1 | 6/2001 | Powers et al. |
| 6,249,291 B1 | 6/2001 | Popp et al. |
| 6,256,030 B1 | 7/2001 | Berry et al. |
| 6,266,670 B1 | 7/2001 | LaMarca et al. |
| 6,269,380 B1 | 7/2001 | Terry et al. |
| 6,276,991 B1 | 8/2001 | Kobayashi et al. |
| 6,278,991 B1 | 8/2001 | Ebert |
| 6,295,530 B1 | 9/2001 | Ritchie et al. |
| 6,308,179 B1 | 10/2001 | Petersen et al. |
| 6,314,424 B1 | 11/2001 | Kaczmarski et al. |
| 6,314,562 B1 | 11/2001 | Biggerstaff |
| 6,317,750 B1 | 11/2001 | Tortolani et al. |
| 6,317,783 B1 | 11/2001 | Freishtat et al. |
| 6,339,767 B1 | 1/2002 | Rivette et al. |
| 6,344,851 B1 | 2/2002 | Roberts et al. |
| 6,345,284 B1 | 2/2002 | Dinkelacker |
| 6,345,292 B1 | 2/2002 | Daugherty et al. |
| 6,349,307 B1 | 2/2002 | Chen |
| 6,351,755 B1 | 2/2002 | Najork et al. |
| 6,356,920 B1 | 3/2002 | Vandersluis |
| 6,356,961 B1 | 3/2002 | Oprescu-Surcobe |
| 6,366,915 B1 | 4/2002 | Rubert et al. |
| 6,370,537 B1 | 4/2002 | Gilbert et al. |
| 6,370,549 B1 | 4/2002 | Saxton |
| 6,373,504 B1 | 4/2002 | Nielsen |
| 6,374,274 B1 | 4/2002 | Myers et al. |
| 6,408,430 B2 | 6/2002 | Gunter et al. |
| 6,418,433 B1 | 7/2002 | Chakrabarti et al. |
| 6,421,656 B1 | 7/2002 | Cheng et al. |
| 6,421,822 B1 | 7/2002 | Pavela |
| 6,424,980 B1 | 7/2002 | Iizuka et al. |
| 6,434,541 B1 | 8/2002 | Tawel et al. |
| 6,446,048 B1 | 9/2002 | Wells et al. |
| 6,460,059 B1 | 10/2002 | Wisniewski |
| 6,470,349 B1 | 10/2002 | Heninger et al. |
| 6,484,149 B1 | 11/2002 | Jammes et al. |
| 6,493,717 B1 | 12/2002 | Junkin |
| 6,502,101 B1 | 12/2002 | Verprauskus et al. |
| 6,502,112 B1 | 12/2002 | Baisley |
| 6,505,246 B1 | 1/2003 | Land et al. |
| 6,507,856 B1 | 1/2003 | Chen et al. |
| 6,510,468 B1 * | 1/2003 | Hayne ............... 709/246 |
| 6,513,043 B1 | 1/2003 | Chan et al. |
| 6,519,617 B1 | 2/2003 | Wanderski et al. |
| 6,529,217 B1 | 3/2003 | Maguire, III et al. |
| 6,535,896 B2 | 3/2003 | Britton et al. |
| 6,542,912 B2 | 4/2003 | Meltzer et al. |
| 6,581,068 B1 | 6/2003 | Bensoussan et al. |
| 6,591,272 B1 | 7/2003 | Williams |
| 6,594,653 B2 | 7/2003 | Colby et al. |
| 6,615,258 B1 | 9/2003 | Barry et al. |
| 6,621,505 B1 | 9/2003 | Beauchamp et al. |
| 6,626,957 B1 | 9/2003 | Lippert et al. |
| 6,629,094 B1 | 9/2003 | Colby et al. |
| 6,629,135 B1 | 9/2003 | Ross, Jr. et al. |
| 6,631,357 B1 | 10/2003 | Perkowski |
| 6,631,402 B1 | 10/2003 | Devine et al. |
| 6,635,089 B1 | 10/2003 | Burkett et al. |
| 6,640,234 B1 | 10/2003 | Coffen et al. |
| 6,643,633 B2 | 11/2003 | Chau et al. |
| 6,667,747 B1 | 12/2003 | Spellman et al. |
| 6,714,201 B1 | 3/2004 | Grinstein et al. |
| 6,718,516 B1 | 4/2004 | Claussen et al. |
| 6,721,736 B1 | 4/2004 | Krug et al. |
| 6,745,384 B1 | 6/2004 | Biggerstaff |
| 6,772,139 B1 | 8/2004 | Smith, III |
| 6,789,252 B1 | 9/2004 | Burke et al. |
| 6,862,710 B1 | 3/2005 | Marchisio |

(56) References Cited

U.S. PATENT DOCUMENTS

| | | | |
|---|---|---|---|
| 6,876,930 | B2 | 4/2005 | Murray et al. |
| 6,886,005 | B2 | 4/2005 | Davis |
| 6,910,017 | B1 | 6/2005 | Woo et al. |
| 6,912,293 | B1 | 6/2005 | Korobkin |
| 6,920,608 | B1 | 7/2005 | Davis |
| 6,993,527 | B1 | 1/2006 | Raman et al. |
| 7,020,862 | B1 | 3/2006 | Alfke et al. |
| 7,020,882 | B1 | 3/2006 | Lewallen |
| 7,152,116 | B1 | 12/2006 | Austin et al. |
| 7,181,438 | B1 | 2/2007 | Szabo |
| 7,249,328 | B1 | 7/2007 | Davis |
| 7,340,534 | B2 | 3/2008 | Cameron et al. |
| 7,401,076 | B2 | 7/2008 | Davis |
| 7,421,648 | B1 | 9/2008 | Davis |
| 7,512,875 | B2 | 3/2009 | Davis |
| 7,565,397 | B2 | 7/2009 | Hodjat et al. |
| 7,650,355 | B1 | 1/2010 | Davis |
| 7,660,874 | B1 | 2/2010 | Meltzer et al. |
| 7,801,896 | B2 | 9/2010 | Szabo |
| 8,006,177 | B1 | 8/2011 | Meltzer et al. |
| 8,185,615 | B1 | 5/2012 | McDysan et al. |
| 8,185,815 | B1 | 5/2012 | Feira et al. |
| 8,185,816 | B2 | 5/2012 | Davis |
| 8,370,362 | B2 | 2/2013 | Szabo |
| 8,375,116 | B2 | 2/2013 | Meltzer et al. |
| 8,489,982 | B2 | 7/2013 | Davis |
| 8,959,196 | B2 | 2/2015 | Meltzer et al. |
| 2001/0013030 | A1 | 8/2001 | Colby et al. |
| 2001/0018687 | A1 | 8/2001 | Gonzalez et al. |
| 2001/0018694 | A1 | 8/2001 | Iwamoto et al. |
| 2001/0020237 | A1 | 9/2001 | Yarnall et al. |
| 2001/0049687 | A1 | 12/2001 | Russell |
| 2002/0007383 | A1 | 1/2002 | Yoden et al. |
| 2002/0023141 | A1 | 2/2002 | Yen et al. |
| 2002/0035501 | A1 | 3/2002 | Handel et al. |
| 2002/0052954 | A1 | 5/2002 | Polizzi et al. |
| 2002/0062451 | A1 | 5/2002 | Scheidt et al. |
| 2002/0073115 | A1 | 6/2002 | Davis |
| 2002/0091696 | A1 | 7/2002 | Craft et al. |
| 2002/0165872 | A1 | 11/2002 | Meltzer et al. |
| 2002/0168664 | A1 | 11/2002 | Murray et al. |
| 2002/0198985 | A1 | 12/2002 | Fraenkel et al. |
| 2003/0041077 | A1 | 2/2003 | Davis et al. |
| 2003/0078683 | A1 | 4/2003 | Hartman et al. |
| 2003/0078883 | A1 | 4/2003 | Stewart et al. |
| 2003/0140045 | A1 | 7/2003 | Heninger et al. |
| 2003/0167213 | A1 | 9/2003 | Jammes et al. |
| 2003/0217047 | A1 | 11/2003 | Marchisio |
| 2005/0005266 | A1 | 1/2005 | Datig |
| 2005/0086126 | A1 | 4/2005 | Patterson |
| 2005/0086216 | A1 | 4/2005 | Davis |
| 2005/0182709 | A1 | 8/2005 | Belcsak et al. |
| 2005/0187954 | A1 | 8/2005 | Raman et al. |
| 2005/0198042 | A1 | 9/2005 | Davis |
| 2006/0168335 | A1 | 7/2006 | Hodjat et al. |
| 2007/0156677 | A1 | 7/2007 | Szabo |
| 2007/0219933 | A1 | 9/2007 | Datig |
| 2008/0028340 | A1 | 1/2008 | Davis |
| 2008/0282139 | A1 | 11/2008 | Davis |
| 2009/0083613 | A1 | 3/2009 | Davis |
| 2009/0083619 | A1 | 3/2009 | Davis |
| 2009/0089657 | A1 | 4/2009 | Davis |
| 2010/0004874 | A1 | 1/2010 | Rzhetsky et al. |
| 2010/0100814 | A1 | 4/2010 | Meltzer et al. |
| 2010/0299239 | A1 | 11/2010 | May |
| 2010/0332414 | A1 | 12/2010 | Mead et al. |
| 2010/0332583 | A1 | 12/2010 | Szabo |
| 2013/0159845 | A1 | 6/2013 | Meltzer et al. |

OTHER PUBLICATIONS

Advisory Action from U.S. Appl. No. 11/819,125, dated Sep. 3, 2013.
Final Office Action from U.S. Appl. No. 11/819,125, dated Mar. 14, 2013.
Non-Final Office Action from U.S. Appl. No. 11/819,125, dated Sep. 28, 2012.
Advisory Action from U.S. Appl. No. 11/819,125, dated Aug. 2, 2011.
Final Office Action from U.S. Appl. No. 11/819,125, dated Apr. 12, 2011.
Final Office Action from U.S. Appl. No. 11/819,125, dated Dec. 14, 2010.
Non-Final Office Action from U.S. Appl. No. 11/819,125, dated Jul. 14, 2010.
Notice of Allowance from U.S. Appl. No. 10/980,266, dated Mar. 17, 2008.
Non-Final Office Action from U.S. Appl. No. 10/980,266, dated Sep. 12, 2007.
Final Office Action from U.S. Appl. No. 10/980,266, dated Mar. 19, 2007.
Non-Final Office Action from U.S. Appl. No. 10/980,266, dated Sep. 5, 2006.
Non-Final Office Action from U.S. Appl. No. 10/052,250, dated Oct. 2, 2014.
Final Office Action from U.S. Appl. No. 10/052,250, dated Feb. 20, 2014.
Non-Final Office Action from U.S. Appl. No. 10/052,250, dated May 22, 2013.
Decision on Appeal from U.S. Appl. No. 10/052,250, dated May 1, 2012.
Examiner's Answer from U.S. Appl. No. 10/052,250, dated Nov. 24, 2008.
Final Office Action from U.S. Appl. No. 10/052,250, dated Nov. 1, 2007.
Non-Final Office Action from U.S. Appl. No. 10/052,250, dated Jun. 11, 2007.
Final Office Action from U.S. Appl. No. 10/052,250, dated Nov. 2, 2006.
Non-Final Office Action from U.S. Appl. No. 10/052,250, dated May 18, 2006.
Advisory Action from U.S. Appl. No. 10/052,250, dated Dec. 19, 2005.
Final Office Action from U.S. Appl. No. 10/052,250, dated Aug. 23, 2005.
Non-Final Office Action from U.S. Appl. No. 10/052,250, dated Mar. 22, 2005.
Fulton, "Ten Minute Guide to Excel 97," Dec. 12, 1996; http://techbus.safaribooksonline.com/print?xmlid=0-7897-1020-X%2Fch17lev1sec1>.
Hoffman et al., XBRL Taxonomy Financial Reporting for Commercial and Industrial Companies, US GAAP, Jul. 31, 2000, pp. 1-12.
XBLR for Financial Statements Questions and Answers, Apr. 26, 2000, 6 pages.
Harding, W. E., "Finally, Business Talks the same Language," Aug. 2000, 5 pages.
Arnold, K. et al., "The Java Programming Language, Second Edition," The Java Series, 3rd Printing, Sep. 1998, pp. 466 pages.
Gosling, J. et al., "The Java Language Specification," The Java Series, First printing, Aug. 1996, 853 pages.
Harold, E. R., "XML: Extensible Markup Language," IDG Books Worldwide, Inc., 1998, 458 pages.
Bruce Hallberg et al., "Special Edition, Using Microsoft.RTM. Excell 97, Bestseller Edition, " Que.RTM. Corporation (1997).
Elliotte Rusty Harold, "XML .TM. Bible," IDG Books Worldwide, Inc., An International Data Group Company (1999).
David Megginson, "Structuring XML Documents," Prentice Hall PTR, Upper Saddle River, NJ (1998).
Copending U.S. Appl. No. 09/573,419 entitled "Tree View for Reusable Data Markup Language," filed May 18, 2000.
Copending U.S. Appl. No. 09/573,778 entitled "Reusable Data Markup Language," filed May 18, 2000.
Extensible Business Reporting Language (XBRL) 2.0 Specification, (Dec. 14, 2001), Editors: Luther Hampton, e-Numerate; David vun Kannon, KPMG LLP; pp. 1-42.
Information on Exchange Rates of Africa, Asia, and Australia, web site: http://eh.net/hmit/exchangerates/infoafr.htm, pp. 1-3, 2002 by EH.NET, downloaded Oct. 19, 2006.
Microsoft Press Computer Dictionary, Third Edition, Microsoft Press, p. 511 (1997) (3 pages).

(56) References Cited

OTHER PUBLICATIONS

Online Ohio CPA Newsletter, A Monthly Electronic Publication of the Ohio Society of Certified Public Accountants; Aug. 2000, vol. 1, No. 14 (7 pages).
Order of Magnitude (online Wikipedia article), http://en.wikipedia.org/wiki/Orders.sub.--of.sub.--magnitude>, 2006 Wikimedia Foundation, Inc. pp. 1-4, downloaded Oct. 19, 2006.
Tools [online], extensible Business Reporting Language, [retrieved on Aug. 13, 2002]. Retrieved from the Internet <URL: http://www.xbrl.org/Tools.htm> (5 pages).
XBRL Essentials, (A nontechnical introduction to the extensible Business Reporting Language, the digital language of business), Jan. 2001, Charles Hoffman, CPA; Carolyn Strand, PhD, CPA, (AICPA), pp. 1-17.
XBRL Home Page [online], extensible Business Reporting Language, [retrieved on Aug. 13, 2002]. Retrieved from the Internet <URL: http://www.xbrl.org> (3 pages).
XBRL Technical Specification [online], extensible Business Reporting Language, [retrieved on Aug. 13, 2002]. Retrieved from the Internet <URL: http://www.xbrl.org/TR/2001/default.htm> (1 page).
The XML Cover Pages, Extensible Business Reporting Language (XBRL), (1994-2002), Robin Cover, pp. 1-18.
Berkley et al., The Road to Better Business Information Making a Case for XBRL, Winter 2000, Microsoft, pp. 1-13.
Blattner, Special Edition Using Microsoft Excel (R), May 3, 1999 (C) Que Corporation "Adding a Secondary Axis to the Chart" (3 pages).
Gilster, Paul, Finding It on the Internet: The Internet Navigator's Guide to Search Tools & Techniques, 2.sup.nd edition (1996) (3 pages).
Hamscher et al., Extensible Business Reporting language (XBRL) Specification, Jul. 31, 2000, XBRL Organization, pp. 1-27.
Charles Hoffman and Carolyn Strand, "XBRL Essentials, A Nontechnical Introduction to eXtensible Business Reporting Language (XBRL), the Digital Language of Business Reporting," pp. 1-148 (2001).
Jon Rienstra, "Using Excel.RTM. in Chemistry," http://www.asa3.org/chemistry/computers.sub.--in.sub.--chemistry/excel.su- b.--tips.html (1995) (4 pages).
Simon St. Laurent, "Why XML?," http://www.simonstl.com/articles/whyxml.htm (1998) (5 pages).
Suzuki et al., "Managing the Software Design Documents With XML," ACM Proceedings of the 16th Annual International Conference on Computer Documentation, Sep. 1998, pp. 127-136.
Copending U.S. Appl. No. 11/819,125 entitled "Tree View for Reusable Data Markup Language," filed Jun. 25, 2007.
Copending U.S. Appl. No. 11/819,126 entitled "Reusable Data Markup Language," filed Jun. 25, 2007.
Information on Exchange Rates of Africa, Asia, and Australasia, web site: <http://eh.net/hmit/exchangerates/infoafr.htm>, pp. 1-3, 2002 by EH.NET, downloaded Oct. 19, 2006.
Bruce Halberg, "Special Edition, Using Microsoft.RTM. Excel 97, Bestseller Edition," Que.RTM. Corporation (1997).
Bederson, et al., "Pad++: A Zooming Graphical Interface for Exploring Alternate Interface Physics", UIST 94, Nov. 2-4, 1994, 10 pages.
Davis, "The Information System Consultant's Handbook: Systems Analysis and Design", Chapter 51, copyright 1999 by CRC Press LLC, 12 pages.
"ProQuest Information and Learning—0789717298—Special Edition Using Microsoft.RTM. Excel 2000." Jan. 23, 2008 http://proquest.safaribooksonline.com/0789717298, 3 pages.
Copending U.S. Appl. No. 09/573,780 entitled "Reusable Macro Markup Language", filed May 18, 2000.
Copending U.S. Appl. No. 11/819,126 entitled "Tree View for Reusable Date Markup Language", filed Jun. 25, 2007.
Rienstra, Jon, "Using Excel.RTM.in Chemistry" Oct. 1995, http://www.asa3.org/chemistry/computers_in_chemistry/excel_tips.html.
Microsoft Press Computer Dictionary, Third Edition, (C) 1997 Microsoft Press, p. 511.
St. Laurent, Simon, "Why XML?" (C) 1998 http://www.simonstl.com/articles/whyxml.htm.
Gilster, Paul, "Finding It on the Internet: The Internet Navigator's Guide to Search Tools & Techniques," 2.sup.nd edition (1996), 379 pages.
Halberg, Bruce, et al., "Special Edition, Using Microsoft.RTM. Excel 97, Bestseller Edition," Que.RTM. Corporation (1997).
Harold, Elliotte Rusty, "XML.TM. Bible," IDG Books Worldwide, Inc., An International Data Group Company (1999).
Megginson, David, "Structuring XML Documents," Prentice Hall PTR, Upper Saddle River, NJ (1998).
Glister, Paul, Finding It on the Internet: The Internet Navigator's Guide to Search Tools & Techniques, 2.sup.nd edition (1996), 379 pages.
U.S. Appl. No. 60/135,525, filed May 21, 1999.
U.S. Appl. No. 60/183,152, filed Feb. 17, 2000.
Notice of Allowance from U.S. Appl. No. 09/573,780, dated Oct. 29, 2009.
Non-Final Office Action from U.S. Appl. No. 09/573,780, dated Apr. 1, 2009.
Non-Final Office Action from U.S. Appl. No. 09/573,780, dated Sep. 25, 2008.
Final Office Action from U.S. Appl. No. 09/573,780, dated Feb. 7, 2008.
Non-Final Office Action from U.S. Appl. No. 09/573,780, dated Aug. 17, 2007.
Final Office Action from U.S. Appl. No. 09/573,780, dated Mar. 2, 2007.
Non-Final Office Action from U.S. Appl. No. 09/573,780, dated Sep. 21, 2006.
Final Office Action from U.S. Appl. No. 09/573,780, dated Jun. 13, 2006.
Non-Final Office Action from U.S. Appl. No. 09/573,780, dated Dec. 28, 2005.
Advisory Action from U.S. Appl. No. 09/573,780, dated Jul. 7, 2005.
Final Office Action from U.S. Appl. No. 09/573,780, dated Mar. 28, 2005.
Non-Final Office Action from U.S. Appl. No. 09/573,780, dated Apr. 23, 2004.
Notice of Allowance from U.S. Appl. No. 09/573,778, dated May 1, 2008.
Final Office Action from U.S. Appl. No. 09/573,778, dated Oct. 3, 2007.
Non-Final Office Action from U.S. Appl. No. 09/573,778, dated Apr. 13, 2007.
Final Office Action from U.S. Appl. No. 09/573,778, dated Oct. 24, 2006.
Non-Final Office Action from U.S. Appl. No. 09/573,778, dated May 31, 2006.
Non-Final Office Action from U.S. Appl. No. 09/573,778, dated Dec. 16, 2005.
Advisory Action from U.S. Appl. No. 09/573,778, dated Sep. 27, 2005.
Final Office Action from U.S. Appl. No. 09/573,778, dated Jun. 2, 2005.
Non-Final Office Action from U.S. Appl. No. 09/573,778, dated Jan. 5, 2005.
Restriction Requirement from U.S. Appl. No. 09/573,778, dated Sep. 16, 2004.
Final Office Action from U.S. Appl. No. 12/222,751, dated Mar. 31, 2014.
Advisory Action from U.S. Appl. No. 12/222,751, dated May 15, 2013.
Non-Final Office Action from U.S. Appl. No. 12/222,751, dated Jul. 11, 2013.
Final Office Action from U.S. Appl. No. 12/222,751, dated Jan. 7, 2013.
Non-Final Office Action from U.S. Appl. No. 12/222,751, dated May 29, 2012.
Final Office Action from U.S. Appl. No. 12/222,751, dated Jan. 25, 2012.
Non-Final Office Action from U.S. Appl. No. 12/222,751, dated Aug. 11, 2011.

(56) References Cited

OTHER PUBLICATIONS

Notice of Allowance from U.S. Appl. No. 12/222,750, dated Mar. 15, 2013.
Final Office Action from U.S. Appl. No. 12/222,750, dated Aug. 11, 2011.
Non-Final Office Action from U.S. Appl. No. 12/222,750, dated Feb. 14, 2011.
Notice of Allowance from U.S. Appl. No. 12/222,752, dated Feb. 2, 2012.
Non-Final Office Action from U.S. Appl. No. 12/222,752, dated Aug. 5, 2011.
Notice of Allowance from U.S. Appl. No. 09/573,413, dated Feb. 8, 2005.
Non-Final Office Action from U.S. Appl. No. 09/573,413, dated Aug. 27, 2004.
Notice of Allowance from U.S. Appl. No. 11/119,963, dated Dec. 15, 2008.
Non-Final Office Action from U.S. Appl. No. 11/119,963, dated Jun. 27, 2008.
Final Office Action from U.S. Appl. No. 11/119,963, dated Feb. 5, 2008.
Non-Final Office Action from U.S. Appl. No. 11/119,963, dated May 29, 2007.
Notice of Allowance from U.S. Appl. No. 09/573,419, dated Mar. 26, 2007.
Advisory Action from U.S. Appl. No. 09/573,419, dated Feb. 20, 2007.
Final Office Action from U.S. Appl. No. 09/573,419, dated Oct. 19, 2006.
Non-Final Office Action from U.S. Appl. No. 09/573,419, dated May 10, 2006.
Advisory Action from U.S. Appl. No. 09/573,419, dated Jan. 5, 2006.
Final Office Action from U.S. Appl. No. 09/573,419, dated Sep. 20, 2005.
Non-Final Office Action from U.S. Appl. No. 09/573,419, dated Apr. 7, 2005.
Advisory Action from U.S. Appl. No. 09/573,419, dated Jan. 26, 2005.
Final Office Action from U.S. Appl. No. 09/573,419, dated Oct. 26, 2004.
Non-Final Office Action from U.S. Appl. No. 09/573,419, dated Mar. 11, 2004.
Non-Final Office Action from U.S. Appl. No. 09/573,419, dated Oct. 8, 2003.
Restriction Requirement from U.S. Appl. No. 09/573,419, dated Jun. 18, 2003.
Final Office Action from U.S. Appl. No. 11/819,126, dated Mar. 24, 2014.
Final Office Action from U.S. Appl. No. 11/819,126, dated Oct. 21, 2013.
Non-Final Office Action from U.S. Appl. No. 11/819,126, dated Feb. 27, 2013.
Final Office Action from U.S. Appl. No. 11/819,126, dated Nov. 17, 2010.
Non-Final Office Action from U.S. Appl. No. 11/819,126, dated Jun. 9, 2010.
Final Office Action from U.S. Appl. No. 11/819,125, dated Oct. 22, 2014.
Final Office Action from U.S. Appl. No. 10/052,250, dated Jul. 21, 2015.

\* cited by examiner

FIG. 22A

| | A | B | C | D | E | F | G | H | I | J | K | L | M |
|---|---|---|---|---|---|---|---|---|---|---|---|---|---|
| | legend | 1927 | 1932 | 1934 | 1936 | 1938 | 1940 | 1942 | 1944 | 1946 | 1948 | 1950 | 1952 |
| 1 | Total general revenues by source | 7271 | 7267 | 7678 | 8395 | 9228 | 9609 | 10418 | 10908 | 12356 | 17250 | 20911 | 25181 |
| 2 | Property taxes | 4730 | 4487 | 4076 | 4093 | 4440 | 4430 | 4537 | 4604 | 4986 | 6126 | 7349 | 8652 |
| 3 | Sales and gross receipts taxes | 470 | 752 | 1008 | 1484 | 1794 | 1982 | 2351 | 2289 | 2986 | 4442 | 5154 | 6357 |
| 4 | Individual income taxes | 70 | 74 | 80 | 153 | 218 | 165 | 276 | 342 | 422 | 543 | 788 | 998 |
| 5 | Corporation net income taxes | 92 | 79 | 49 | 113 | 113 | 156 | 272 | 451 | 447 | 592 | 593 | 846 |
| 6 | Revenue from Federal Govern-me | 116 | 232 | 1016 | 948 | 800 | 945 | 858 | 954 | 855 | 1861 | 2486 | 2556 |
| 7 | All other[3] | 1793 | 1643 | 1449 | 1604 | 1811 | 1872 | 2123 | 2269 | 2661 | 3685 | 4541 | 5763 |
| 8 | Total general expenditures by fun | 7210 | 765 | 7181 | 7644 | 8757 | 9229 | 9190 | 8863 | 11028 | 17684 | 22787 | 26098 |
| 9 | Education | 2235 | 2311 | 1831 | 2177 | 2491 | 2638 | 2586 | 2793 | 3356 | 5379 | 7177 | 8318 |
| 10 | Highways | 1809 | 1741 | 1509 | 1425 | 1650 | 1573 | 1490 | 1200 | 1672 | 3036 | 3803 | 4650 |
| 11 | Public welfare | 151 | 444 | 889 | 827 | 1069 | 1156 | 1225 | 1133 | 1409 | 2099 | 2940 | 2788 |
| 12 | All other[4] | 3015 | 3269 | 2952 | 3215 | 3547 | 3862 | 3889 | 3737 | 4591 | 7170 | 8867 | 10342 |

SYSTEM, METHOD, AND COMPUTER PROGRAM PRODUCT FOR PROCESSING A MARKUP DOCUMENT

RELATED APPLICATIONS

This application is a continuation-in-part (for the purposes of providing a glossary in accordance with the Glossary Pilot Program) of application Ser. No. 12/222,751, filed Aug. 15, 2008 which, in turn, is a divisional of application Ser. No. 09/573,778, filed May 18, 2000, now U.S. Pat. No. 7,421,648, which, in turn, claims priority to Provisional U.S. Patent Application No. 60/135,525, filed on May 21, 1999, and Provisional U.S. Patent Application No. 60/183,152, filed on Feb. 17, 2000, which are all incorporated herein by reference.

The following identified U.S. patent applications are also relied upon and are incorporated by reference in this application.

U.S. patent application Ser. No. 09/573,780 (now U.S. Pat. No. 7,650,355) entitled "Reusable Macro Markup Language," filed on May 18, 2000.

U.S. patent application Ser. No. 09/573,419 (now U.S. Pat. No. 7,249,328), entitled "Tree View for Reusable Data Markup Language," filed on May 18, 2000.

U.S. patent application Ser. No. 09/573,413 (now U.S. Pat. No. 6,920,608), entitled "Chart View for Reusable Data Markup Language," filed on May 18, 2000.

FIELD OF THE INVENTION

The present invention relates generally to data processing systems and, more particularly, to a computer markup language for use in a data browser and manipulator.

SUMMARY

A system, method, and computer program product are provided for identifying a first markup document including first numerical values and first tags reflecting first characteristics of the first numerical values associated with a first unit of measure, and a second markup document including second numerical values and second tags reflecting second characteristics of the second numerical values associated with a second unit of measure. The first characteristics of the first numerical values associated with the first unit of measure are different from the second characteristics of the second numerical values associated with the second unit of measure. At least a portion of the numerical values of at least one of the first markup document or the second markup document are automatically transformed, so that the at least some of the first numerical values of the first markup document and at least some of the second numerical values of the second markup document have a common unit of measure. Further, at least a part of the first markup document and at least a part of the second markup document are processed, resulting in a single markup document, for display.

BRIEF DESCRIPTION OF THE DRAWINGS

FIGS. 22A-22D depicts exemplary screen shots of the tagging of spreadsheet information tagging to create a document in accordance with the present invention.

DETAILED DESCRIPTION

Glossary

HTML=HyperText Markup Language

Figure 1:
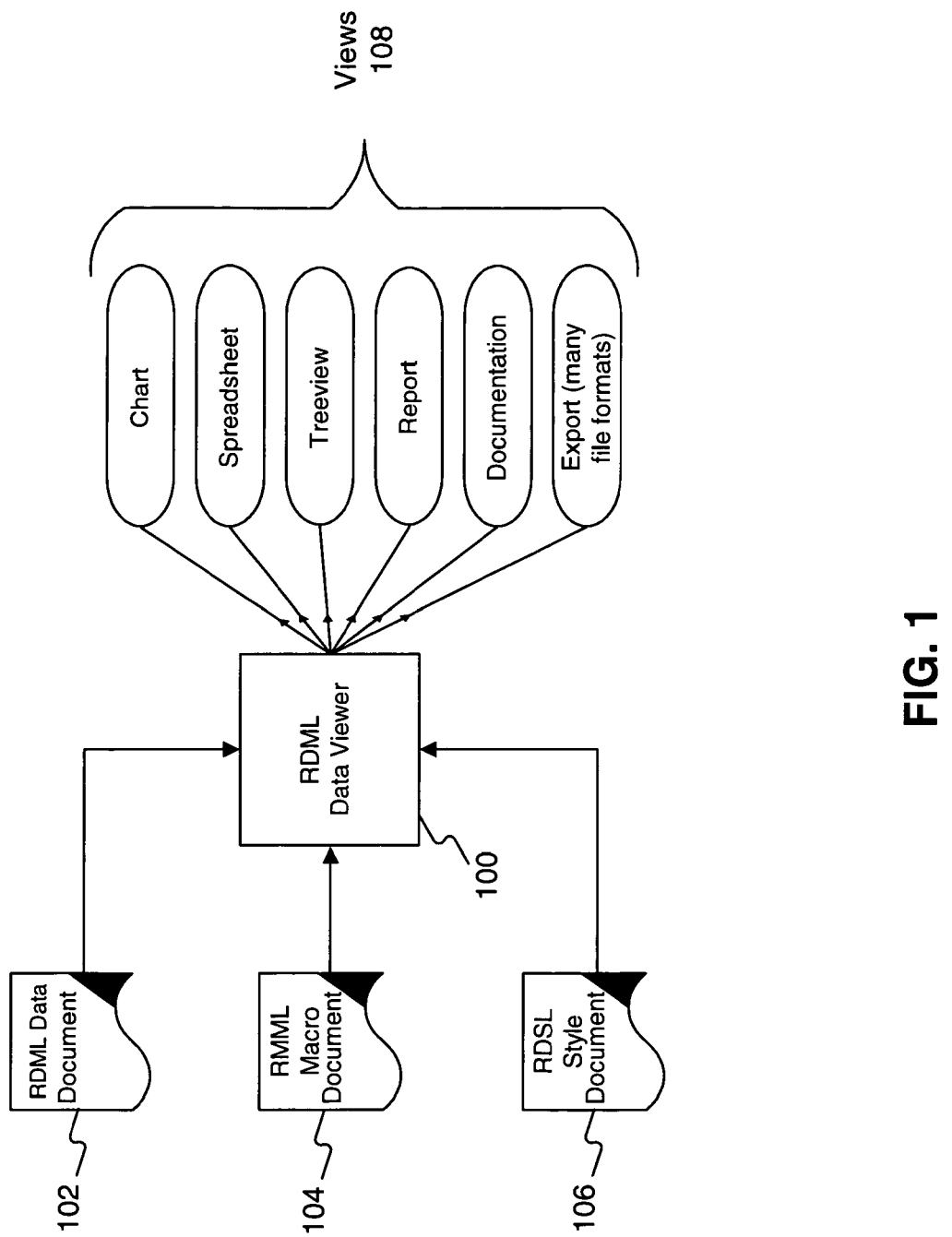
FIG. 1 depicts a high level diagram of a Reusable Data Markup Language (RDML) data viewer, its inputs and outputs in accordance with methods and systems consistent with the present invention.

Measurement=characteristics necessary to describe the measurement aspects of the domain the number is taken from Structure=structuring of the data in within a table
Tagging=adding metadata
RDML=Reusable Data Markup Language
XML=Extensible Markup Language Methods and systems in accordance with the present invention provide a markup language, referred to as Reusable Data Markup Language ("RDML"), that permits the browsing and manipulation of numbers and provide a related data viewer that acts as a combination Web browser and spreadsheet/analytic application that may automatically read numbers from multiple online sources and manipulate them without human intervention. Using the markup language, users may browse online sources using numerical-based queries, and the data viewer may automatically combine and manipulate multiple documents on a single display.

In accordance with an implementation consistent with the present invention, a method in a data processing system is provided that receives a first markup document and a second markup document, both the first markup document and the second markup document containing numerical values and tags reflecting characteristics of the numerical values. The method automatically combines the first markup document and the second markup document into a single data set and displays the single data set.

In accordance with another implementation, a method in a data processing system is provided that receives a document containing numerical values, and receives indications of characteristics of the numerical values, the characteristics including a unit and a magnitude. Further, it adds the received indications into the document as tags associated with the numerical values to create a markup document.

In accordance with yet another implementation, a method in a data processing system is provided that receives a markup document having a set of numerical values and tags indicating characteristics of the numerical values and determines a transformation for the set of numerical values to reflect new characteristics. The method then accesses a plurality of the tags of the set of numerical values, the plurality of the tags indicating magnitude, scale, modifier, units, measure, adjustment and aggregation. Furthermore, the method determines conversion factors for the magnitude, scale, modifier, units, measure, adjustment and aggregation tags to accomplish the transformation to the new characteristics and multiplies the set of numerical values by the determined conversion factors to transform the set of numerical values to reflect the new characteristics.

Methods and systems in accordance with the present invention provide a chart view that automatically manipulates and graphically displays numerical data. The manipulation and display is based on attributes associated with the numerical data describing characteristics of the numerical data. The chart view facilitates the simultaneous display of different series of numerical values of different types on a single chart and automatically displays appropriate descriptive textual components (e.g., axis labels, axis titles, chart titles, number precision, legends, footnotes, axis scales, etc.) The chart view allows single click transformations of series of numerical values and provides automatic formatting of descriptive textual components in response.

In accordance with an implementation of the present invention, a method in a data processing system having a display showing a chart is provided that receives a series of numerical values with tags indicating characteristics of the numerical values and displays the numerical values on the chart. Further, the method automatically determines a title for the numerical values based at least one of the tags and displays the determined title on the chart.

In accordance with another implementation of the present invention, a method in a data processing system having a display showing a chart is provided that receives a first series of numerical values having tags indicating characteristics of the numerical values and displays the first series of numerical values on the chart, the first series of numerical values corresponding to a first axis on the chart. The method further receives a second series to be added to the chart, the second series of numerical values having tags indicating characteristics of the second series of numerical values and automatically generates a second axis on the chart. Finally, the method displays the second series of numerical values on the chart corresponding to the second axis while the first series is displayed on the chart.

In accordance with yet another implementation of the present invention, a method in a data processing system having a display showing a chart is provided that receives an instruction to display a series of numerical values on the chart on the display, the numerical values having tags indicating characteristics of the numerical values, and displays the series of numerical values on the chart in response to the received instruction. The method then automatically formats the chart based on at least one of the tags in response to the received instruction.

In accordance with another implementation of the present invention, a data processing system is provided comprising a memory storing a charting application configured to manipulate and display numerical data, the memory having a selected series of numerical values having a tag indicating text information associated with the numerical values. The data processing system further comprises a display showing a chart having a legend that displays the text information associated with the selected series of numerical values. The legend word-wraps and scrolls the text information associated with the series of numerical data when the text information does not fit on the legend on the chart. The system further comprises a processor for running the charting application.

Methods and systems in accordance with the present invention provide a tree view that automatically manipulates and graphically displays numerical data. The tree view facilitates the simultaneous display of different series of numerical values of different types on a single display and automatically displays descriptive textual components. The tree view allows single click transformations of series of numerical values and provides automatic formatting of descriptive textual components in response. It further visually displays the relationship between series of numerical data for a user while supplying the user with hyperlinks associated with a given series of numerical data.

In accordance with an implementation of the present invention, a method in a data processing system is provided that receives a first and a second series of numerical values, and determines the relationship between the first and second series of numerical values. The method then displays an icon depicting the relationship between the first and second series of numerical values based on the determined relationship.

In accordance with another implementation of the present invention, a method in a data processing system is provided that receives a series of numerical values and a link associated with the series of numerical values, the link having a list of associated hyperlinks. The method displays the series of numerical values and the associated link, and receives an instruction to activate the link. Further, the method displays the list of hyperlinks associated with the link in response to the received instruction.

In accordance with yet another implementation of the present invention, a method in a data processing system having a display showing a chart is provided that receives a series of numerical values having associated metadata documentation. The method further receives an instruction to select the series of numbers and displays the series of numerical values on the chart while displaying the metadata documentation associated with the series of numerical values.

In accordance with another implementation of the present invention, a data processing system is provided that comprises a memory having a program for manipulating numerical values, and storing a first series of numerical values and a second series of numerical values. The data processing system further comprises a display that displays the first and second series of numerical values and a relationship icon depicting the relationship between the first series of numerical values and the second series of numerical values. Finally, the data processing system further comprises a processor for running the program.

Methods and systems in accordance with the present invention provide a markup language, referred to as Reusable Macro Markup Language ("RMML"), for producing and utilizing macros which are reusable numerical analysis routines which can be written quickly, cheaply, and in a form usable by a broad range of data documents in RDML, the platform upon which the macros are run.

RMML allows reusable spreadsheet type macros to be posted as web documents, to be, searched by search engines, to be combined into more complex programs, and to be reused with many data documents. RMML brings to spreadsheet manipulation routines the economic and productivity benefits of (1) standardization, (2) interchangeable parts, (3) specialization and assembly-line techniques in creation, and (4) economies of scale in creation and deployment. In addition, RMML brings to spreadsheet macros and numerical programming, some of the benefits of the World Wide Web: (1) widespread accessibility on demand, (2) ability to search for documents (in this case, search for capabilities and behavior of routines instead of text or data), and (3) the ability to hyperlink documents (including the ability of macros to call each other remotely).

In accordance with an implementation of the present invention, a data processing system method is provided that receives a macro defined to perform an operation on a series of numerical values and receives a series of numerical values having tags indicating characteristics of the numerical values. The method then performs an operation defined by the macro on the series of numerical values using the indicated characteristics.

In accordance with another implementation of the present invention, a data processing system method is provided that receives a macro defining an operation on a set of numerical values and receives a vector or matrix of numerical values. The method then performs an operation defined by the macro using the vector or matrix as a variable in the operation.

In accordance with yet another implementation of the present invention, a data processing system is provided that includes a memory containing a numerical analysis program having a macro defined to perform an operation on a series of numerical values, and a series of numerical values having tags indicating characteristics of the numerical values. It further comprises a processor for running the program such that the program performs an operation defined by the macro on the series of numerical values using the indicated characteristics, and a display for displaying results of the operation.

Because of the length of the detailed description, the following table of contents is provided.

| Topic | Section |
|---|---|
| Reusable Data Markup Language Overview | I |
| Reusable Macro Markup Language Overview | I.A |
| System Hardware Components | II |
| System Overview | III |
| System Details | IV |
| Internal Data Viewer Architecture | IV.A |
| Document Type Definition | IV.A.1 |
| Reader, Parser and Processor | IV.A.2 |
| X-value Transformer and Line Item Set Types | IV.A.3 |
| Primary Data Store | IV.A.4 |
| Chart View | IV.A.5 |
| Tree View | IV.A.6 |
| Spreadsheet View | IV.A.7 |
| Footnote View | IV.A.8 |
| Tagging Wizard | IV.A.9 |
| Aspects of RDML Documents | IV.A.IO |
| Graphical User Interface and HTML browser | IV.B |
| Reusable Macro Markup Language | IV.C |
| RMML Macro Package | IV.C1 |

I. RDML Overview

Methods and systems consistent with the present invention provide a markup language, referred to as Reusable Data Markup Language ("RDML"), and a data viewer referred to as the RDML data viewer that is used to retrieve, manipulate and view documents in the RDML format. Generally, RDML permits the browsing and manipulation of numbers, and allows the viewer to act as a combination Web browser and spreadsheet/analytic application that may automatically read numbers from multiple online sources, understand their meaning, and manipulate them without human intervention. The RDML data viewer may use the Internet to obtain requested sets of numbers like HTML does for text. Using RDML, it is possible to form a search on the Internet that is a true query of numbers. One such request is the creation of a list of quarterly revenues from 1996 to 1997 pertaining to companies with sales growth greater than 10 percent and no taxable income. After receiving any requested sets of numerical data, the data viewer may automatically transform and combine them even if they are in different formats (i.e., one in thousands of U.S. dollars and another in hundreds of French francs) on a single graphical display without requiring the user to make manual adjustments. The user may then make single-click adjustments to the display (e.g., adjust for inflation, currencies, time periods, number precision, etc.) to see different aspects of the received information. RDML generally facilitates numerical browsing by associating numbers with attributes describing the meaning of the numbers.

Although the preferred embodiment of RDML is a markup language that is a fully compliant implementation of XML version 1.0, other implementations are possible. XML is described in detail in "XML Bible," Elliotte Rusty Harold, IDG Books Worldwide, 1999, which is incorporated herein by reference. The RDML data viewer is a data browser, data manipulator, data viewer (in the form of charts, spreadsheets, etc.) and general user interface for data documents. It greatly extends the capabilities provided by current spreadsheet and database management programs. In addition to extended capabilities, it lowers costs to businesses by permitting efficient reuse of data, functions, and report formats.

The RDML data viewer works with RDML-formatted data documents, which are files that may be stored locally, over a network, including the Internet, or in any combination of sources. The structure of the RDML data files allows the RDML data viewer to act as a combination browser and analytic program, such as a spreadsheet, which can automatically read, interpret and manipulate numbers in its integrated analytic program. The RDML data viewer also provides a "macro" development and management scheme which allows users to create custom routines for the manipulation, transformation and display of RDML-formatted data. Macros and related aspects are described in greater detail below.

FIG. 1 depicts a high-level diagram of an RDML data viewer 100, its inputs and its outputs in accordance with methods and systems consistent with the present invention. Generally, data viewer 100 may be software that resides in the memory of a computer and accepts several types of input 102, 104 and 106, one of which is the RDML data document 102. The RDML data document 102 may be an ASCII text document formatted with RDML tags which are compliant with XML version 1.0. In one implementation consistent with the present invention, the tags of an RDML data document 102 are advantageously structured to include documentation of the data and arrange data in "line items," a collection of data values that is similar to a "record" or "row" in a relational database (discussed below). In RDML, the line item is generally the basic unit of calculation, as opposed to a single data value or cell as is typical with most conventional databases or spreadsheets. RDML documents 102 contain sets of line items, such sets being analogous to "tables" in relational databases, and documentation ("metadata") regarding the "line item sets." The RDML data document 102 is read by the RDML data viewer 100 which stores the data internally, making it available to a number of "views" 108, which present the data in different ways (charts, tables, etc.) to a user (not shown). The views 108 are also referred to as programs or applications, as they can be standalone software programs that receive their data from the RDML data viewer 100.

Analysis routines can be developed for data and placed in their own documents referred to as Reusable Macro Markup Language ("RMML") Macro Documents 104 which are another input to the data viewer 100 and are optional. These routines are reusable; they can be applied to virtually any data document meeting the requirements set forth in the RMML document 104. For example, an RMML document 104 may contain routines for converting RDML data to different currencies, and any data denominated in currency can use the RMML currency conversion macro. The preferred embodiment of RMML is also a fully compliant implementation of XML version 1.0, although other embodiments are possible.

Similarly, Reusable Data Style Language ("RDSL") style sheets 106, another optional input to the data viewer 100, can be applied to data documents to create specially-formatted output reports. A RDSL is a fully compliant implementation of Extensible Style Language ("XSL") which is described in detail in "XML Bible," Elliotte Rusty Harold, IDG Books Worldwide, 1999. These RDSL documents 106 are XSL-compliant style sheets which essentially act as report writers for RDML data documents 102. A typical use would be for data documents containing corporate financial statements. A single RDML data document 102 may contain a set of financial statements, but several different style sheets could be applied: one to show the data in annual columns, one to show it in a quarterly breakdown, one to show it in European format, and so forth. The RDML data viewer 100 automatically combines data documents 102 and style documents 106 to create reports.

RDML dramatically reduces the expense, time, and complexity of data manipulation by addressing the aforementioned problems of documentation of data, non-standardization of analytic routines, and low conceptual-level calculations of data. RDML addresses the problem of the separation of data and its documentation by encapsulating data and its documentation together in machine-readable form that can be used interactively. This differs from the approach of conventional relational databases in which data is kept in the computer and the documentation typically kept in a three-ring binder or other printed document. The separation of data and its documentation often ensures the need for high-priced database programmers every time the data must be accessed, used or transferred. Documentation in RDML also differs from that of spreadsheets, which tend to be personal in that the documentation is in the head and personal notes of the creator. Iii one implementation consistent with the present invention, RDML encapsulates machine-readable documentation with the data. The data and its documentation (metadata) are used together by the data viewer 100 to interpret what the numbers mean, how they are to be used, and how they are to be displayed. The small up-front investment in refining the raw data pays off in the lessened need for human labor to access and reuse the data in the future. RDML incorporates several important types of metadata: sources, contacts, license requirements, expirations and update information, data types, data classes, handling instructions (e.g., what to do with nulls, missing values, etc.), units and measurements, and other information needed to produce the various presentations.

Use of RDML addresses the problem of non-standardization by defining standards for both data characteristics and analytic routine interfaces. Standardization leads to component reuse, automation of production, and more rapid development of product enhancements. While the computer industry has developed standards for file formats and function-level interfaces, it has not developed general data format or content-analysis standards. For example, once data is input to an application (whether spreadsheet, database or other), the user may want to manipulate the data and see basic statistics for the different line items (sums, averages, % changes, variances, and so forth), adjustments for standard changes (adjustments for inflation, conformance to industry indexes, % of stock market averages, etc.), or standard ratios (debt/equity, price/earnings, etc.) Because there is neither a standard general data format, nor a standard analytic routine interface, users currently create each of these manipulation routines from primitive coding. In spreadsheets, they must input formulas and conversion factors number by number, and in databases, they must write SQL queries or other programming routines to manipulate the data.

RDML provides both the data standard and the function interface for manipulation routines. This means that a routine can be written to apply to any line item that meets the conditions it imposes, and these routines are reusable. Currently, conventional spreadsheet macros (one analogue to RDML macros 104) are typically only used in the spreadsheet for which they were designed. The macros cannot typically be used in another spreadsheet where the numbers may be in different cells or in different units. RDML macros 104 are not dependent on cell position, or human intervention to conform data: they can be directly used by others for other data sets. If a user writes a routine which, for instance, calculates and graphs a moving average of a time series, it can be used by any time series in any RDML document 102.

While solving documentation and standardization problems, use of RDML also addresses the problem of calculations occurring at too low a conceptual level by creating data "objects" at the line item and document levels, whereas conventional spreadsheets operate only at the cell (single number) level. For instance, calculations that may be common to a set of data, i.e., a line item, may operate more efficiently because they can be applied once, as opposed to being applied individually to many different single numbers or cells. Furthermore, analytic routines (macros) can be combined, applied successively, or used by inheritance to create new routines. The line item orientation dramatically reduces the number of formulas that need to be written (one per line instead of one per number). It also increases the readability of program code, because the user can review the logic at a higher level of abstraction.

In addition to solving these problems, RDML reduces costs, time, and complexity for operations on the side of the data consumer, the data publisher and the program developer. To utilize and manipulate data, typically, a user retrieving data over the Internet views a text version of the data, prints the data (in HTML, ASCII or PDF format), and then types the numbers into a spreadsheet or database program. The RDML data viewer 100 automates this process by making the data immediately available to other programs as interpretable data: the user does not need to retype it. Upon locating numerical sets of data from multiple online sources, the data viewer 100 automatically normalizes, collates, transforms, and formats the data.

Some conventional systems make data available for download as data in either a common spreadsheet format (such as Lotus or Excel), or in a comma-delimited or other common text format. This at least saves the user the necessity of retyping certain numbers, but creates a new problem of manipulating the data to get it into a more usable form (e.g., normalized, standardized).

As such, RDML (and its related data viewer) "normalizes" data for added efficiency. Normalizing data is primarily a matter of conforming key fields, including matching dissimilar fields, resolving conflicts in categories, resolving the handling of duplicates, etc. In order to be useful, data should be conformed to a format that can be read by an application (such as a graphing routine, or calculation routine). For example, the application may expect data aggregated by year, whereas the incoming data may be aggregated by month. The user must manipulate the input to make it conform to the form expected by the application. RDML performs these tasks automatically, using embedded documentation regarding the input data to make any necessary conforming changes to the input. In the time series example above, RDML would aggregate the monthly data into yearly data, using embedded documentation to determine whether the aggregation should be a sum, an average, etc.

Additionally, comparing data is a primary use of spreadsheets. Examples include comparing the financial statements of different companies, comparing the statistics from different states, and comparing different economic time series. When these data categories come from different sources, they are usually not directly compatible: the user must lay out the data items on a spreadsheet or similar program in a manner similar to assembling a jigsaw puzzle. As with normalization, RDML uses documentation embedded in the various input files to determine how different line items and values should be collated.

Once data is normalized and collated, the RDML data viewer 100 transforms the data automatically. Conventionally, users typically make a series of adjustments to the numbers in the data set. The input data may be, for example, denominated in "millions of dollars," while output is desired in "billions of yen." RDML provides a set of indicators for the most common transformations, permitting automatic machine translation of the numbers from their input state to the state desired by the user.

A conventional method of formatting data for output on a PC is to cut-and-paste the data to a formatting application (word processor, graph generator, spreadsheet or other), and then mark up the data to change the format to the desired output. This is time consuming and not repeatable—if the data is input again with a slight change, the whole formatting process must be repeated. The RDML data viewer 100 avoids the cut-and-paste approach by saving the original data in a central storage object (described below) in the data viewer 100 and applying separate formatting instructions to create different views 108. The user can switch among views 108 with a single mouse click and the program handles all format and numerical conversions for the user.

In some of the more advanced database management systems, a "report-writer" approach is used. Like the RDML data viewer 100, this approach applies a template to a centrally stored dataset. The problem is that the data sets are not standardized; a report writer template written for one dataset cannot typically be used for another. RDML, however, provides for reuse of style sheets in the same manner it provides reuse of data and macros.

In addition to the above-mentioned problems, RDML solves problems relating to "live" connections of numerical data involving multiple sources that typically require programming expertise. Whether the aim is to draw numbers from multiple sources over a wide area network (e.g., the Internet) or over a corporate LAN, incorporating remote data is complicated by many issues: connection protocols, programming language dependencies, data type inconsistencies, error handling, data transformations, etc. Programmers can surmount these problems at a certain expense, but not in a flexible way that permits reuse, and users again rely on custom programming. In response to the cost, time requirements, and inflexibility of the custom programming approaches, casual users resort to labor-based solutions. In a typical case, a financial spreadsheet is created with, for example, ten assumptions related to interest rates. Every time the spreadsheet is used, the creator looks the numbers up in the newspaper and types the results into the appropriate cells, and any necessary transformations are made by hand. RDML removes the need for custom programming and manual input by providing a way to include numbers from remote RDML documents 102 in normal formulas. The RDML data viewer 100 automatically looks to the specified address on the web to retrieve the numbers, makes any necessary transformations (for example, from yen to current dollars) and places the result in the correct formula. In this way, an RDML document 102 or macro 104 can draw on multiple documents at once. Because its documentation is machine-readable, it can be read by multiple systems, none of which need be aware of the physical layout or data types of the others.

Lastly, the use of RDML enables client-side processing using Internet-supplied data thereby realizing a number of advantages. After data is retrieved, analytic routines (macros) are performed on the client side, as opposed to the conventional approach in web-based data analysis, in which the analytic routines are performed on the server side. Whereas sensitive data and calculations can remain local in the RDML data viewer 100, the user need not fear that sensitive data is being misused by a company running a server, or that data is being misappropriated over the web. Additionally, it increases speed because updates to graphs, reports and spreadsheets can be near instantaneous because there is no need for the round-trip Internet transmission, or the loading and execution of a routine on a busy server. Users may also prefer local copies of data that they control and to which they have immediate access.

I.A. RMML Overview

Methods and systems in accordance with the present invention provide macros and RMML, which allow numerical analysis routines to be written quickly, cheaply, and in a form that is usable by a broad range of data documents in RDML. RMML macros provide reusable user-defined calculations for use in conjunction with RDML that automatically manipulate and display numerical data contained in RDML markup documents. RMML also allows spreadsheet type macros to be posted as web documents, to be searched by search engines, to be combined into more complex programs, and to be reused with many data documents.

For example, a user viewing a chart having a series of data in an RDML data viewer may apply, with one mouse click, a macro to that chart and see an instantaneous (or nearly instantaneous) transformation of the charted series of data. Not only is the data changed, but the titles, legends, footnotes, axis scales and other properties are also changed. As a further example, a user may be looking at a time series trend of automobile sales in millions of dollars. By clicking on a macro entitled "% change", the chart recalculates itself according the percentage change from period to period. The y-axis title changes from "$ millions" to "% annual change", etc. Table manipulation macros may perform such functions as combining two tables into one, sorting a table, searching for certain line items and other database-like tasks. Other transformation macros may perform other functions such as word translation, data format translation, and report-writing.

RMML macros are highly reusable because they are made available in a cross-platform, text-based, searchable, XML-compliant format. Because the macros are portable, they have much greater marketability. RMML also builds into its language tags for many types of documentation so that a macro may be reused and understood by the original macro writer as well as other users.

Conventional spreadsheet programs typically base references on physical locations, a problem RMML avoids by referring to numbers by their position in a chart or formula, or by tag names, thus allowing the numbers themselves to be anywhere in a document. RMML macros also use the measurement and the meaning of numbers because RDML-tags contain standard vocabularies to identify the measure, magnitude, scale, unit, precision, class, etc. of the numbers, and the RMML interpreter handles differences for the user.

Additionally, RMML builds error handling into its interpreter and makes available automated testing tools to help increase the quality of the code. Users may also graphically change parameters for the macros using check boxes, slider bars, input boxes, and selection lists, and RMML makes it easy for the author of a macro to add those visual components.

Below is a detailed description of RDML, the platform upon which RMML macros run, followed by a detailed description of RMML.

II. System Hardware Components

Figure 2:
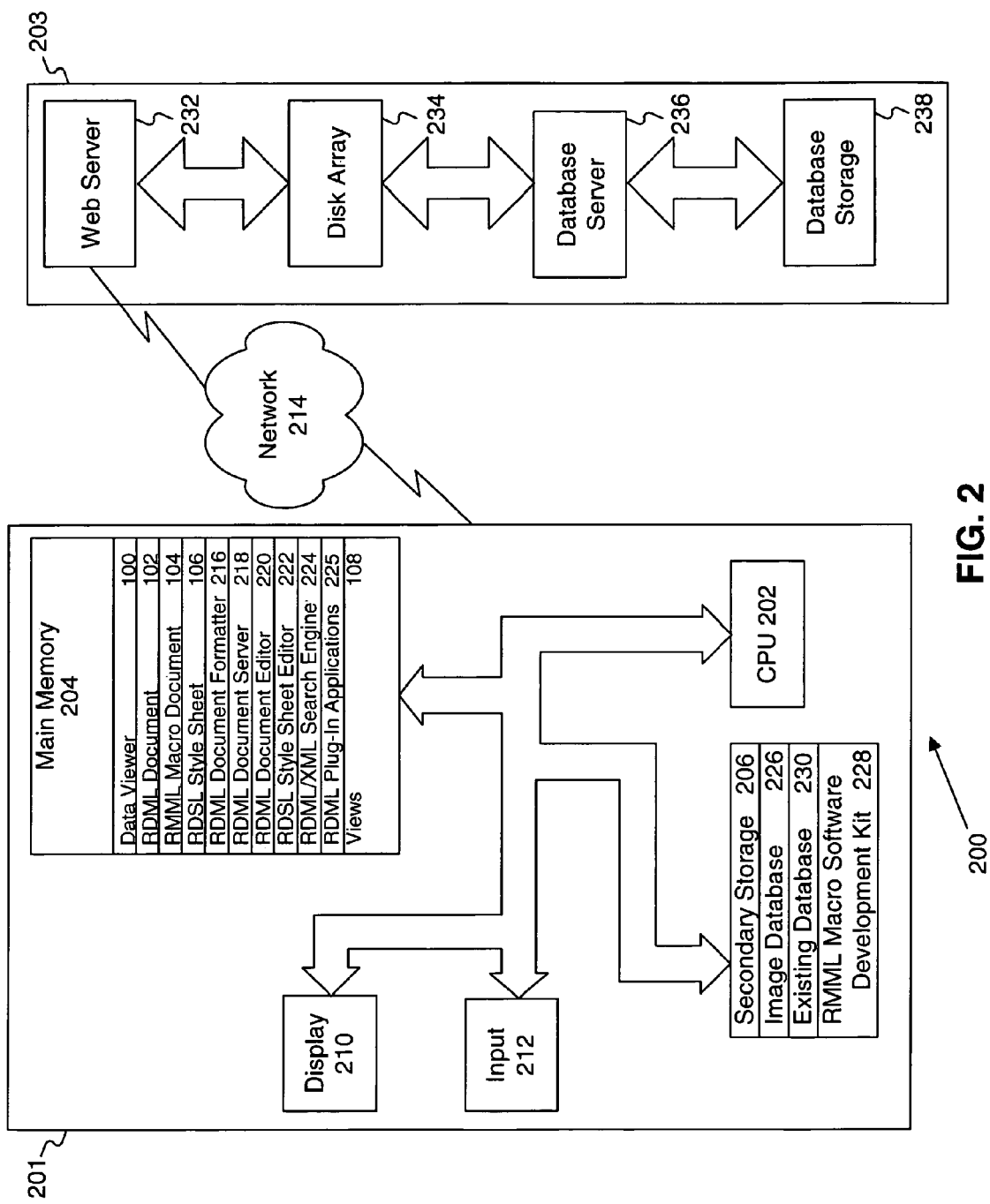
FIG. 2 depicts a data processing system suitable for use with methods and systems consistent with the present invention.

FIG. 2 depicts a data processing system 200 that is suitable for use with methods and systems consistent with the present invention. Data processing system 200 comprises a computer 201 and a server computer 203 interconnected via a network 214, such as the Internet, where the server computer 203 may provide RDML documents 102 to computer 201. Computer 201 includes a central processing unit (CPU) 202, a main memory 204, a secondary storage device 206, a display 210 and an input device 212.

The main memory 204 may include the RDML data viewer 100 which may be a personal computer-based program, although one skilled in the art will appreciated that the data viewer may reside elsewhere. In addition to the data viewer 100 which includes views 108 for display, the main memory 204 includes related software components that may be used to input RDML documents 102, macro documents 104, and style sheets 106 to the data viewer. It may include the RDML document formatter 216 which a user uses to apply tags to numerical data, and/or an RDML document server 218 which provides RDML documents 102 to the data viewer 100. The main memory 204 may also comprise an RDML document editor 220 used to edit the files of RDML documents 102 and RDSL style sheet editor 222 for creating style sheets 106. The RDML/XML search engine 224, which searches RDML documents in response to queries, may also reside in memory 204 along with any additional plug-in applications 225. Each of these components and their interactions are described below in greater detail.

The memory 204 may include various software components of the data viewer 100 and related components which may be programmed in object-oriented languages such as the Java™ programming language. The Java™ programming language is described in further detail in "The Java Programming Language," $2^{nd}$ Ed., Ken Arnold, James Gosling, Addison-Wesley, 1998, which is incorporated herein by reference. For further description of the Java Language, reference should be made to "The Java Language Specification," James Gosling, Bill Joy, Guy Steele, Addison-Wesley, 1996 which is also incorporated herein by reference. However, one skilled in the art will appreciate that other programming languages may be used. The RDML data viewer 100 may download RDML data documents 102 from many different sources such as a local storage disk or from a server over network 214.

The secondary storage 206 may include the RDML image database 226 which stores documentation tag data regarding RDML document 102, and the RMML macro software development kit 228 for developing macros. The secondary storage may also store existing databases 230 for holding original data from which RDML documents 102 are created. These components may also be stored in main memory or on another remote computer and are also described in greater detail below.

FIG. 2 also depicts a web server 232 on computer 203 that interacts with the computer 201 via network 214. In one system consistent with the present invention, the web server 232 sends RDML documents 102 over the network 214 and may be connected to a disk array 234 which holds RDML data documents 102. This disk array 234 may receive data documents 102 from the database server 236 which may receive data from database storage 238. Protocols used in the transmission of information between the server 232 and the computer 201 include, but are not limited to, HTTP and FTP.

One skilled in the art will appreciate that aspects of methods and systems consistent with the present invention may be stored on or read from other computer readable media besides memory like secondary devices, such as hard disks, floppy disks, and CD ROM, or a carrier wave from a network (such as the Internet). Additionally, one skilled in the art will also appreciate that the data processing system may contain additional or different components.

III. System Overview

Figure 3:
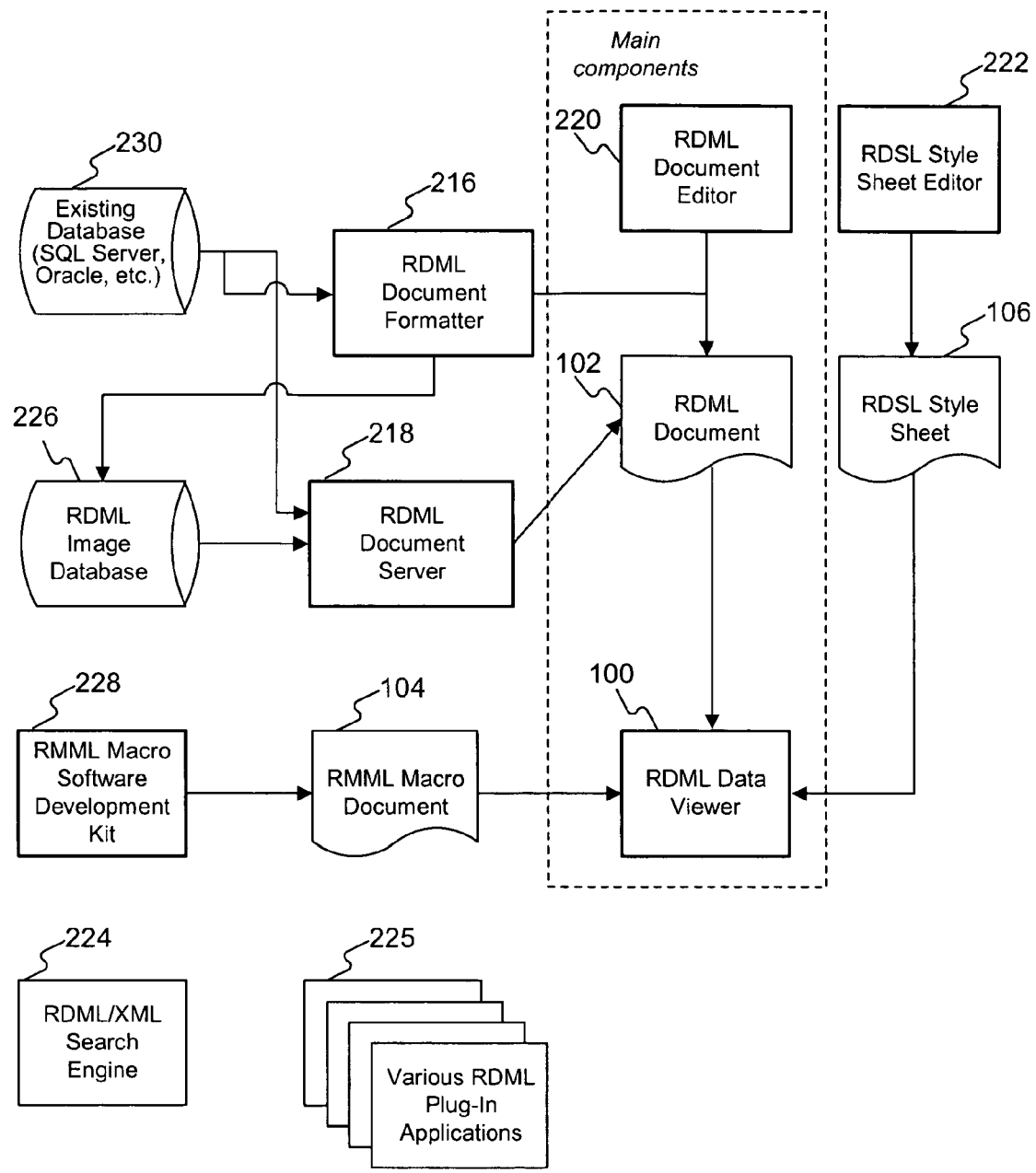
FIG. 3 depicts a diagram of the interrelation of various RDML software and hardware components shown in FIG. 2.

FIG. 3 illustrates an RDML system consistent with the present invention and the relationships between the various components. These various components may reside in a memory 204 on a computer such as computer 201. Existing databases 230 store data that can be used to create RDML documents 102, and generally the data is extracted into either a "flat file" format (e.g., comma-delimited, or fixed-width fields) or a form readable by Java Database Connectivity ("JDBC"). RDML documents 102 may be structured to model flat files so that a single RDML document 102 encapsulates a set of rows and columns. Examples of databases include SQL server by Microsoft and Oracle 8 server.

The RDML document formatter 216 is a graphical tool used by the user to reduce the amount of manual labor required to combine data and its documentation. The contents of an existing database 230 may not be enough to create an RDML document 102, because in one system consistent with the present invention, RDML uses documentation of the contents. Such documentation often may be found in a printed volume and hence must be manually input and manually combined with the data. The RDML formatter 216 allows a user (or data publisher) to map data fields from a relational database, flat file, spreadsheet file or text document to RDML data documents 102. It also allows a data publisher to add documentation to the data file (RDML data document 102) itself.

The RDML image database 226 is a relatively small database maintained by the RDML formatter 216 to hold information necessary to recreate an RDML document 102 should the underlying data change. It eliminates the need for the user to manually input the documentation again because the RDML image database 226 stores it.

An RDML document server 218 functions when RDML documents 102 are being created dynamically. The server 218 queries the existing database 230 for the desired line items, queries the image database 226 for documentation items and instructions for constructing the RDML document 102, and finally creates a valid, well-formed RDML document.

The RDML document editor 220 allows users to edit RDML documents 102 which typically are ASCII text files (which may contain UNICODE data). As such, they may be edited by any text-oriented editor or word processor. This is, however, a time-consuming and error-prone approach to marking up an RDML (or any XML) file. A specialized RDML document editor 220 allows a user to quickly make changes, check for errors, and view information on the data and metadata. The document editor 220 may operate over the Internet: users possessing the correct permissions to modify a file can make updates or changes to the underlying RDML data document 102 by issuing commands from the RDML data viewer 100.

An RDML document 102 may be an ASCII/UNICODE text file used to transmit data and metadata to the RDML Data Viewer 100. It can be stored locally, or can be transmitted over network 214 such as a corporate LAN or the Internet (using HTTP, FTP, email, etc.). To be a valid RDML document 102, the file conforms to the RDML Document Type Definition ("DTD") which is described in detail below. The DTD describes required and optional data elements, their ordering, syntax, and the controlled vocabulary for use in certain data elements. DTDs in general are also described in "XML: Extensible Markup Language," Elliotte Rusty Harold, IDG Books Worldwide, 1998.

The RDML data viewer 100 functions as a combination RDML and HTML browser, object-oriented spreadsheet, report-writer, and application platform. The browser functions read HTML or RDML documents 102; HTML documents are rendered immediately in a browser window, while RDML documents are first cached in an internal data object (conforming to the DOM—"Document Object Model"—standard discussed below) and then rendered in views 108 selected by the user. The default view is typically a chart and a tree listing, although several other default views are available. The RDML data viewer 100 uses the cached RDML data objects to create views 108, employing a variety of transformation and manipulation objects to get the data to match either the form expected by the view, or to match the form of other data objects with which it is being combined.

The RDML Macro Software Development Kit ("SDK") 228 allows a function designer to create functions that can be applied generally to any data document that contains the types of data necessary for the function. The SDK is a collection of macro-writing tools, including an IDE ("Integrated Development Environment"), an editor, an object browser, and a validation tester.

RDML generally separates the form of data from general calculation routines that operate on that data. By separating format from functions, both the data and the functions can be made reusable. In conventional spreadsheets, for example, numbers can be placed in arbitrary cells selected by the creator. If a second developer decides to create an analytic function, that developer must know what row and column each number is in. That routine will then not work with another spreadsheet unless the exact same row and column structure is followed.

Applying functions generally creates one form of software reuse: users need not tell the function where their data is (the approach of "wizards" in traditional spreadsheets). A second form of reuse is that gained by inheritance: function developers can choose the existing function that most closely matches what they are trying to do, and simply make the necessary edits to create the desired new function. The SDK 228 permits a third type of reuse in the ability to attach to remote data documents and remote macros on the web to take advantage of these extra resources and to provide real-time updating of data and functions.

RMML macro documents 104 are text documents that contain routines just as RDML data is contained in a text document. This document contains the heart of the calculation: the specification of operations on numbers, such as a formula, an ordered list of other macros to perform, or list of instructions.

RDSL style sheets 106 act as templates for output reports. The RDML data object (discussed below) in the RDML data viewer 100 can be placed into a report using one or more different style sheets. RDSL, a fully compliant implementation of XSL, allows a data publisher to provide multiple report formats for its data. They are reusable in that a style sheet written for one RDML data document 102 can be used for another if the specified restrictions are met. For example, a style sheet for a time-series data set can be used for another time series data set. The style sheet editor 222 is basically a report-writer because the user can graphically compose a report from a sample document, specify the types of RDML data documents 102 that this report can apply to, automatically create a style sheet 106 when the result is acceptable, and then use the resulting style sheet to create a report from any qualifying RDML data document 102.

The RDML search engine 224 searches RDML documents 102 similarly to the way HTML search engines search HTML documents. HTML search engines pick up key words, but can only tell a user that a particular document contains the requested word(s). They cannot, however, provide query services. For example, a user may wish to search the Internet for "all financial statements of computer services companies which have revenue growth >10%," and the RDML search engine 224 provides this capacity. The RDML Search Engine 224, however, does not index only keywords like the HTML approach, but also the element names and key attributes. This permits searching for numerical values, or posing complex queries regarding the content and/or context of the data. The RDML search engine 224 thus acts as a generalized query processor for RDML data document 102, RMML macros 104, and RDSL stylesheets 106. Some aspects of the search engine 224 are described in greater detail in co-pending U.S. Provisional Patent Application Ser. No. 60/183,152, filed on Feb. 17, 2000.

As mentioned earlier, each view 108 in the RDML data viewer 100 is essentially a separate application denoted on FIG. 3 as various RDML Plug-in applications 225. The chart view, for example, is a separate charting application that has been "plugged in" to the RDML data viewer's basic infrastructure of Internet browser, XML parser/processor, RDML transformation and manipulation objects, internal object management architecture, interfaces to other applications, and graphical user interface (described below). For example, a mapping component can be plugged into the panel in which the chart is seen. Subsequently, when a user clicks on a line item, the colors of the different countries or states will change to show a thematic map, or different dots will appear, etc. The RDML data viewer 100 may be designed in modular fashion to permit changing or adding component applications to leverage off the common components.

IV. System Details

With further reference to FIG. 3, several of the components (excluding RMML and RDSL components) are described in greater detail below. The existing databases 230 may be relational databases, object-oriented databases, or any other type of database. RDML tags in RDML documents 102 add documentation to the types of pure data found in relational databases. Since the data that already exists in relational databases can be used to create RDML documents 102, the data may be made available to either the RDML formatter 216 or the RDML server 218 and be in a flat file format (rows and columns).

For connections, both the RDML formatter 216 and the RDML server 218 read Open Database Connectivity ("ODBC") and JDBC database sources. The flat file aspect is based on the idea that RDML documents 102 effectively model a basic row and column matrix. To produce an RDML document 102, therefore, the original data source may provide a single table, or create one with a query. Relational linking is possible with RDML documents 102, through a server to a relational database, or indirectly through hyperlinks to other RDML documents or hyperlinks to RDML document servers 218. This is similar to many database applications: data is collected from various underlying tables to create a single table or screen to show the user. The data table to be used as a source for an RDML document 102 may be oriented to have the fields be one of three basic exemplary RDML data table types: time series, category, or X-Y plot described below.

With reference to the RDML formatter 216, once there is a flat file data table of data points in the existing database 230, an RDML document 102 can be created by adding tags that contain documentation regarding the data table. The information contained in these tags are maintained in a separate data table from the original data points. The RDML formatter 216 is an application that assists a user in selecting the proper documentation tags, saves the tags in a separate database (the RDML image database 226), and creates the actual RDML document 102.

Figure 4:
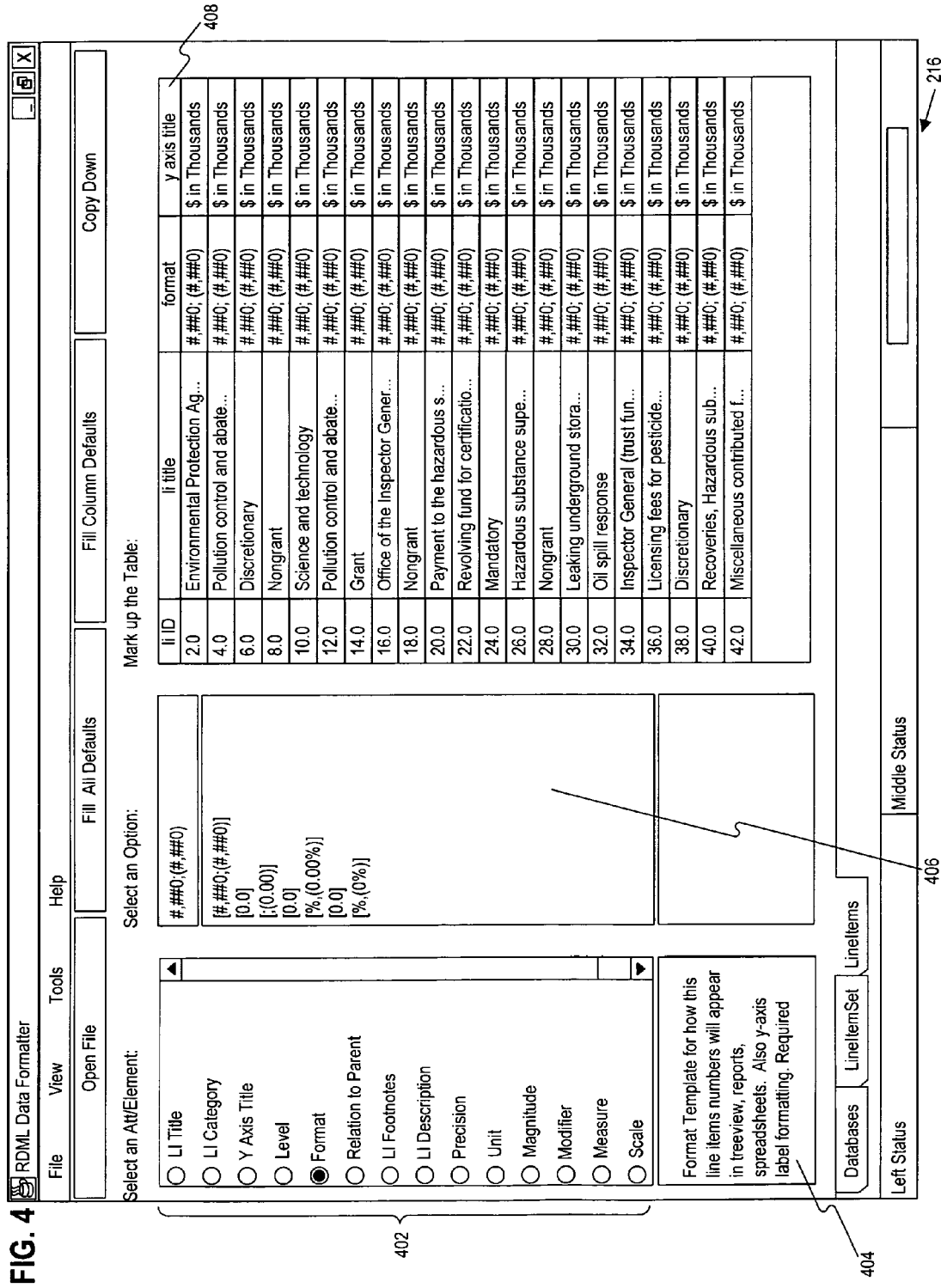
FIG. 4 depicts the use of an RDML formatter shown on FIGS. 2 and 3 to add markup tags to data.

FIG. 4 is a screen shot that shows how the RDML formatter 216 assists the user in "tagging" data, i.e., adding metadata that applies to the line items. In one implementation consistent with the present invention, for each line item of data, there are at least 18 different potential attributes (described in detail below) applied using the radio buttons 402. When a user selects a radio button 402, the formatter 216 supplies a description 404 of the selected attribute. Upon selection of a radio button 402 from the left-most box, the user is presented with a list of the possible values in the middle option box 406. The user may either double click one of the options to add it as an attribute of the selected line item, or type in a new value in the text box at the top of the middle option box 406. The formatter 216 automatically updates the line item table 408 which, in this instance, displays the line items' ID, title, format and Y-axis title (attributes which are discussed below).

Figure 5:
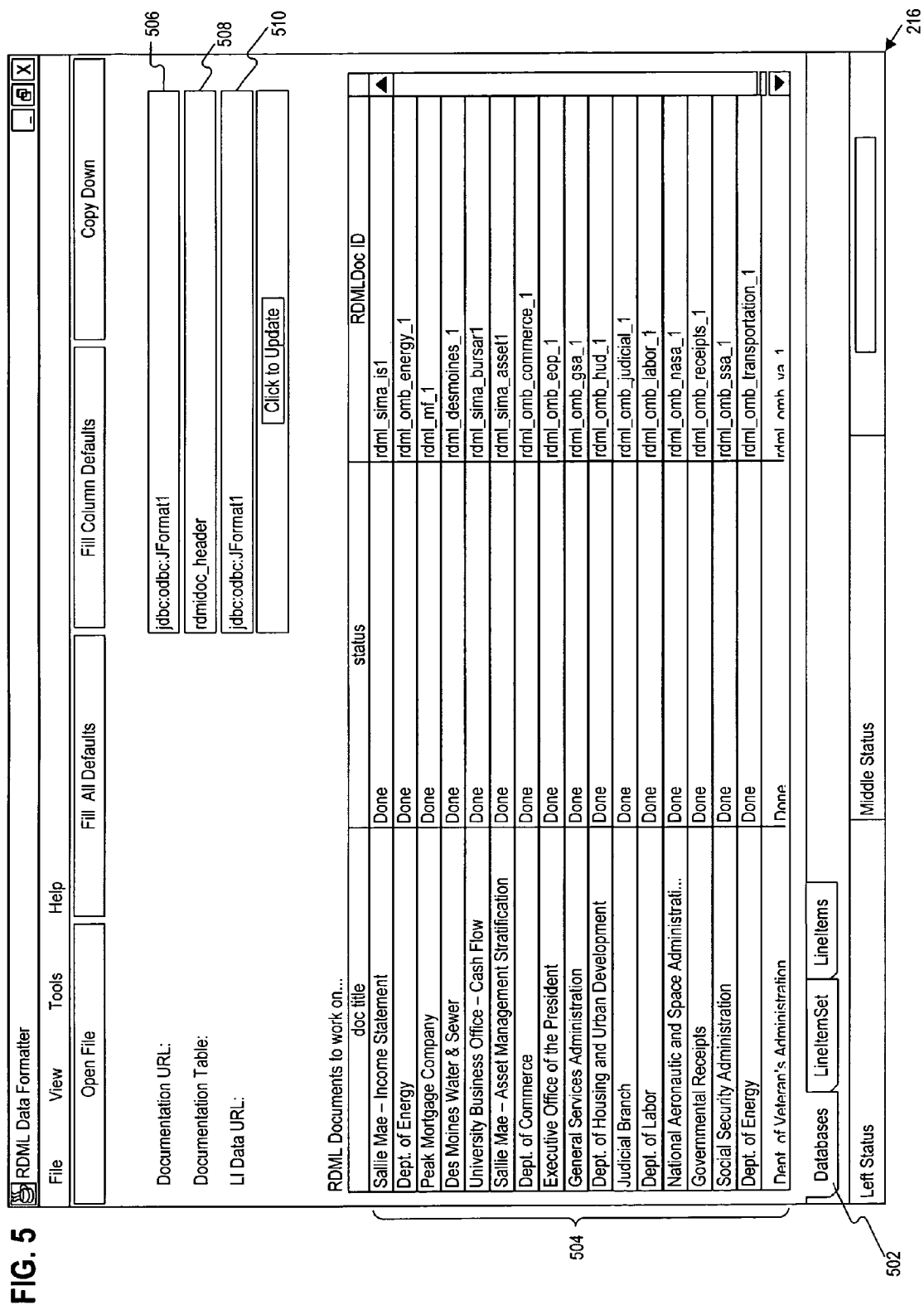
FIG. 5 depicts a screen shot of a database/document tab and management screen of the RDML formatter depicted in FIGS. 2 and 3.

FIG. 5 shows a screen shot of the database tab and document management screen accessed by a tab 502 on the RDML formatter 216. This screen manages RDML documents 102 that can be created from a relational database 230. The user can specify a list 504 of data tables in a relational database and have the RDML formatter 216 create RDML documents 102 for each using default properties. From that point, the RDML formatter 216 is used to modify the defaults. The user may use the RDML formatter 216 to select tags from scratch (as shown in FIG. 4) for a document 102, but this puts an unnecessary burden on the user to remember which properties are appropriate.

The formatter 216 references a database 230 (shown on FIG. 3) specified by the documentation URL 506. The database 230 holds a list of data tables, and the formatter 216 inserts a table 504 that holds stores information regarding the data tables into the database 230 for later reference. This table 504 is referenced by the documentation table name 508. Similarly, the formatter 216 stores a list of line item attributes 408 for the database 230 in the database which are referenced by the li_data URL 510.

The RDML image database 226 contains documentation that relates to a separate set of data records in the existing database 230. The RDML formatter 216 creates and maintains the RDML image database 226. The RDML image database 226 standardizes the process of documenting data documents, and provides a controlled vocabulary for the metadata. The RDML image database 226 also performs document management and tracking, update and version control, error checking, input validation, and the creation of status reports.

The image database 226 contains a list of RDML documents 102 that it can produce. The original data may be in flat files, relational tables, or a table that results from a query on a relational database. The image database 226 contains document metadata that references the original document table or flat file in the original database 230. Documentation information contained in the image database 226 is added to this data. It further includes line item set metadata for the set of line items, documentation that is typically of a more technical nature and applies to the line item set as a whole. Examples of such information is table types, field definitions ("x values") and hyperlinks that apply to the line item set as a whole. (A line item set may be generally analogous to a table; it is a collection of line items, which are analogous to records in the database world.)

The image database 226 also includes line item metadata that references the individual records of the original document table or flat file in the original database 230. There may be a pointer from each line item's metadata record to the corresponding record in the original data table. Each line item includes the fields of the original record, plus, in one implementation consistent with the present invention, at least 18 additional fields that contain "attribute" documentation: object types, unit designators, hyperlinks, footnotes, and so forth. A listing of exemplary attributes of a line item is described below.

Figure 6:
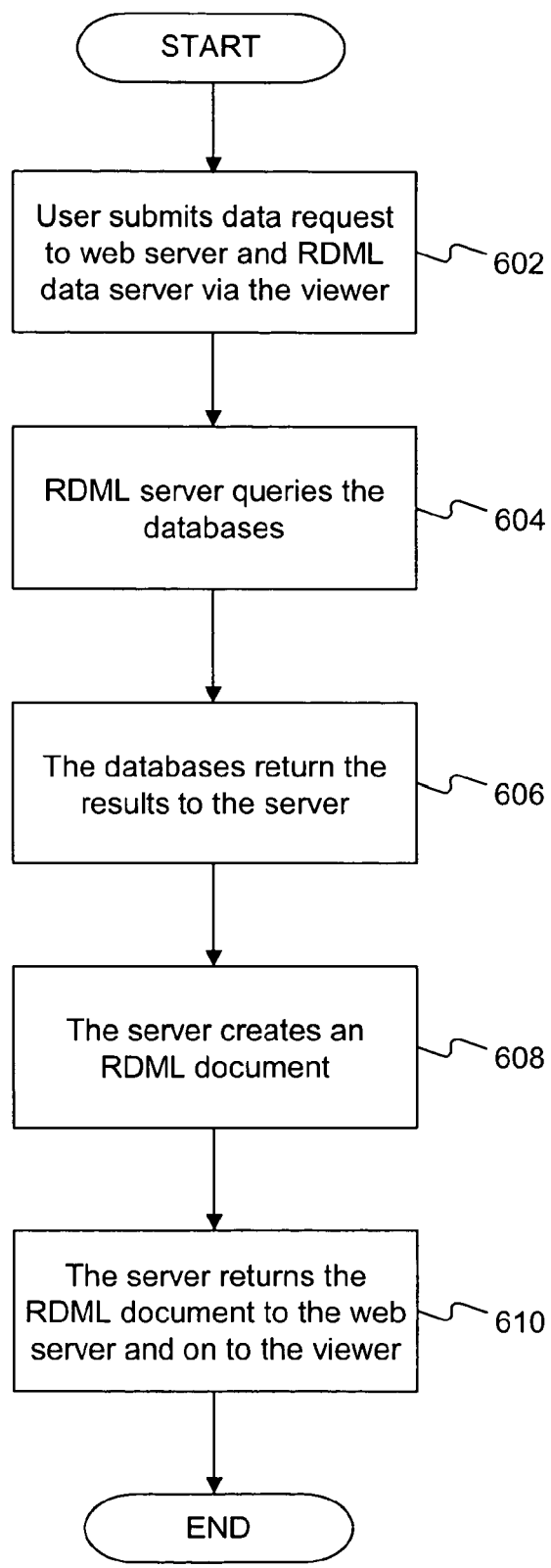
FIG. 6 depicts a flowchart of the steps performed when accessing the RDML document server depicted in FIGS. 2 and 3.

FIG. 6 illustrates steps used by the data viewer 100 when accessing the RDML document server 218. The RDML server 218 occupies a middle position between a database server 230 and a user's data viewer 100 or web browser. Although one architecture for RDML is to have RDML documents 102 served from disk-based text files, users may sometimes wish to create RDML documents dynamically in response to queries. The tasks of executing the query and delivering a result in RDML document form are performed by the RDML server 218. To do so, a user submits the data request to the server 218 via the data viewer 100 (step 602). The RDML Server 218 is a server application called by a web server (not shown) which fields the user's request. The RDML server 218 queries the database 230 using known techniques (step 604), and the database returns the results to the RDML server (step 606). The server 218 then creates an RDML document 102 (step 608) and returns the RDML document to the web server which transmits the results to the viewer 100 (step 610).

The RDML document editor 220 permits users to edit the actual elements and attributes of an RDML, RMML, or RDSL document (102, 104 and 106). The documents may be presented in a tree view for selection and direct editing. A text-based window may display the contents of the selected document for editing. Besides basic editing, it performs a number of utility functions: (1) search and replace, (2) validation, (3) well-formedness testing, (4) hyperlink validation, (5) cut-and-paste of elements, and (6) replacement of elements with defaults.

IV.A. Internal Data Viewer Architecture

Figure 7A:
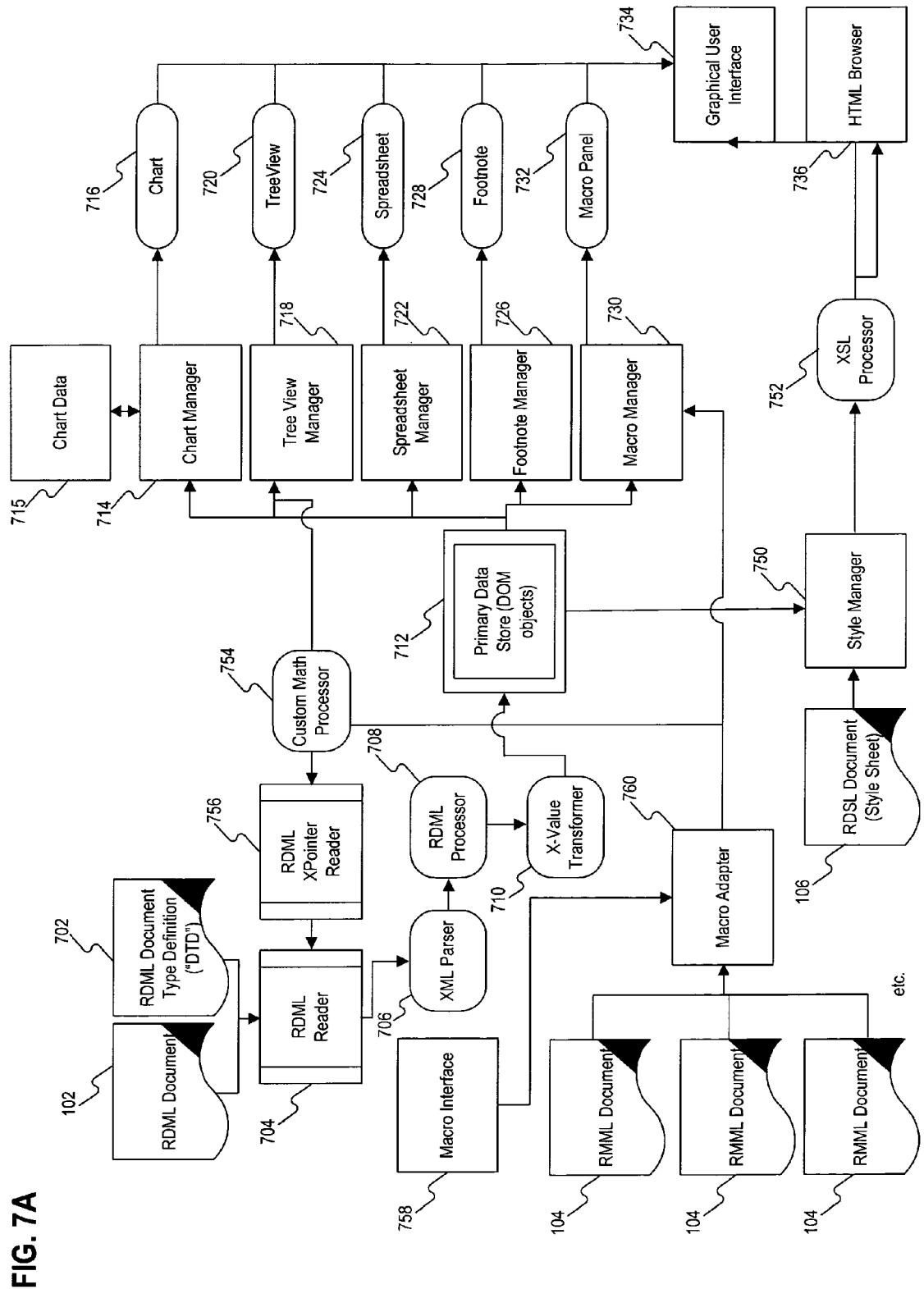
FIG. 7A depicts internal architecture of the RDML data viewer depicted in FIGS. 2 and 3.
Figure 7B:
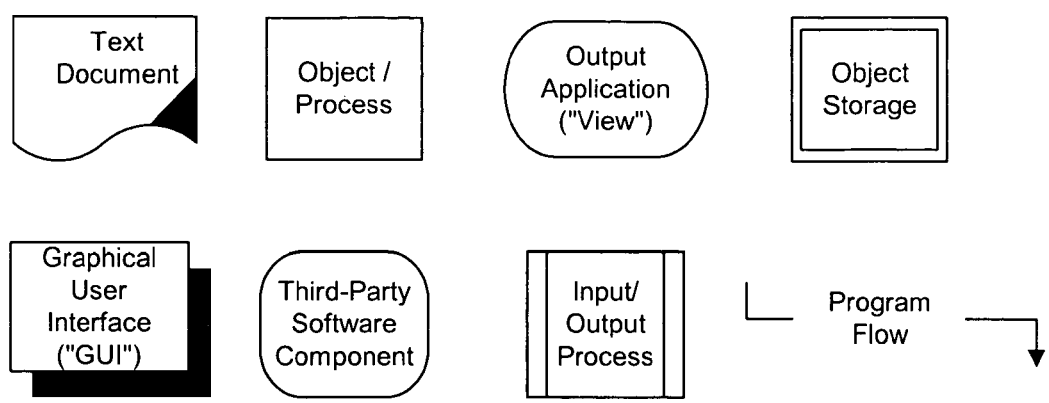
FIG. 7B depicts a legend of the meaning of the symbols depicted in FIG. 7A.

FIG. 7A depicts a schematic diagram of the internal architecture and program flow of the RDML data viewer 100, and FIG. 7B depicts the meaning of each symbol type in FIG. 7A. For each numbered component, a description is given which provides further details on that component's input and output, internal decision process, storage format, object architecture, and program flow.

Figure 8:
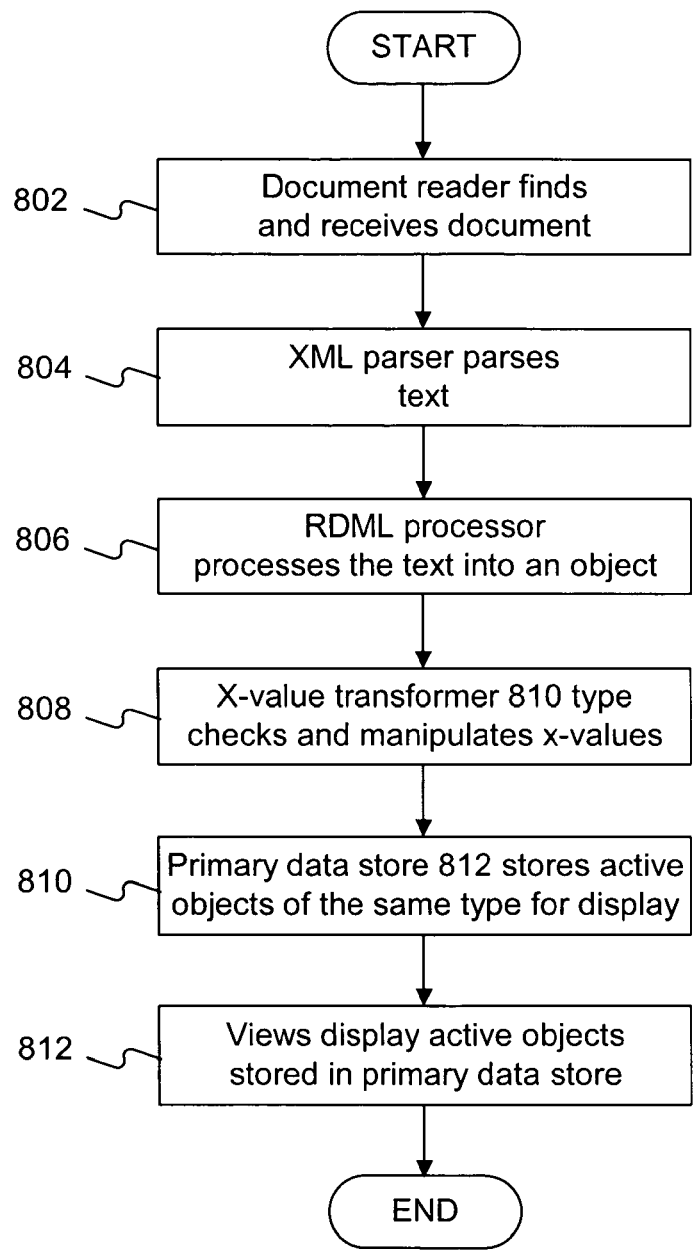
FIG. 8 depicts a flowchart of the steps performed by the RDML data viewer in a method for downloading, processing and displaying an RDML document in accordance with methods and systems consistent with the present invention.

Before fully describing FIG. 7A, however, it is important to understand an overview of the steps involved, which is depicted in FIG. 8 and discussed in conjunction with FIG. 7A. FIG. 8 is a flowchart describing steps in a method for downloading, processing and displaying a RDML document 102 in accordance with the present invention. FIG. 8 describes an overview of the steps involved, and each related component is subsequently described in further detail with relation to FIG. 7A. First, the RDML reader 704 finds and receives an RDML document 102 in text form formatted according to the structure of the RDML DTD 702 (step 802). The RDML Reader 704 may be a class that runs in a separate thread and has methods for checking the RDML document 102 type (Time Series, Category, XY) and handling errors. The RDML Reader 704 then calls the XML parser 706 which parses the text (step 804). The RDML processor 708 receives the parsed text from the XML parser 706, error checks it and creates an object based on the data and structure in the received text. (step 806).

The RDML processor 708 transfers the resulting object to the X-value transformer 710 which performs type-checking and manipulates the fields (x-values) of the data so that it may be displayed and stored coherently and simultaneously with other active objects of the same type (step 808). The X-value transformer 710 makes sure that the data values to be graphed against the x-axis are in common units. For example, if document A is an annual time series and document B is a quarterly time series, the X-value transformer 710 in this case would use the "li_aggregation" attributes of the line items in document B to aggregate four quarters at a time into annual data. As a second example, if document A is a category document with x-values equal to stock ticker symbols (F, IBM, XON, etc.), and document B contains x-values denominated in company names (Ford, International Business Machines, Exxon, etc.), then the x-value transformer 710 will use the "li_class" attributes in the line items of each document to match them up. The X-value transformer 710 sends the object to the primary data store 712 ("PDS") for storage with other active objects of the same type (step 810). The views (716, 720, 724 and 725) then display and present information using data from the active objects in the PDS 712 (step 812).

Details of the steps and components involved are now discussed in conjunction with FIG. 7A. Described first is an RDML document 102 defined by the RDML Document Type Definition. Description of the various software components of the data viewer 102 follows.

The data and metadata of an RDML document 102 may be formatted inside tags which denote the beginning and ending points of each data element. The element tags may also include attributes to be applied to the data elements, a description of what sub-elements may be found within an element, and vocabulary choices for different attribute values.

A full sample RDML data document 102 is shown at Appendix B. Shown below is a fragment of an RDML document 102 that supplies the data for one line item in the document. Note that element tags are designated within angle brackets ("<" and ">"), and that attributes are listed that can be applied to the data.

```
<line_item
    li_ID = "1"
    li_legend = "Department of Energy"
    li_title = "Outlays - Dept. of Energy"
    li_cat = ""
    y_axis_title = "$ in Thousands"
    level = "1"
    format = "#,##0;(#,##0)"
    relation = "Parent"
    li_notes = ""
    li_desc = ""
    li_prec = "-3"
    li_unit = "$"
    li_mag = "3"
    li_mod = "in"
    li_measure = ""
    li_scale = ""
    li_adjustment = ""
    li_aggregation = "">
  <data_y>
    2754567, 2699717, 2726457, 2578954, 2343297, 2252927, 2474440, 2392904, 2392536,2200326,
    2298612, 2303643, 2233062, 3229510, 3840973,5049308, 6412986, 7441295,7261157, 11756883,
```

```
11657178, 10590471, 10991261, 10587245, 11026443, 10692802, 11166039, 11386923,12083898,
12478820, 15522633, 16941547, 17839298, 17617000, 16203000, 14467000, 14366000,15240000,
15190000, 14938000, 14412000, 14556000
   </data_y>
</line_item>
```

In this example, the 18 lines with an "=" are "attributes" of the <line_item> element, and essentially, the attributes provide machine-readable documentation for the data values specified in the sub-element <y-values>. This particular line item describes "Department of Energy outlays in thousands of dollars," but the specifics of the set of attributes are described below in conjunction with the RDML Document Type Definition 702 which describes the structure and elements of a RDML document 102.

RDML documents 102 may be produced by an ordinary text editor, by the RDML data formatter 216, or by the RDML data server 226. (XML browsers other than the RDML data viewer 100 are able to do little more than echo the text input to the user's screen since they cannot interpret the RDML tags.)

IV.A.1. Document Type Definition

Figure 9:
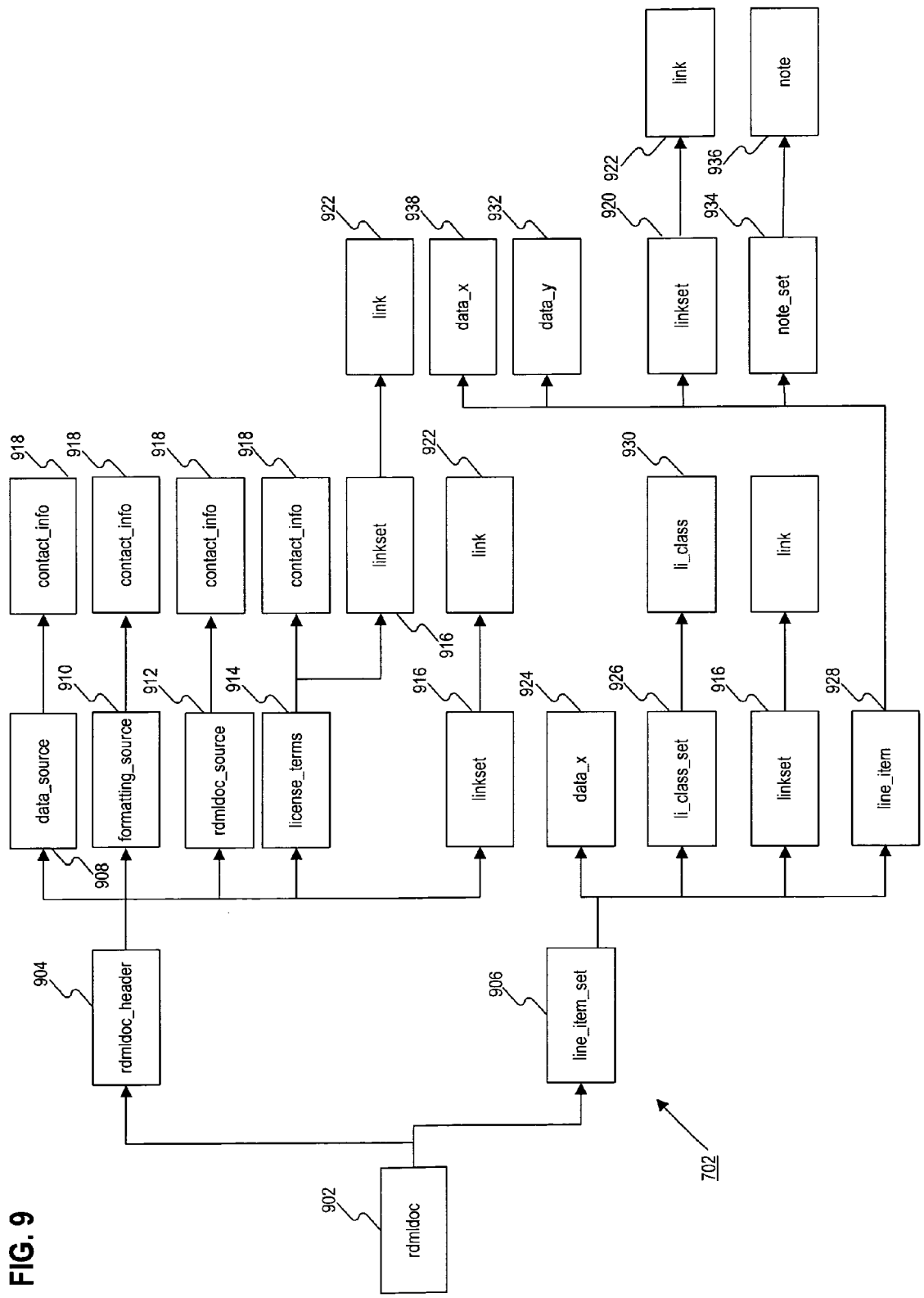
FIG. 9 illustrates elements of an RDML Document Type Definition in accordance with methods and systems consistent with the present invention.

FIG. 9 graphically shows elements of the RDML Document Type Definition 702. In one implementation consistent with the present invention, RDML documents 102 conform to the rules provided by the DTD 702 (also shown on FIG. 7). In accordance with one implementation of the present invention, an RDML DTD 702 is shown at Appendix A. Attributes and elements of the DTD 702 may also be seen in the full sample RDML document 102 in Appendix B. Those two Appendices A and B are useful for examining specific attributes and elements of the DTD 702.

The DTD 702 data structure is optimized to provide information that is needed in order in which it is required, to reduce the learning required on the part of new users to RDML formatting, and to avoid unnecessary duplication. The first line of the DTD 702 in Appendix A starts with "<?xml encoding="UTF-8"?>" because all XML documents start with a line that tells the client application, in this case the data viewer 100, what type of document it is and the version of XML.

With further reference to FIG. 9, the DTD 702 used to define RDML data documents 102 is structured in a hierarchical tree structure of elements. Each element may include a list of attributes (displayed in Appendix A, but not shown on FIG. 9) and/or an association with one or more sub-elements. The DTD 702 specifies which attributes are required and which are optional for any embodiment of the DTD. Depending on design constraints, the required and optional elements may vary. At the highest level, the DTD 702 has two elements descending from a root element, <rdmldoc> 902. The first element, <rdmldoc_header> 904, contains the metadata for the document as a whole and the second, <line_item_set> 906, contains the set of the line items.

In one implementation consistent with the present invention, the <rdmldoc_header> element 904 contains several attributes itself, and the optional sub-elements <data_source> 908, <formatting_source> 910, <rdml_source> 912, <license_terms> 914, and <link_set> 916, each describing some aspect of the source of the data. In this implementation, the <rdmldoc_header> 904 element may include ten attributes describing document information as a whole. These attributes are "rdml_doc_ID," "doc_title," "timestamp," "version," "expiration," "freq_of_update," "num_line items," "num_datapoints," "x_indexes," and "first_li_with data."

The rdml_doc_ID attribute is the unique identification of the RDML document 102 and is typically a file name or URL. The doc_title is a plain language description of the document that will appear at the top of reports and views for the document for use by a user. The timestamp is typically generated by the application that created the document and may denote the time that the document was created or the time the data was accessed for creation of the document. The version describes which variant of the RDML document 102 it is and may be named by the creator. The expiration describes the date and time that the data in the document 102 may no longer be relied upon, typically when the next update is expected to be released. Freq_of_update describes how frequently the document is updated and may be used by applications that want to schedule updates to the data. The next two attributes, num_line items and num_datapoints, are integers describing the total number of line items and number of data values respectively. These attributes are optional and may be used as a "checksum" by a receiving application to ensure that the data has not been accidentally changed or corrupted.

The next field, x_indexes, denotes three data fields to use as representative data fields in the tree view 720 (described in detail below). X_indexes is a comma-delimited string of three integers, each of which is an index to a selected field. For efficiency, the indexes may denote the end of the list of fields so that, for example, "−3,−2,−1" shows the last three fields in the tree view 720. Indexes based on the end are useful because most people reading a time series want to see the most recent data. Along, similar lines, the first_li_with data attribute is an integer index that points out which line item is to be displayed on the chart when the document 102 is loaded into the data viewer 100.

The <data_source> 908, <formatting_source> 910, <rdml_ source> 912, <license_terms> 914 elements, sub-elements of <rdmldoc_header> element 904, may optionally contain one or more of sub-elements of <contact_info> 918 which contains contact information. This element can be used by the target application to create an email letter, update a contact list, or populate a database of information sources. The same element structure is used for all contact information sub-elements 918 so that the application that created the document 102 only has to create one structure.

In one implementation, this contact information is represented by eleven attributes: "role," "name," "company," "address," "city," "state," "zip," "country," "email," "form," and "comments." Role is the role played by the party in the creation of the document, i.e., "data source" for the <data_source> 908, "formatting source" for the <formatting_ source> element 910, etc. "Form" determines whether the hyperlink is a "simple" link or "extended" link. Under the Xlink specification, a language designed to implement links between XML documents and resources, hyperlinks may be simple or extended. Xlink is described in "XML IE5 Programmer's Reference," Alex Homer, Wrox Press, 1999, which is incorporated herein by reference. Simple links are traditional "jump" hyperlinks in which clicking on that link will close the current page and open the target page. Extended links are application-specific and can identify different types of resources, such as multimedia files and other non-document resources.

The contact information in the <data_source> 908 describes who or what collected the data to create the original database, while the same attributes in <formatting_source> 910 describe who or what added the RDML tags to the original data to create the RDML document 102. The same information in <rdml_source> 912 describes the person or company that created this particular document and made it available to the outside world.

In addition to the <contact_info> 918 sub-element in <license_terms> 914 which describes the contact information regarding the licensing of the information, the <license_terms> element has its own set of licensing-related attributes. These attributes include: "copyright_cite," "holder," "license_type," "warranty," "disclaimer," "terms," "date," "email," "state," and "country." The copyright_cite is a string that may appear on reports regarding ownership of the particular data set in the RDML document 102. A typical example might be "Copyright 2000, e-Numerate Solutions, Inc. All Rights Reserved." The holder attribute lists the full legal name of the owner of the copyright. License_type lists the type of license, such as "none—proprietary and confidential," "public domain," "pay per use," etc., and terms lists the payment terms, if any, such as "$1 per download." The information in these attributes may be used by routines associated with the RDML processor 708 to automatically track and implement licenses and payments.

Another sub-element of the <license_terms> element 914 is the <linkset> element 916 which, in one implementation, has two attributes and its own sub-element <link> 922. A <linkset> 916 is a collection of hyperlinks. These hyperlinks may be either HTML files or RDML files. The individual <link> elements 922 hold the actual links and attributes. The <linkset> element's two attributes are form, described above, and href, a standard string for URL or web address, and they designate the HTML or RDML page where a page of hyperlinks may be found. This is useful when the creator does not want to list all of the hyperlinks in the document 102 itself.

The <link> element 922 describes hyperlinks to other documents and contains, in one implementation, nine attributes: "form," "href," "behavior," "content-role," "content-title," "role," "title," "show," and "actuate." These link related attributes are described in the XML IE5 Programmer's Reference, pp 95-97. The title is a string that appears in the application as a hyperlink title. For example, in an HTML browser, it will appear as highlighted, underlined text. Actuate specifies when the link should be traversed—when the resource that the link points to is retrieved or accessed, and show specifies how the target resource will be displayed. Behavior specifies instructions that control the behavior of the link in the way that the content is displayed or the link is traversed, and role describes what role the target resource plays in the link. Content-role and content-title are alternative places for the title and role, but are not specified in Xlink standards.

Finally, <rdmldoc_header> 904 may have its own <linkset> 916 having <link> elements 922. RDML allows users to attach hyperlinks to different elements such as an entire document, a particular line item, or other element in the RDML document 102. The reason for the multiple places that hyperlinks may be placed is so that the user can view in one place all the links that apply only to the element under consideration. For example, an RDML document 102 may contain the data for a company's financial statement. The creator of the document may decide that certain links apply to the whole company (links to product lines, competitors, etc.) and that others only apply to single line items (such as a link attached to the "Equipment Leasing" line item that points to the footnote for that line item or an accounting regulation applicable to that account). Even though they are attached to different elements, the links may have the same form. Another reason for multiple linkset elements is to facilitate keeping links together with their logical owners.

Continuing to refer to FIG. 9, on the line item side of the <rdmldoc> 902, the <line_item_set> 906 which contains information on the collection of line items in the RDML document 102 also contains several attributes and several elements. These attributes include: "line_item_set_type," "time_period," "character_set," "missing_values," "null_values," "zero_values," "dates_values," and "percentages."

The first attribute, the line_item_set_type, is, in one implementation, an important attribute which classifies the line item set into one of three types: time series, category (or cross tab), and x-y plot. Generally, the "type" in this context is the characterization of the x-axis values and whether they represent a time series, a categorization, a x-y plot or other. These line item set types are described in detail below in connection with the x-value transformer 710 which manipulates line items of the same set type. Generally, line item sets of different line item set types may not be actively manipulated together. If the line item is a time series, valid lengths in the time_period attribute may be years, quarter, months, days, etc.

Character_set designates which standard character set is represented, thereby allowing for support for foreign languages. Missing values holds a designator for the numerical value that represents a missing value, because many views of the data, in particular chart views, need to know which numbers represent blanks. Otherwise, a blank might be interpreted as "0." Null_values designates the character to be treated as null so that it is not confused with "not applicable," or "missing" or "0." Finally, zero_values designates characters that should be interpreted as "0," and not "null," "missing," "not applicable," etc.

The <line_item_set> 906 has, in one implementation, several sub-elements including <data_x> 924, <li_class_set> 926, <linkset> 916, and one or more <line_item> elements 928. At the line item set level, metadata regarding line items as a set is shared among all the line items so that the data need not be repeated. In particular, the <data_x> element 924 contains field information common to all line items in the line item set. The <data_x> element 924 includes the x-values and information regarding the x-values of the line items in the set of line items in the RDML document 102. For example, if the line item set is a time series, the x-values may represent the years, months or other timelines (e.g., 1990, 1991, etc.) listed across the bottom of a chart with which all of the data is associated. Because this information is the same for each line item in the line item set, it is only included once in the RDML document 102. In one implementation, in addition to the actual x-values, <data_x> 924 also contains the following attributes: "x_title," "format," "x_notes," "x_desc," "x_prec," "x_unit," "x_mag," "x_mod," "x_measure," "x_scale," "x_adjustment," and "x_links."

In <data_x> 924, x_title is the title displayed on the x-axis as the data is displayed on a chart. Format is a string providing a template for the default representation of the x-axis values. The strings are those familiar from spreadsheet programs (examples may also be seen on FIG. 4):

\#—digit(s), zeros suppressed

0—digit(s), zeros displayed

.—decimal point
,—separator
A-z, other characters—displayed literally.

Other formatting codes can also be used (e.g., codes used in scripting languages). X_notes may contain miscellaneous footnotes regarding x-values of the line item set, while x_desc may describe additional description regarding the x-axis values.

The x_prec attribute describes the precision or number of significant digits for purposes of axis label display. In this attribute, negative numbers cause rounding of amounts greater than zero. For example, a precision of "2" will display a number as "8,254.43". That same number with a precision of "−2" will be displayed as "8,300." The underlying representation of the number will be the full value; only the formatting and representation on the screen will change. The data viewer 100 uses this primarily for formatting the axis labels, but the attribute is available for default formatting as well in other uses such as reports, footnotes, etc.

The subsequent attributes, x_unit, x_mag, x_mod, x_measure, x_scale, and x_adjustment, represent the meaning of the x-values and are used by the data viewer 100 for manipulation, reconciliation and display with other RDML documents 102. In RDML, numbers are collectively described by these attributes which describe the numbers' units. They are as follows:

Unit: the physical unit of the numerator
Magnitude: the size of the numerator
Modifier: relation of the numerator to the denominator
Scale: the size of the denominator
Measure: the physical unit of the denominator
Adjustment: special qualifier (i.e., inflation adjusted)

For example, a line item reported to represent "$ in thousands per million people" can be represented as:

$$\frac{[1 \ \$US] * (1,000)}{[1 \ person] * (1,000,000)}$$

Therefore, the attributes of the line item are:

| | |
|---|---|
| Unit: | $US |
| Magnitude: | 1,000 |
| Modifier: | / |
| Measure: | 1 person |
| Scale: | 1,000,000 |

Access to these attributes for line items provides enormous power to the data viewer 100. It facilitates the interpretation and transformation of the numbers. It allows multiple lines to be placed on a single chart without conflict and allows macros to be applied without the requirement of human intervention to answer questions about the units. It further allows reporting templates to make automatic adjustments to provide the most readable reports. In particular, the data viewer 100 uses these attributes to construct y-axis labels and descriptors when the user has made a transformation and the "y_axis_label" attribute is no longer appropriate.

A standard vocabulary for units and measures may be used for efficiency, and magnitude and scale may be more simply represented as a power of 10, e.g., 3 for thousands, 6 for millions, etc. This permits more rapid transformations and eliminates potential confusion of variant usages and spellings (e.g., million, mille, MM, etc.)

For an example of the use of these attributes, suppose the RDML data viewer 100 has plotted the following value/measurement:

426 US Dollars (in thousands) per Hour, adjusted for inflation (1996=100).

The user now wants to convert this to:

"X" Italian Lira (in billions) per Day, in nominal lira where "X" is the value to be calculated and the rest of the line is the measurement. The data viewer 100 makes this transformation automatically for the user because it has conversion factors for the following:

| RDML Attribute: | Begin: | End: | Conversion factor: |
|---|---|---|---|
| Unit | US Dollar | Italian Lira | A* 0.0000234 |
| Mag | Thousands | Billions | A* 1,000,000 |
| Mod | per | per | A* 1 |
| Scale | Hour | Day | A* 24 |
| Measure | 1 | 1 | A* 1 |
| Adjustment | Adjusted for infl. | Not adjusted | A* annual factor |
| Value | 426 | 1.189 | |

The data viewer 100 multiplies the conversion factors (or performs any other appropriate mathematical operations) to manipulate the display. The user does not have to look up each of the conversion factors, marshall them into the correct sequence, do the arithmetic, and make corrections such as rounding adjustments. The user may simply select a new unit, magnitude, etc. from a drop-down box and make a selection.

Figure 10:
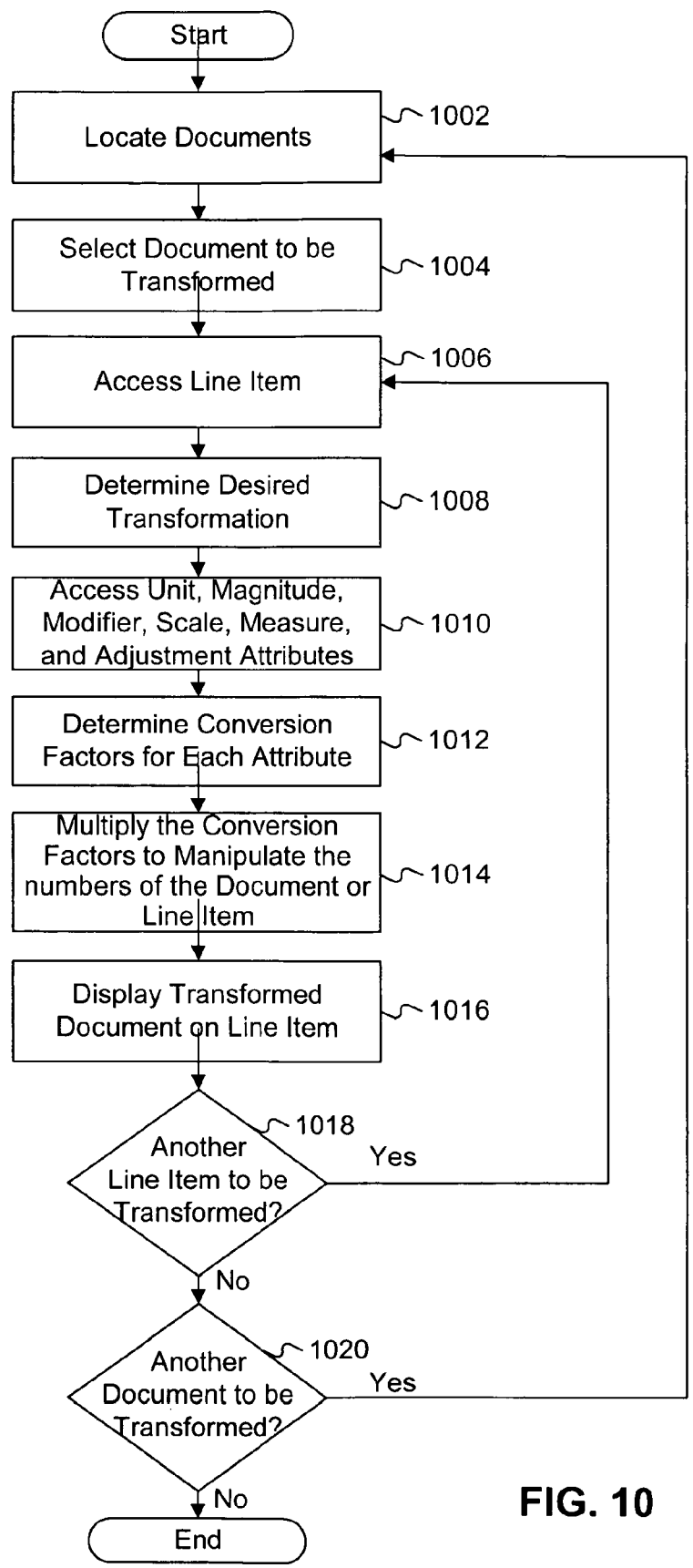
FIG. 10 depicts a flowchart of steps used to automatically manipulate an RDML document for display using line item attributes in accordance with methods and systems consistent with the present invention.

FIG. 10 illustrates steps used by the data viewer 100 to manipulate the numerical information in an RDML document 102 to produce a desired transformed display. First, the data viewer 100 locates the RDML document 102 (step 1002). The document may be located either locally or online using a URL, the search engine 224 or any other technique. Next, the data viewer 100 selects and accesses the desired document 102 (step 1004). The data viewer 100 then accesses the line item that needs to be transformed (step 1006) and determines the desired transformations (step 1008). The desired transformations may be received from a user or may be determined by the data viewer 100 automatically to, for example, accommodate the addition of a new document 102 to a display of a current one. The data viewer 100 accesses the unit, magnitude, modifier, scale, measure and adjustment attributes of the document or line item to be transformed (step 1010). Using these attributes, the data viewer 100 determines the conversion factors, if any, for each (step 1012). These conversion factors may be stored locally or retrieved online over a network 214. The data viewer 100 then multiplies the conversion factors to transform the numerical data into the desired display (step 1014) and displays the transformed line item or document (step 1016). If more than one line item is to be displayed, the data viewer 100 may repeat these steps so that all appropriate line items may be transformed to the desired display format (step 1018). Similarly, if more than one document 102 needs to be transformed, the steps may be repeated for each document. In this way, documents 102 having different numerical sets may be automatically manipulated for simultaneous display or quick transformation of display format without human intervention. The system automatically resolves conflicts between different documents in different formats by transforming them into one desired form.

In one implementation, when the system converts one unit to another unit, it converts the original source unit to a base unit known by the system, and then converts the base unit to the target unit. The system stores conversion factors from base units to other units in a unit list XML file, a portion of which is shown at Appendix C. For instance, suppose the base unit used by the system for length is "meters," and numerical values are to be converted from "yards" to "miles." The viewer 100 converts the yards to meters using the stored conversion factor, and then from the meters to miles using the appropriate stored conversion factor. In this way, the unit list file need only contain conversion factors from the base unit to various other units, and need not list a conversion factor for every possible combination between various units.

The structure of the unit list file is as follows: a <unitlist> element is the root, and it has one level of child nodes, each of which is a <unit> element. The unit elements each have a number of attributes and elements that describe the characteristics of that unit necessary to convert it into another unit or set of units.

The conversion element contains the attributes necessary for making a conversion where the source unit and the destination unit are both of the same type. For example, converting "miles" to "inches" is simply a matter of finding the correct multiplier to apply to the number of miles, because both units are measures of type "length."

The conversion element contains six elements: (1) "conv_target" describes the target unit of measurement that the following conversion factors will bring you to, (2) "conv_factor" is the number to multiply by the source value to arrive at the destination value, (3) "conv_constant" is the constant to be added to the product of the source value and the conversion factor. For example, in the conversion formula for Fahrenheit to Centigrade (F=32+9/5 C), 32 is the "conv_constant", (4) similarly, if the conversion involves a logarithmic conversion, the necessary factors are included in "conv_log", (5) "conv_source" is a description of the standards body that set forth this particular conversion factor, and (6) "conv_href" contains the URL for the approving standards body.

The type element contains one of the following text strings: (1) Length (base unit=meter), (2) Area (base unit=square meter), (3) Volume (base unit=cubic meter), (4) Mass (base unit=gram), (5) Time (base unit=second), (6) Temperature (base unit=centigrade), (7) Energy (base unit=joule), (8) Currency (base unit=$US), (9) Compound (no base unit), (10) Diverse (no base unit), (11) Collection (no base unit), and (12) Occurrences (no base unit).

The Compound and Diverse types are constructed from one or more of the basic units. Compound types are simple combinations of others. Example: "miles per hour" is a combination of a length unit and time unit. In order to convert a Compound type into another type, it is necessary to be able to make the necessary conversions of the decomposed units.

Diverse types are those that are constructed of descriptions. For example, an "ohm" is an electrical unit described as "the resistance offered to an unvarying electrical current by a column of mercury at the temperature of melting ice, 14.4521 grams in mass, of a constant cross-sectional area, and 106.3 centimeters in length."

A Collection type is a collection of persons, places, things, etc. For example, a data series denominated in "people in millions" means that one unit of this type is a collection of one million people. Collection types can use any of the conversion elements. For a simple conversion example, suppose there are 2.4 people per family in a sample. Then "people" could be converted to "families" by a simple division by the 2.4 conversion factor.

An Occurrence type is a collection of events. "Cycle" would be an Occurrence type that could be divided by "seconds" to produce a compound "cycles per second" unit of measurement.

The "subtype" element is for finer distinctions among types. The "plural" element is for constructing new titles, legends and labels at the completion of a conversion operation. An "alias" element is provided for enabling conversions where data has been entered in a common, but nonstandard form. For example, tables often use "in" instead of "inches." The "desc" element is provided so that a plain language description can be given the user. The "icon" element provides a place for giving the unit an icon to be used in lists, drop-down boxes, etc.

Referring back to the elements and attributes of FIG. 9, in <x_data> 924, there is an x_links attribute which may be a comma-delimited string of URL's for linking to other sources.

In addition to this element, the <li_class_set> 926 element represents the set of line item class elements and, in one implementation, has no attributes but has one or more subelements representing line item class, <li_class> 930. These line item class tags specify categories in various classification systems to which the numbers belong, such as "<US Dollars>" or "<Total Revenues>". The data viewer 100 uses these class tags to select which macros can apply, to adjust report formats, and to make the correct selections of assumptions in analytic processing. The class designations permit validation and conforming of different data sets, thereby allowing the data viewer 100 to combine documents from unrelated sources into a single unified source. Class tags may be used by macros that look at the class tag list to see if it qualifies to act on the particular line item. For example, if a line item in a financial statement is tagged as of the class "debt," the macro knows that it can use this line in calculating "debt-to-equity" ratios. But if the line item is tagged "piano," for instance, the macro will not be applied. Note that, in this implementation, the element names for the classes are entered as comma-delimited strings.

The <li_class> element 930, in one implementation, has five attributes. These are "class_name," "parent_class," "form," "href," and "description." Class_name is the name of the class to which the line item set belongs, and parent_class denotes the name of the parent class. These attributes may be used by more advanced features of the data viewer 100 such as the macros.

The <line_item_set> element 906 further contains a <linkset> 916 similar to the previously described <linkset>. As before, this <linkset> 916 further has a <link> element 922 previously described.

The <line_item> 928 element may have, in one implementation in accordance with the present invention, four subelements and 18 attributes. The elements are <data_x> 938, which contains the x-values for this line item if they are different from the default x-value in the line_item_set element <data_y> 932 which contains the y-data values, the data numbers or values of the line item, a <linkset> 916 having a <link> 922 as previously described, and a <note_set> element 934. The <noteset> 934 contains one or more <note> elements 936 which have user readable, plain language notes regarding the line item.

The attributes of the line item include: "li_ID," "li_legend," "li_title," "li_cat," "y_axis_title," "level," "format," "relation," "li_notes," "li_desc," "li_prec," "li_unit," "li_mag," "li_mod," "li_measure," "li_scale," "li_adjustment," and "li_aggregation." Several of those attributes have the same meaning as attributes previously described except that they specifically describe only the line item and y-values to which they are attached.

The li_ID is a unique identification number for the <line_item> element 928 and may be numbered from 0 to n (where n is the number of line_item elements). In one implementation consistent with the present invention, the numbers are unique and in order.

The li_legend attribute is a plain language string describing the line item that does not need to be unique. Generally, it appears in the leftmost column of the views. The li_title is a string defining the general subject of the line item. In the data viewer 100, this may be used as the title of the chart and as titles in reports. Typically, titles are the same for line items grouped together, but they are not required to be.

The li_cat attribute represents a line item category. As opposed to the li_legend and the li_title, which are displayed on the chart in the data viewer 100, the li_cat is not normally displayed. It is generally a non-printing designator for a category that the line item might belong to. Often, this may be a table name, or a primary key in a database, or some other organizing identifier. It may be used to group line items for reports.

The y_axis_title attribute is a string which will appear on the y-axis as the title of that axis. However, if the user applies a transformation to any variable in the descriptor, this hard-coded y-axis title will be replaced by one generated by the data viewer 100 using other attributes.

The level attribute and relationship attribute specify hierarchical relationships between line items. Conventional links in relational databases are maintained by matching records on the basis of "key fields." One drawback of this approach is that nothing is known about the character of the relationship except that it exists, and there is no way to tell, absent specific documentation elsewhere, that one record is a child or parent of the other, and whether that nature is a containment, a derivation, and inheritance, etc. In RDML, the creator of the data may specify the hierarchical level of each line item and the nature of that hierarchical relationship. The data viewer 100 uses the level attribute and the relationship attribute to create a hierarchical tree, to place icons representing the relationship in front of each line item to summarize the derivation of numbers and describe their context, and to assist macros and updating data tables. The level attribute specifies how many levels down from the parent node a line item is, while the relationship attribute specifies the nature of the relationship, such as whether the line item is a child of another line item or contained by another. It may also determine whether the line item is an additive or subtractive subcomponent of a parent, or a subtotal that is dependent on other child line items. These previously mentioned attributes and elements make up a DTD 702 in accordance with methods and systems consistent with the present invention.

Li_aggregation is an attribute useful if a user wants to "aggregate" or "deaggregate" data based on differing x-axis transformations. This attribute explains to the data viewer 100 how to handle this particular line item when such transformations are attempted. For example, if a line item set presents bank account information, each line item may be a time series and presents quarterly data, but the user may wish to see the data on an annual basis. For some line items in the set, it is simply a matter of summing up four quarters worth of data (e.g., deposits) in which case the attribute value would be "sum," but for other line items (e.g., closing balance), only the last quarter's value need be shown, in which case the attribute value would be "last." Similarly, if a minimum annual balance is desired for four quarters of minimum balances, only the lowest balance for all four quarters would be needed. Such a line item's li_aggregation attribute value would be "minimum." Possible accepted values include: "sum," "average," "minimum," "maximum," "first," "last," and "none."

IV.A.2. Reader, Parser and Processor

With reference back to FIG. 7A, the RDML reader 704 may be an object within the RDML data viewer 100 which manages the process of finding an RDML document 102 (locally, on a LAN, or on a Wide Area Network such as the Internet), passes it to the XML parser 706, relays error notices to the user, and coordinates the updating of other components states to reflect a rejected or damaged RDML document 102. The user of the RDML data viewer 100 may initiate the download of an RDML document 102 in many different ways including: clicking on an RDML hyperlink (these are like any other hyperlink, except that the target document may end in ".rdm"), typing a ".rdm" URL into the "Address" box of RDML data viewer, or requesting the loading of the document in a macro. Also, while conventional HTML browsers have a cache of only HTML documents represented as the "history" of the browser, the browsers may only display one of these documents at a time. Given an URL address, the RDML reader 704 reads in Document Object Model ("DOM") compliant documents (e.g., RDML documents 102), discussed below. The XML reader 704 may be implemented by a third-party set of Java classes, such as the XML4J parser developed and licensed by IBM, but others may also be used. The RDML reader 704 may cache multiple documents in RAM if they are compatible with the active data set. Not only are these documents immediately available, but sub-elements of the documents are available immediately because the data viewer 100 may maintain indexes of important data and metadata in the documents. Additionally, macros may be used to find specific elements in the document that is read in by the RDML reader 704.

The XML parser 706 takes a serial stream of text characters from the RDML data document 102, performs basic functions such as eliminating white space, dividing input into words and groups of words and searching for opening and closing characters (primarily "<" and ">"). The XML parser 706 used in the RDML data viewer 100 may also be a third-party set of Java classes, such as the XML4J parser developed and licensed by IBM, but other parsers may also be used.

The processor 708 receives the parsed text and creates a tree-shaped data structure of the data elements, matching the structure of the RDML DTD 702 hierarchy. The hierarchical structure conforms to the DOM Model, meaning that data is available in a standard form, and that a standard library of methods and functions are available for accessing data, editing elements, searching through nodes to find certain elements, and so forth. The XML DOM standard is controlled by the World Wide Web Consortium, and can be found at "http://www.w3.org/TR/REC-DOM-Level-1/".

The RDML Processor 708 generally performs three primary functions on the incoming parsed text to create an internal software object: error checking, structuring, and adding functionality. The error checking functions of the processor 708 simply compare the output of the parser 706 against the text expected as defined by the DTD 702. If the incoming document does not conform, the processor 708 determines whether the defect is: (1) not critical, in which case a warning is sent to a log and work continues, or (2) critical, in which case work stops and an error message is sent to the routine that called the parser 706.

The structuring function is a matter of assembling the text into a hierarchical data structure matching the hierarchy described in the DTD 702. The target data structure may be a vector of vectors, or other collection of collections. When the data structure is created, it is "wrapped" in a software object (an "RDMLDoc" object) that adds an interface to the data so that other software objects can communicate with it. Most of the added functions ("methods") provide access to specific subsets of the data or particular elements or attributes.

The functions of the RDML processor 708 can be performed by the same class as the RDML Reader 704, where the RDML reader 704 has been set up on a "callback" relationship with the XML Parser 706. In that way, when the parser 706 gets a new element from the RDML document 102, it informs the RDML reader 704 that it found the element and returns it to the reader. In such a way, the RDML reader 704 acts as a processor as well as reader (even though it may hand off the actual element handling to another class).

IV.A.3. X-Value Transformer and Line Item Set Types

Regarding the X-value transformer 710, the term "X-value" refers to the fact that the fields of the input data records are plotted along the x-axis of the chart view 716 by default. (The values of each record for each field are plotted on the Y axis.) For example, a time series will, by default, be plotted in the chart year with the time periods plotted on the x-axis. When more than one data document is input, their data fields must be correlated before they can be presented together in a common view. The X-value transformer 710 determines what adjustments have to be made, and then accomplishes them.

Generally, the RDML data viewer 100 recognizes three different types of line item sets (i.e., (1) "time series," (2) "category," and (3) "X-Y Plot") which account for the majority of end user tables. The X-value transformer 710, by recognizing these types, can automatically provide the correct display and transformation routines, saving the user the time and expense of changing a broad range of details. To give an example of this, when a times series table is encountered, the data viewer 100 can recognize that the x-values must fit the permissible types of dates, check them, conform them, and format them, thus sparing the user the work. In one implementation consistent with the present invention, a line item set type is a required attribute of the line item set element 906.

Figure 11:
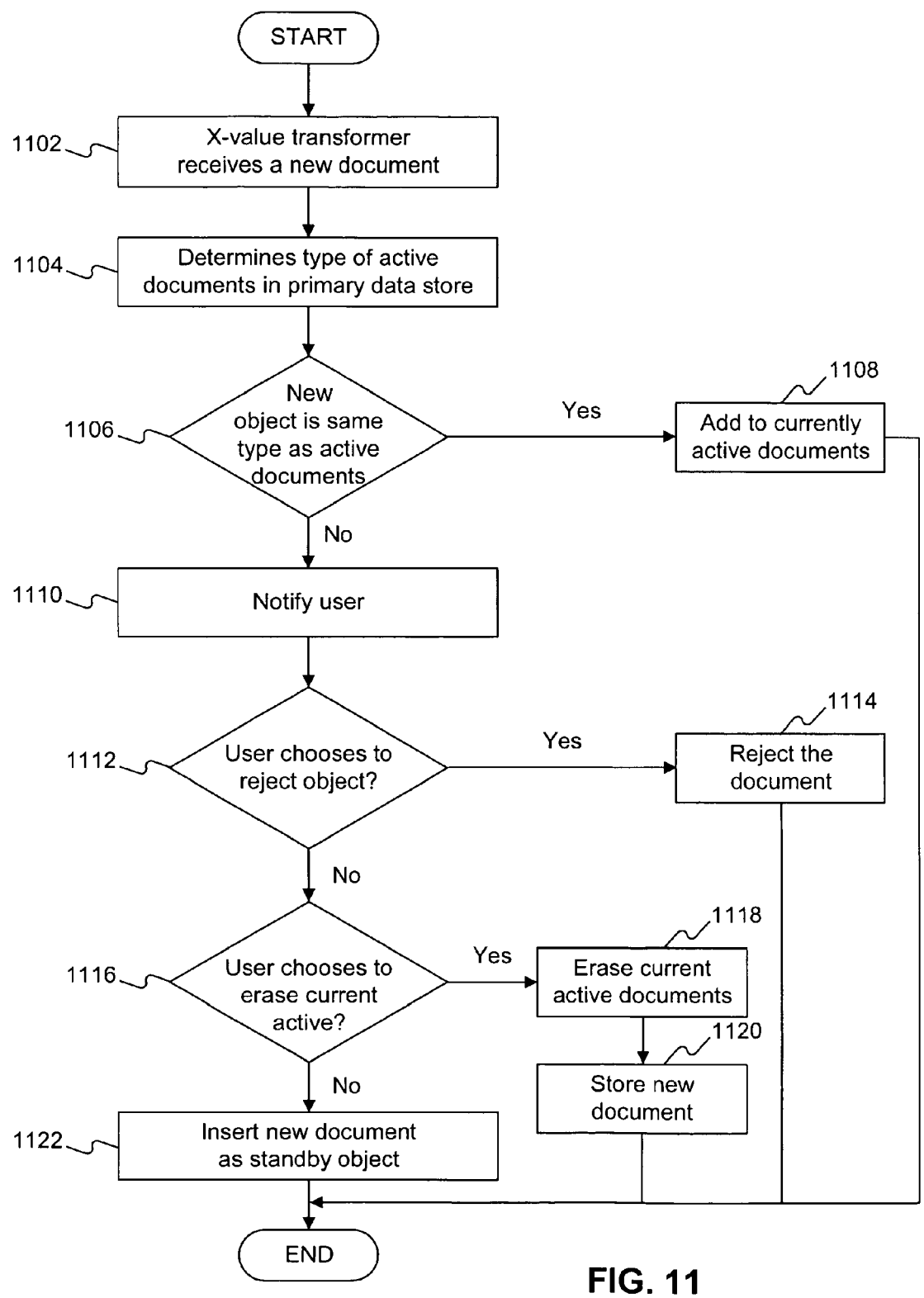
FIG. 11 depicts a flowchart of the steps performed by the x-value transformer depicted in FIG. 7A to store a new document in the primary data store.

FIG. 11 shows the steps used by the X-value transformer 710 to store a new document in the primary data store ("PDS") 712 described below. Generally, the X-value transformer 710 determines whether a newly input data document is of the same type as the one(s) currently stored in the "active documents" list of the PDS 712. Active documents are available for display in the tree view 720, to be charted, to be added to the spreadsheet view 724, and so forth.

First, the X-value transformer 710 receives a new document 102 (step 1102). It then determines the type of the active documents in the PDS 712 (step 1104). If the newly arrived document is the same line item set type as the active documents (step 1106), it is added to them in the PDS 712 (step 1108). If it is of a different type than the currently active documents in the PDS 712, the user is notified that it does not match the currently active documents (step 1110). The user may choose to reject the new document 102 (step 1112), in which case the object is not added to the PDS 712 (step 1114). If the user chooses to erase the currently active documents (step 1116), the currently active documents are erased (step 1118) and the new one is loaded (step 1120). Otherwise, the new document 102 is placed in the PDS 712 as a "standby" document (step 1122). Standby documents are available for providing data to scripts and macros, but do not interfere with the active document views. Optionally, if the x-value transformer 710 need not perform any transformations, the RDML reader 704 may store the document in the PDS 712.

If the newly arriving document is of the same line item set type as the active documents, the X-value transformer 710 matches the data_x fields of the new document to the existing documents. They may be in a different order, may be spelled differently, be in a different form, or otherwise not immediately compatible. The X-value transformer 710 makes the necessary adjustment according to the type of line item set. For example, time series line item sets have elements which are ordered in time. One obvious incompatibility is that periods may be different. Often, one set of data is in years and the other in, for example, months. The X-value transformer 710 uses attributes of the line items to handle each correctly. However, monthly data cannot just be added up to produce a yearly value, for example, because the number might represent a non-additive value. For example, a line item might be "Ending Bank Balance," but adding up 12 monthly ending balances does not produce a year-ending balance. The line item provides a period-length attribute that specifies that it is a "period-end" value, and the X-value transformer 710 uses the last month only to create a yearly value. In another example, monthly "deposits" would be added together, and monthly "average interest rate" might be a "period-average." Each line item provides instructions on how it is to be handled in conversion to other periods; this is provided by the li_aggregation attribute.

Another change that might be made is in the date format. Some data sets might simply display the year ("YYYY"), others might use a standard date format ("YYYY-MMDD: HHMMSS.MSS"), or some other variant. The X-value transformer 710 puts these all into a common form.

The data viewer 100 additionally provides tags describing how it is to be handled in the event of a period widening/shortening, or a period shift. Numbers may be tagged as "sum," "median," "average," "last value," "first value" or a specified formula. The X-value transformer 710 and the data viewer 100 may also handle "period shifts," a related type of conformance. For example, a first data source may be based on a calendar year ending on December 31 while a second data source is based on a fiscal year ending on September 30. The RDML data viewer 100 may use the period_length attribute of the x_data element 924 to designate the period length of the data, in conjunction with the li_aggregation attribute of the y_data element. The latter attribute is used to estimate a conforming transformation.

Y-values, the data values in a line item, may change when the x-values have been conformed. For instance, if twelve months of "average interest rate" is aggregated to produce "annual average interest rate," the updated designation of the number that will appear in legends or axis titles changes. The data viewer 100 recognizes that the resulting values may possibly undergo a transformation based on unit, magnitude, modifier, scale, measure, and adjustment attributes. These attributes allow efficient and automatic interpretation, translation, manipulation and presenting of data in a line items. They further facilitate the automatic changing of text descriptions in charts and reports to be automatically changed by macros.

Additionally, to conform differing time periods in separate documents, the X-value transformer 710 and the data viewer 100 may prompt user assistance if needed. For example, a first data source may be denominated by fields such as "Week 1," "Week 2," etc., while a second data source is denominated by "April 4, 1999," "April 11, 1999," and so forth. The X-value transformer 710 recognizes this problem (and a broad set of similar circumstances), and presents a dialog box asking the user for the actual date that "Week 1" begins on.

The Category line item set type is a common type of line item set that is often referred to as a "crosstab." In this line item set type, the x-values are categories. On a chart, for instance, the x-axis may be divided into eight categories for eight companies, with the y-axis showing the values of revenues or profits. Sometimes matching the fields of different source documents by name is too dependent on wording, spelling, or language to permit efficient matching. The challenge for categories line item sets is to handle these differences in usage. For example, company income statements may start with a concept of "sales," but the actual words used may be "revenues," "total revenues," "gross income," or any other designation used in different languages, dialects, or industry-specific terms. To handle these line item sets, the X-value transformer 710 lines up categories from multiple data sets by first matching up any actual matches in spelling (ignoring cases in the default). Second, it looks at the class elements 930 to see if there are standard vocabulary tags; these standards may be different for different industries or uses. When dealing with companies, for example, the ticker symbol may be used as the matching tag. For instance, one data set may have a category for "Ford" another for "Ford Motor Company," and another for "F." All would be matched by the common presence of a tag <"F"> (Ford's ticker symbol) in the class element 930. If this fails to provide matches, the data viewer 100 presents the user with a dialog box with two lists of fields. Using "drag and drop" techniques, the user can quickly match the two sets of fields, and fields with no match are simply appended as new fields. In addition to creating a mapping dictionary based on text, class sets, and user input, the data viewer 100 can use a mapping file specified by a user or an input document to combine files automatically.

Figure 12A:
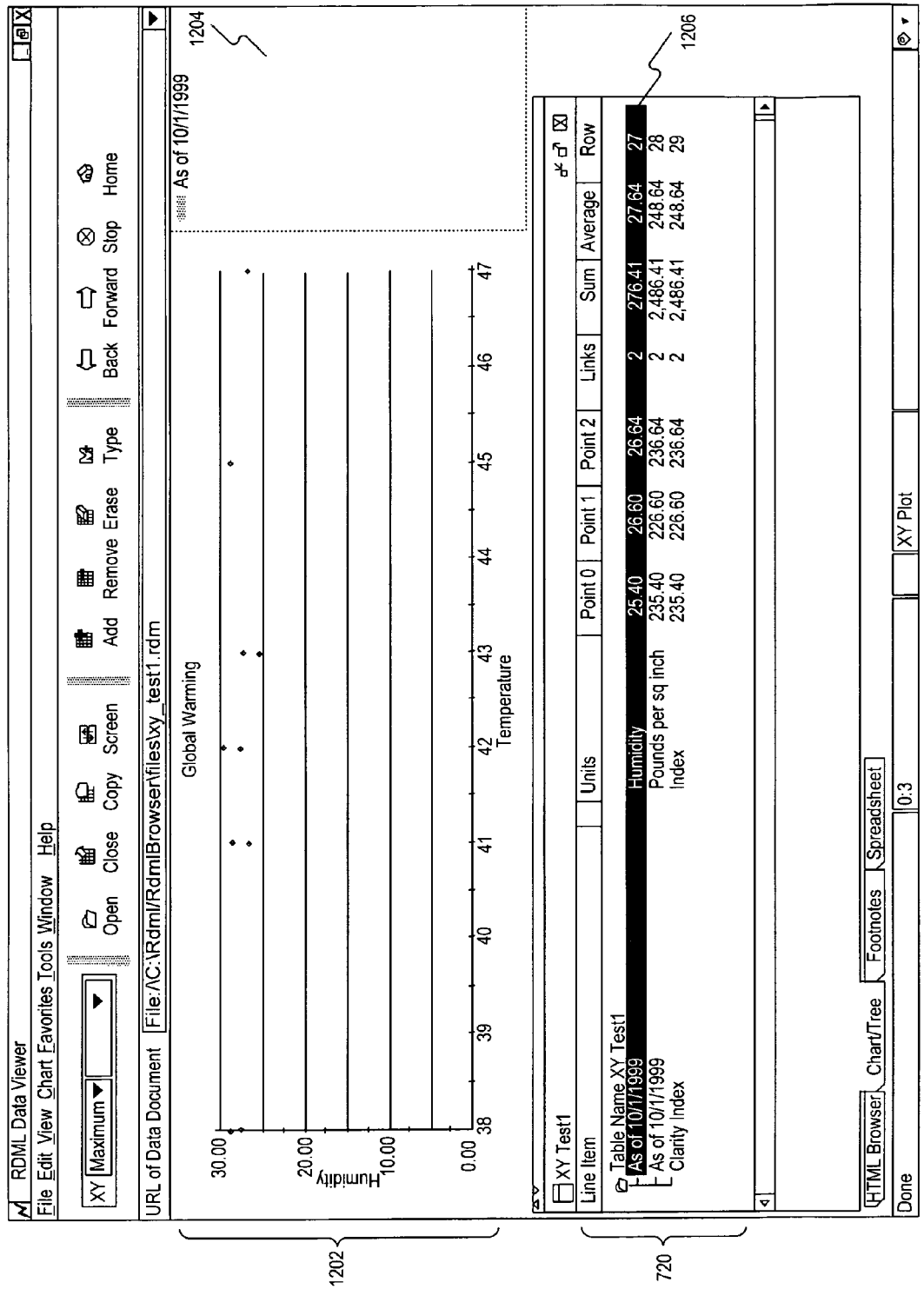
FIGS. 12A-12C depicts X-Y plots and tree views in accordance with methods and systems consistent with the present invention.
Figure 12B:
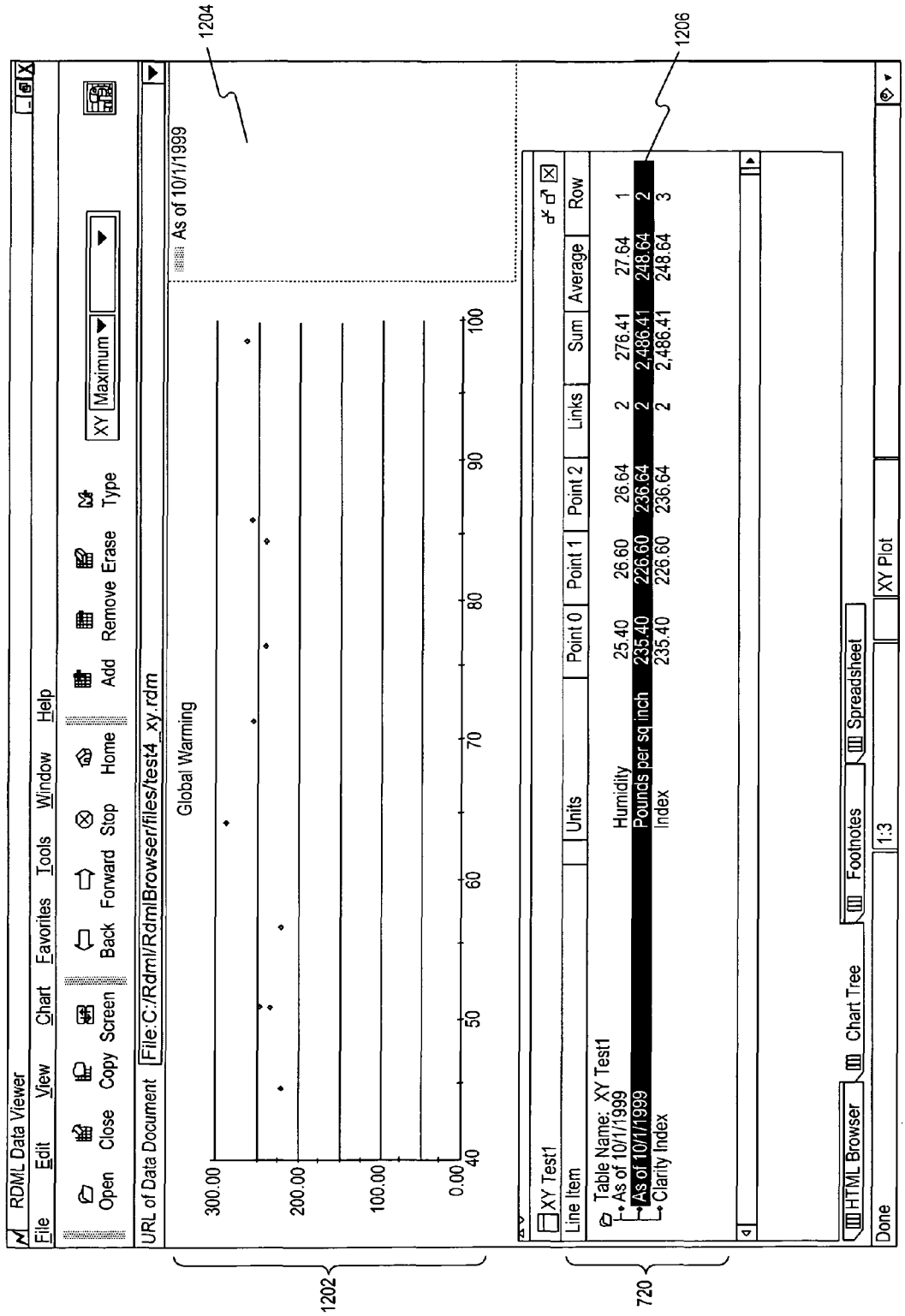
Figure 12C:
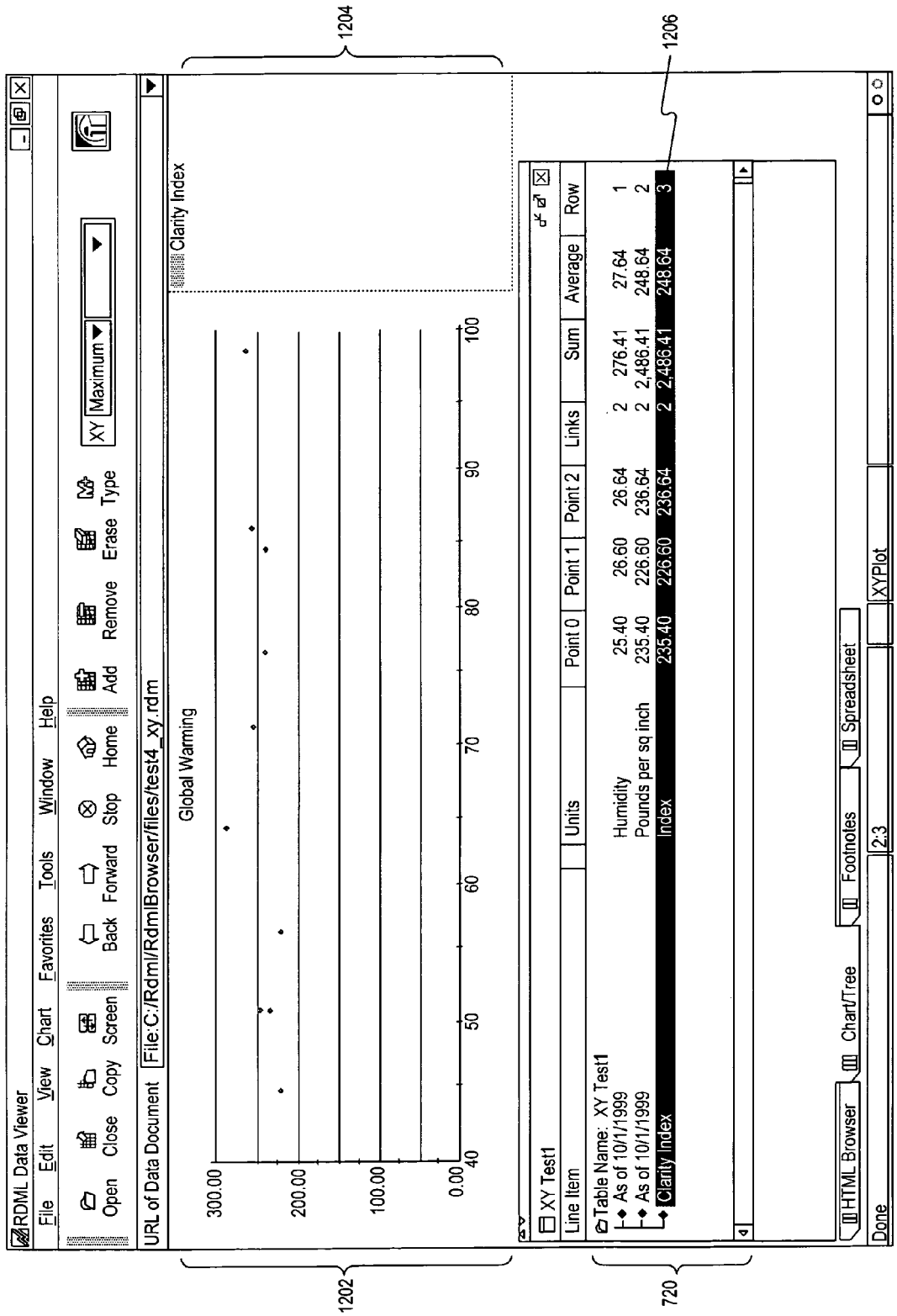

FIGS. 12A, 12B and 12C depict screenshots of an X-Y plot 1202 in accordance with the present invention. Most commonly found in scientific statistical series, an X-Y plot 1202 by its nature treats every x-value as distinct. This display plots individual data points on the graph. The X-value transformer 710 is only required for collating only exact matches. The screenshot also displays a tree view 720 that corresponds to the data in the X-Y plot 1202 and a legend 1204. As shown on FIG. 12A, the X-Y plot 1202 displays the selected line item 1206, and the legend 1204 changes as the line item selection changes. The FIGS. 12B and 12C show the X-Y plots 1202 resulting from the selection of different line items 1206 in the tree view 720.

IV.A.4. Primary Data Store

Figure 13:
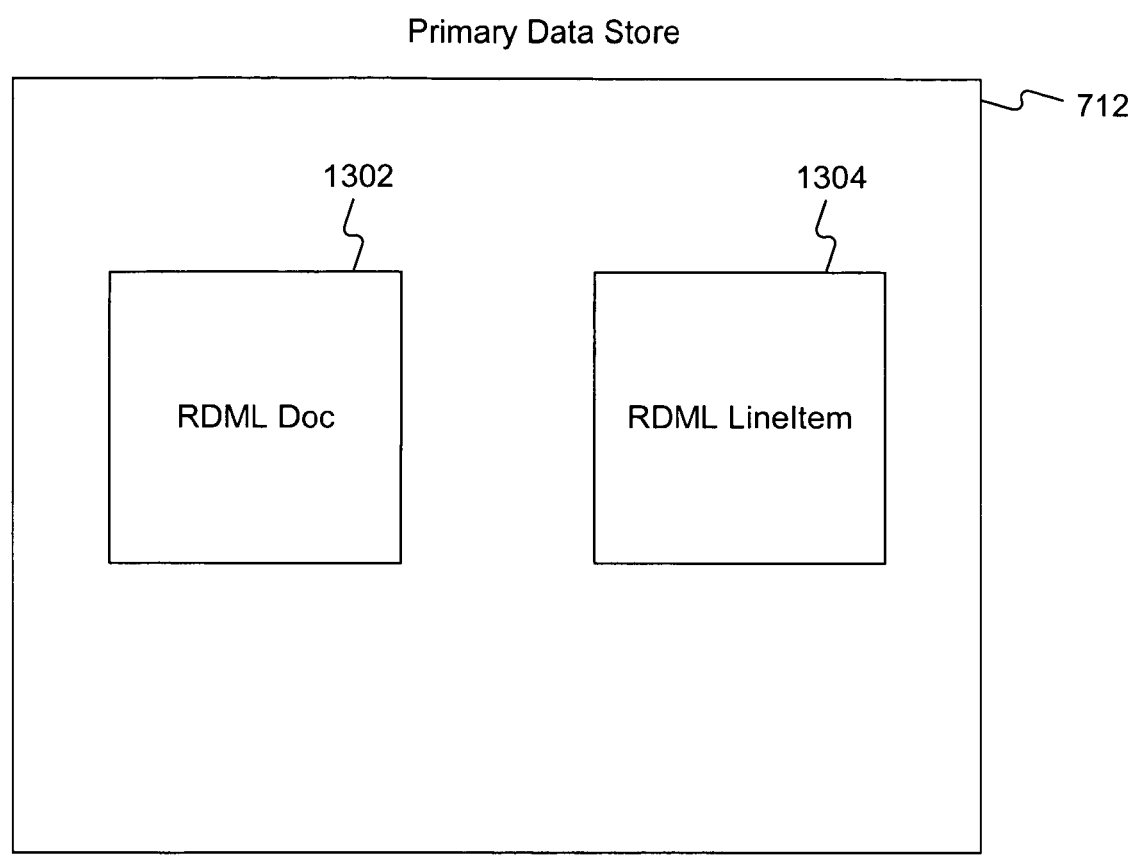
FIG. 13 depicts a primary data store of the RDML data viewer as shown in FIG. 7A.

FIG. 13 depicts a primary data store 712 and some objects which it stores. The primary data store 712 is a cache of loaded RDML documents 102 that may be implemented in a number of ways (e.g., as a vector, as a dictionary or hash table, or as some other collection of objects).

Once the X-value transformer 710 has determined an active or standby status for a newly arrived data document 102, and made any necessary modifications to the x-values, it passes a new RDMLDoc object 1302 to the PDS 712, which manages its communications with the various views or plug-in applications. This PDS 712 central storage allows the different views (716, 720, 724, and 728) to have access to an object 1302 representing the original source data. The individual views (described below) make their own copies of the portions of the data that they need, and in whatever transformed form they require. The PDS object 712 generally does not perform transformations on data; it simply holds them, adds and removes them, and makes them available in a public interface to other objects. Table 1 below shows an exemplary class diagram of the PDS object 712. Note that vectors are used to hold the RDML documents 102 in this implementation; it would also be possible to use a hash table or collection data structure.

TABLE 1

PrimaryDataStorage

-Active_RDMLDocs : Vector
-Active_RDMLLines : Vector
-Standby_RDMLDocs : Vector
-Standby_RDMLLines : Vector
+Add_RDMLDoc(rdmldoc : RDMLDoc) : void
+Add_RDMLLine(rdml_li : RDMLLineItem) : void
+getRDMLDoc(rdmldoc : RDMLDoc, Status : int) : RDMLDoc
+getRDMLLineItem(rdml_li : RDMLLineItem, status : int) : RDMLLineItem
+getNumRDMLDocs( ) : int
+getNumRDMLLineItems( ) : int
+clearRDMLDoc(rdmldoc : RDMLDoc) : void
+clearRDMLLineItem(rdml_li : RDMLLineItem) : void In the class diagram, the upper section lists the object's variable names followed by their types. The lower section lists the method names with the argument name and type in parentheses followed by the method output type. As shown, the PDS 712 provides variables and methods for storing active and standby RDMLDocs 1302 and RDMLLineItems 1304. The PDS 712 object includes methods to add, retrieve and clear documents and line items, in addition to methods for determining the number of documents and line items.

An RDMLDoc object 1302 is a full internal representation of the RDML document 102. It contains as its central attribute the tree-structured data elements contained in the document's original tags and implements the DOM interface. Applications that work with DOM objects may also work with RDMLDoc objects 1302. The RDMLDoc object 1302 provides a higher level interface for the different views of the RDML data viewer 100. The Table 2 below shows a class diagram of an exemplary RDMLDoc object 1302 in accordance with the present invention.

TABLE 2

RDMLDoc

-txDoc1 : txDocument
+RDMLDoc( ) : RDMLDoc
+createDoc(filename : String) : TXDocument
+getAttributeValue(elementname : String, attributeName : String) : String
+getAttValue(lev1_tag : String, lev2_tag : String, lev3_tag : String, att_name : String) : String
+getData_xDefaults( ) : JCVector
+getLinkAttValue(element : String, index : int, attname : String) : Atring
+getLinkText(element : String, index : int) : String
+getNumLineItems( ) : int
+getNumLinksForElement(elementname : String) : int
+getRDMLLineItem(att_name : String, att_value : String) : RDMLLineItem
+getTXDoc( ) : TXDocument
+makeRDMLLineItem(li : Node) : RDMLLineItem
+parseCommaDelimString(in : String) : JCVector
+setTXDoc(txDoc_in : TXDocument) : void
+traverseDOMBranch(node : Node) : void Described below are class methods shown in Table 2 of an RDMLDoc object 1302 in accordance with one implementation consistent with the present invention. First, RDMLDoc( ) is a constructor for creating an internal RDMLDoc object 1302. The method "createDoc" reads in the file indicated by an input URL, parses it, and creates a new TXDocument which the user then usually assigns to this RDMLDoc object 1302. A TXDocument is an object which implements the Document Object Model (DOM) interface. The TXDocument creates the DOM structure for the file and "wraps" it with various access and administrative methods. It is the DOM-compliant original representation of the document. The "setTXDoc" method sets the underlying TXDocument, and initializes object properties such as the number of line items, and "getTXDoc" returns the underlying TXDocument.

Whereas an RDML document 102 forms a tree of elements having attributes with values, the "getAttributeValue" method returns the attribute values for the named element, and "getAttVal" returns as a string the attribute value found at an inputted element name and attribute name. The "getLinkAttValue" method gets the attribute value of a hyperlink element, according to the element name and attribute specified and "getLinkText" gets the corresponding hyperlink text.

When called, "getNumLineItems" returns the number of line items in the RDMLDoc 1302 and similarly "getNumLinksForElement" returns the number of links for an element.

The "getRDMLLineItem" method supplies the first RDMLLineItem 1304 (described below) based on the value of a particular attribute. For example, specifying "li-ID" and "3" will return the RDML Line item in which the "li-ID" attribute equals "3." The method called "makeRDMLLineItem" takes the indicated node, assigns it to a new RDMLLineItem object 1304 and initializes the object.

The method "getData_Defaults" returns a vector of the default x-values. Furthermore, "parseCommaDelimString" takes a comma-delimited string as input and returns the values between commas as elements of a vector and returns a vector of the strings. Finally, "traverseDOMBranch" takes an input node as a parameter and then traverses from that node downwards, and at each node, an operation, such as finding an element with a particular name, may occur.

Similar to the RDMLDoc object 1302, the "RDMLLineItem" 1304 is an object that provides high-level methods for retrieving data on a line item, any associated links or notes, and the attributes. The views of the RDML data viewer 100 work with RDMLDocs 1302 and RDMLLineItems 1304 to create their presentations. Table 3 shows a class diagram for an exemplary RDMLLineItem object 1304.

TABLE 3

| RDMLLineItem |
|---|
| −data_x : TXElement |
| −data_y : TXElement |
| −jcvdata_x : JCVector |
| −jcvdata_y : JCVector |
| −li : TXElement |
| −line_item_set_att : NamedNodeMap |
| +RDMLLineItem( ) : void |
| +get_jcvData_X( ) : JCVector |
| +get_jcvData_Y( ) : JCVector |
| +get_strX_Value(index : int) : String |
| +get_strY_Value(index : int) : String |
| +getAttributeValue(attributeName : String) : String |
| +getLinkAttribute(index : int, attName : String) : String |
| +getLinkText(index : int) : String |
| +getNumDataPoints( ) : int |
| +getNumLinks( ) : int |
| +initLineItem(doc : RDMLDoc, lineitem : Node) : void |
| +set_li(input: TXElement) : void |

Described below are class methods shown on Table 3 of an RDMLLineItem 1304 in accordance with one implementation consistent with the present invention. Methods with the same name as described above in connection with the RDMLDoc object 1302 have the same general function although, since a line item is already specific to an element, the methods take different arguments because they typically do not need an element specified in the given arguments.

RDMLLineItem( ) is a constructor that creates an RDML LineItem object, and "initLineItem" initializes the line item to the values found in the RDMLDocument. The method "get_jcvData_X" d "get_jcvData_Y" return the x- and y-value vector for the indicated number of the line item. The "get_strX_Value" method and "get_strY_Value" return the x- and y-value at the number of the line item in the x_values vector as a string.

The "getNumDataPoints" method is called to receive the number of data points, i.e., the number of x-values, in a line item. The method "set_li" allows the calling routine to set the line item in the RDML document 102 that this particular RDMLLineItem is to represent.

Referring back to FIG. 7A, in one implementation consistent with the present invention, the chart manager object 714 takes up to six RDMLLineItems 1304 from the PDS 712 and displays them on a chart displayed on the graphical user interface 734 and is typically used in conjunction with the tree view 720 and the macro panel 732. When a user clicks a mouse on a line item in the tree view 720, that line item is added to the chart. When the user clicks the mouse on a macro line in the macro panel 732, the selected line items that are charted are transformed according to the programming of the macro. The chart manager 714 may be separated from the graphical chart view 716 to allow the ability to change chart software components easily should different or better graphic chart components become desirable.

Views

The data viewer 100 presents the user with a number of different views (716, 720, 724, and 728 as shown on FIG. 7A) which the user may use to view the information in RDML documents 102 stored in the PDS 712. These views include a chart view 716, which shows graphical charts and graphs of the data, and a tree view 720 showing hierarchical representations of line items. Additionally, the data viewer 100 presents a spreadsheet view 724 which shows a data sheet similar to a spreadsheet, and a footnote view 728 which shows the text of footnotes associated with RDML documents 100. The views are discussed in detail below.

IV.A.5. Chart View

Upon receiving RDML markup documents, the chart view transforms, formats, manipulates and displays data stored in the markup documents using the attributes describing the meaning of the data. The chart view uses the attributes of the numbers to, for example, facilitate the simultaneous display of different series of numbers of different types on a single chart and automatically display appropriate descriptive textual components.

As an example, the chart view automatically determines when a first series is in the "U.S. dollars" and the second series is in "French francs"; it may automatically place them on separate axes or automatically translate the units. It can also determine the titles for these axes and set the labels on the axes. The chart constructs itself automatically using the attributes of the individual elements of the markup document, and these actions may be initiated with a single mouse click.

FIGS. 14A-F depict the chart view 716 in the top half of the screen, and the tree view 720 in the lower half. The chart view 716 has two primary components: the chart itself and the chart legend 1402. The line item 1206 that has been selected in the tree view 720 is automatically graphed in the chart 716. The chart manager 714 generally has three primary responsibilities: (1) collecting messages from the tree view 720, macro panel 732 and main menu (not shown) regarding changes to make to the chart 716, (2) obtaining the correct line items or macros from the PDS 712 or the macro manager 732, and coordinating transformations to the data, and (3) managing the chart's data object (the "chart data" object 715), which contains the data in the form in which it will be used in the chart, and the attributes of those line items.

Generally, the chart manager 714 handles updates and manipulations to the chart itself (e.g., axes, labels, etc.) while the chart data object 715 handles the plotting of the data on the chart 716. The chart manager object 714 provides the information the chart data object 715 needs to update its internal data structures. Chart data 715 is a data model that is used by the central graphical chart 716 to paint itself, but other components also use the data: the footnotes, the chart legends and titles, and any macros that are operating on the data.

One way to visualize the role of the chart manager 714 (and its data partner, the chart data object 715) is to view the steps of a method of a complete sample scenario: the user has selected a line item 1206 in the tree view 720 and the chart manager 714 is notified that this line item is to be added to the chart 716. There are various ways to set up the chart data/chart manager architecture. One way described in detail below is to create the chart up front and then feed it changes in data (initialization, clearing, updating data series, etc.) A second general approach is to use the data to create a new chart upon every request for a change.

Figure 14A:
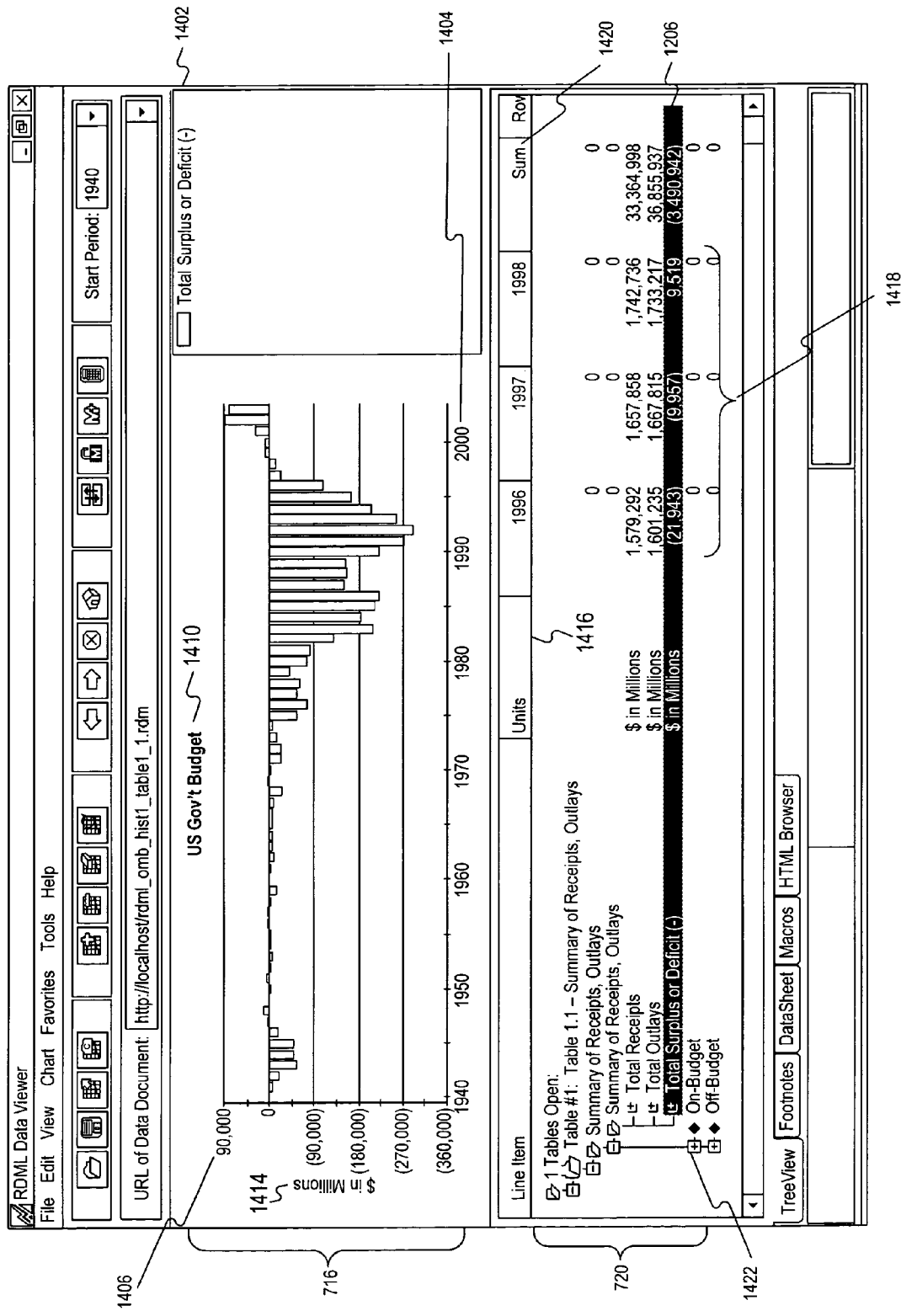
FIGS. 14A-14F depict a chart view and tree view of the RDML data viewer as depicted in FIG. 7A in accordance with methods and systems consistent with the present invention.
Figure 14B:
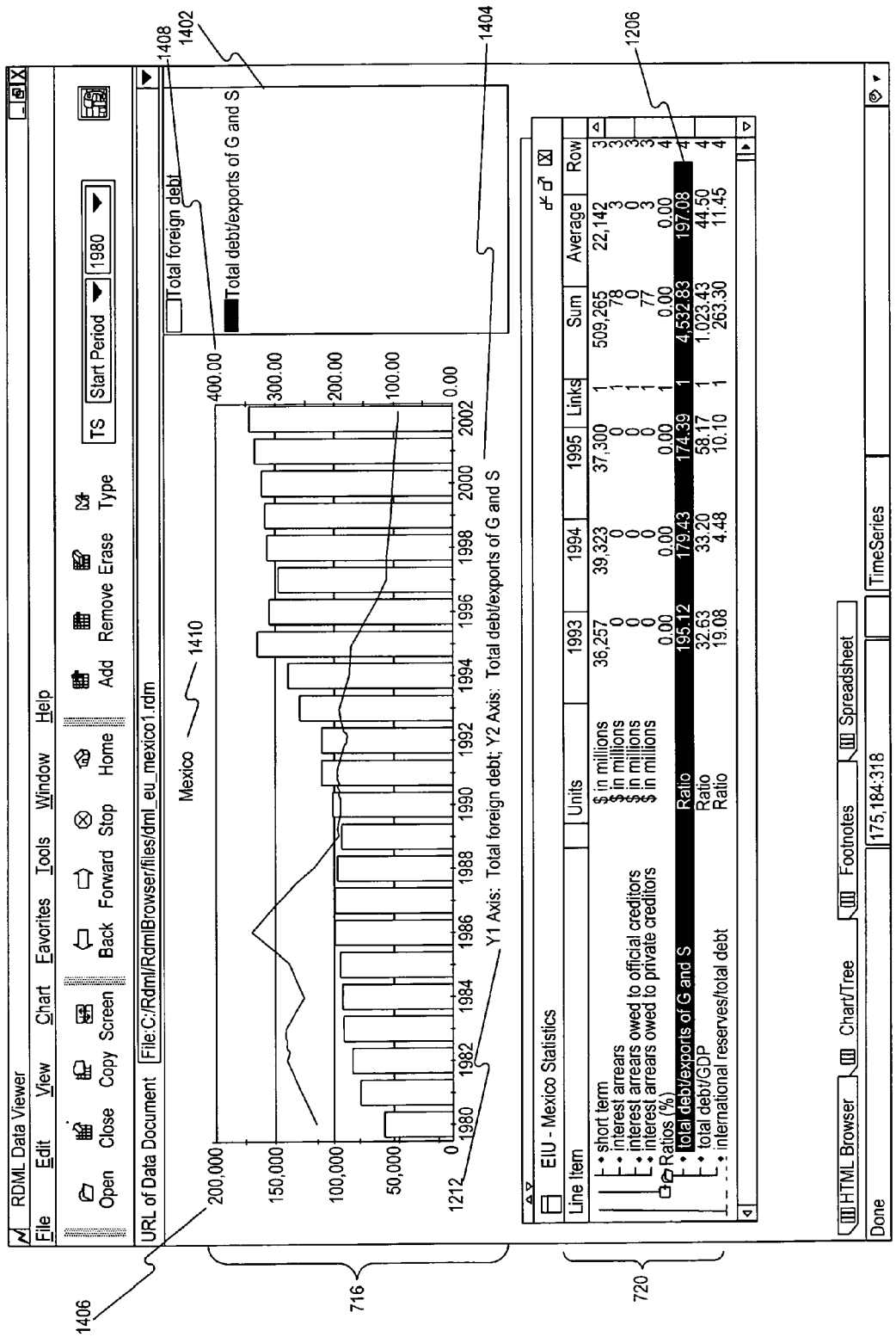

FIGS. 14A-F will now be described in greater detail, and in particular, FIGS. 14A and 14B will be described in connection with FIGS. 15A, 15B, and 15C, which illustrate steps of a method for updating a chart view 716 upon the selection of a line item 1206 in the tree view 720 in an exemplary scenario in accordance with the present invention. FIG. 15A illustrates steps mainly involving the tree view 720 and graphical interface 734, while FIGS. 15B and 15C illustrate steps mainly involving the chart data object 715 and chart manager 714 respectively.

As illustrated in FIG. 15A, a user selects a line item 1206 in the tree view 720 on the graphical interface 734 (step 1502). The tree view 720 obtains the ID of the selected line item 1206 (step 1504) and removes any old macros that are applied (step 1506). The chart manager 714 then deletes the last series (displayed data of a line item) from the chart view 716 to make way for the newly selected line item (step 1508).

Figure 15A:
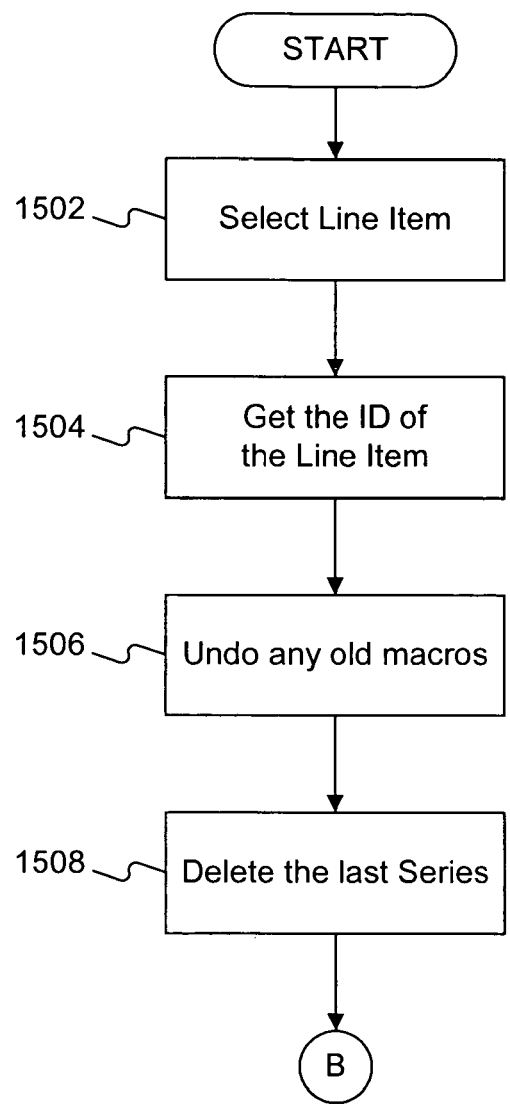
FIGS. 15A-15C depict flowcharts of the steps performed by a graphical user interface, chart manager and chart data object for adding a line item to a chart view upon selection of the line item in a tree view in accordance with methods and systems consistent with the present invention.
Figure 15B:
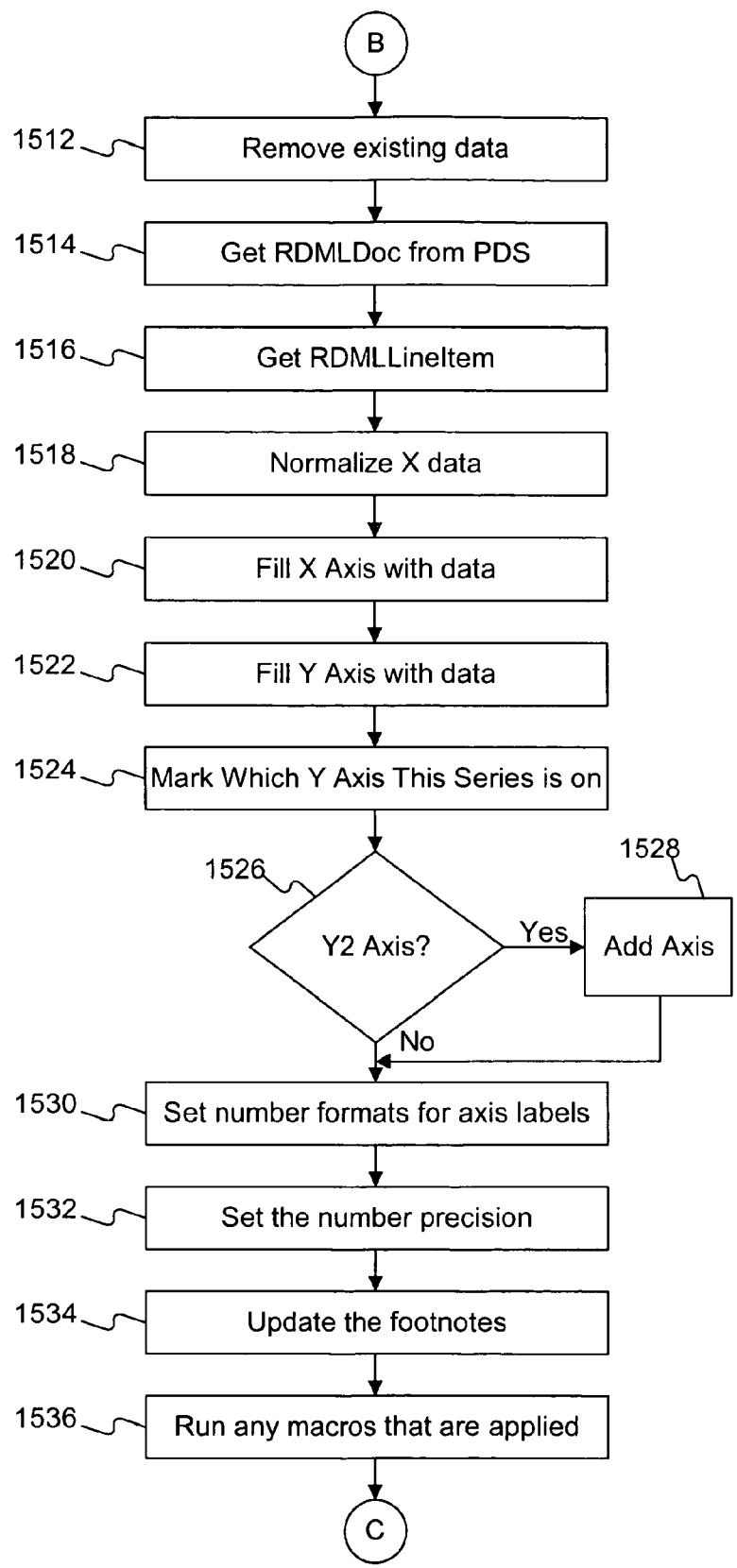

Referring now to FIG. 15B, the chart data object 715 removes existing data from the chart 716 (step 1512). It then obtains the RDMLDoc object 1302 from the PDS 712 (step 1514) and the RDMLLineItem object 1304 from the RDMLDoc object (step 1516). After doing this, the chart data object 715 normalizes the x-value data (step 1518). For example, if one charted series displays data from 1961 to 1998, and the new one displays data from 1973 to 2005, the chart data object 715 ensures that the chart displays data from 1961 to 2005. The chart data object 715 then fills the x-axis 1404 with data (step 1520) and fills the y-axis 1406 with data (step 1522).

As shown in FIG. 14B, a chart may have more than one y-axis 1406 charted at a time, (i.e., a different y-axis on either side of the chart) to display multiple line items simultaneously. Thus, the chart data object 715 further marks which y-axis the series is on (step 1524), and if it is on a Y2 axis 1408 (a second y axis) (step 1526), it adds that axis (step 1528). The chart data object 715 sets the number formats for the axis labels 1406 and 1408 (step 1530) and sets the number precision (step 1532). Finally, it updates the footnotes (step 1534) and runs any macros that are applied (step 1536).

Referring now to FIG. 15C, the chart manager 714 then sets the Y1 title (step 1538) and the Y2 title (step 1540) using line item attributes. After that, it updates the series styles (step 1542), the chart title 1410 (step 1544), the legend 1402 (step 1546), and the x-axis 1404 (step 1548). After these updates, and the chart manager 714 updates the number precision (step 1550), the y-axis 1406 (step 1552) and the chart types (i.e., area, bar, stacked bar, line, pies, points, etc.) (step 1554). Subsequently, it updates the footer 1412 (step 1556) and sets the maximum x-value to the extent of the last used value, disposing of blanks on the right side of the chart 716 (step 1558). Finally, the graphical interface 734 repaints the graphical chart 716 with the newly created updates (step 1560).

The chart manager 714 and chart view 716 can chart different series types on a single chart and handle transformations automatically. Because two (or more) data series may be placed on the chart 716 from different source documents 102, they are synchronized for purposes of placing them on the common graph. The chart manager 714 uses data_x elements or the metadata tags to automatically transform data to permit different series types to appear together on a chart. It recognizes, for example, when a first series is in "US Dollars" and a second series is in "French Francs"; it makes arrangements automatically to place them on separate axes. There is no need for the user to go through a charting "wizard" or to find, understand, and translate the various units, titles, and adjustments. One click on each of the series' lines in the tree view 720 (potentially with a modifier key (e.g., the CTRL key) depressed) instructs the chart view 716 to construct itself given the metadata of the individual elements. The chart manager 714 and chart data object 715 consider and take into account the following in updating the chart: the unit type, magnitude, scale, modifier, measure, y-axis title, chart title, chart footnote, precision, number format, chart type (line, bar, etc.), legend and colors of the various components.

The data viewer 100 also permits the adding of a series to a chart using a single click or command. Adding a series to a chart increases the number of series displayed on the chart. In conventional spreadsheets, charting programs, and data graphical interfaces, this task requires the user to either rebuild the whole chart through the wizard, fill in a dialog box with information on the new series, or add the numbers by custom programming. When the data viewer 100 adds the new series to the chart with a single mouse click. The existing data is maintained as it was, and any necessary changes to the chart's type, format, scale, etc. is made automatically by the chart manager 714 and chart view 716 to accommodate the new series.

Just as a series can be added with one mouse click (or one command from the menu), so can it be removed. There is no need for the user to worry about accidentally deleting something, as no actual information is lost from the data viewer 100. It can always be added back to the chart 716 with a simple mouse click.

The chart view 716 also supplies an expandable legend 1402 as shown on FIG. 14A. A significant problem for most users of spreadsheet programs has been the inability of the user to control the size, format, and handling of the legend 1402. The result is that charts usually end up with legends such as "MSFT" and "SUNW," rather than longer descriptions with multiple colors and fonts, word-wrapping and other readability enhancements. The chart view 716 chart provides legends that (1) can grow to unlimited sizes, (2) support word-wrapping, (3) can contain multiple fonts, (4) can contain multiple font types (bold, italics, normal), and (5) can contain varying colors for emphasis. If the legend information (typically stored in the li_legend attribute) for a line item is too long for the legend box on the chart, the information may word-wrap and scroll to accommodate the additional information.

The chart view 716 permits further convenience by automatically specifying the y-axis title 1414. Current spreadsheet and charting programs require the user to provide a y-axis title, usually through a chart wizard or by specifying a location to look up a title. The RDML shifts this burden to the data originator, who is in a better position to accurately specify the description of the y-axis values. The y-axis title 1414 specified by the data originator is placed in an attribute field (y_axis_title) of the line item element tag and is used by the chart view 716 as the default y-axis title 1414 when the line item is added to the chart view 716.

Often, however, the user wants to make a change to the numbers and display the transformed series on the chart 716. In this case, the default y-axis title 1414 may no longer be correct. Rather than require the user to manually figure out what the new value description is (a process that could take several minutes or longer with current analytic programs), the chart manager 714 and chart view 716 data automatically generates a new y-axis title 1414 upon transformation of values using the information provided in the modified unit, magnitude, modifier, scale, measurement, and adjustment attributes of the line item 1206.

For example, suppose a first series is charted as "$ in Millions," and the user applies a macro that divides every number in the series by 1,000. The chart manager 714 automatically creates a new y-axis title 1414 of "$ in Billions." Number transformations can lead to quite complicated transformations of the y-axis title 1414. A user may multiply a first series ("Gallons in Millions") by a second series ("US $ per Gallon"); the result will be a series of numbers, a third series ("US $ in Millions"). If there are ambiguities, the data viewer 100 presents the user with a dialog box displaying all the known information regarding the quantities involved and requests that the user supply a title.

Similarly, the chart manager 714 and chart view 716 can automatically generate the x-axis title and chart titles 1410 using the metadata attributes. In addition to generating y-axis and x-axis titles, the data viewer 100 automatically performs the task of creating a new chart title 1410 when the charted series are changed or when multiple series are added to the same chart. For example, a first series has a default chart title of "Total Sales," a second series has a default chart title of "Total Expenses," and a third series has a default chart title of "Total Sales." The data viewer 100 will create a combined chart title of "Total Sales; Total Expenditures" by combining the dissimilar elements, and eliminating the duplicate elements.

Three examples illustrate other types of automatic title manipulation. In the first example, suppose a chart has two series placed on it: Series A has a title of "GDP" and a legend of "China", and Series B has a title of "GDP" and a legend of "Malaysia". If both are put on the chart, the titles will duplicate each other. In one implementation consistent with the present invention, duplicate titles are removed such that the title for this chart will be simply "GDP". Because the series legends are different, the legend on the side of the chart will have two entries: "China" and "Malaysia".

As a second example, suppose the legends are duplicative: Series A has a title of "China" and a legend of "GDP", and Series B has a title of "Malaysia" and a legend of "GDP". Because both legend entries would be "GDP", there may be confusion about which legend applies to which line on the chart. In this case, the data viewer 100 transposes the legend and chart title entries such that the result is the same as in the first example above; the title of the chart is "GDP" (the duplicate is removed) and the legend entries are "China" and "Malaysia".

Finally, in a third example, suppose the series have different titles and different legends. Series A has a title of "GDP" and a legend of "China", and Series B has a title of "National Savings" and a legend of "Malaysia". The legends are left as is, and a new chart title is created by appending one to the other separated by a ";". The chart title on the display thus becomes "GDP; National Savings", and the first legend becomes "GDP—China" and the second legend becomes "National Savings—Malaysia". All three of these changes are string manipulations (selecting and/or appending).

The chart manager 714 and chart view 716 can also automatically trim beginning and ending x-values 1404, thus relieving the user of the need to trim null leading and trailing values from charts. In conventional spreadsheet and charting programs, chart pointers must be recreated or manually adjusted when the underlying data is enlarged or shortened. For example, if a series is charted that runs from 1990 to 1998 and it is replaced by data from 1990 to 1996, there would be two blank spaces at the right side of the chart. The data viewer 100 and chart manager 714 avoid this and similar problems by handling missing or null values at the front or back of line items as indications that the chart should be automatically restructured.

The chart manager 714 also automatically formats the x- and y-axis labels 1404 and 1406. RDML shifts the burden of formatting the numbers on the x-axis 1404 and y-axis 1406 from the user (of which there may be thousands or millions, each reformatting the numbers manually one or more times) to the data originator (of which there is one, who only has to do it once.) The format templates are regular expression strings found in current spreadsheets and programming languages. The data viewer 100 uses the formatting strings for the axis labels on the chart view 716, for the numbers in the tree view 720, and as defaults for the numbers in reports. The formatting templates are automatically changed if a macro moves the numbers outside of the precision range that is legible on the chart 716, or out of a format that makes sense in the tree view 720 or in a report.

As stated previously, one of the RDML line item element attributes is the precision of the number, the number of significant digits to be displayed in a chart. Unlike conventional products, which leave this entirely up to the user to figure out, the data viewer 100 uses the specified precision to set the scale of the y-axis 1406, and the format and precision of its labels and tick marks.

Additionally, the chart manager 714 automatically creates and removes a second y-axis 1408 as shown on FIG. 14B. A chart with two dissimilar series plotted on it will require two axes. The y-values may not be of the same units, measures or scales. A user might, for example, have plotted a series denominated "$ in Millions" and then want to add to the same chart 716 a series denominated "% of GDP," and these two series cannot share a common y-axis. Chart manager 714 recognizes this incompatibility, creates a new y-axis 1408, and directs all subsequent formatting, macros, etc., to the proper axis. Current spreadsheets and charting programs require that the user restructure the chart with a charting wizard (entailing many directives to be entered, and much trial and error to get the various scales, colors, etc., correct), or by custom programming. The data viewer 100 automates this process, creating and formatting a new axis if required by the specifics of the unit and scale attributes of the line items. If the series is removed from the chart, the associated axis is removed and the various scales, colors, etc., of the remaining series are updated to make the chart readable immediately.

Table 4 shows a class diagram of the chart manager 714.

TABLE 4

ChartManager

-chart1 : JCChartComponent
-chart_data : ChartData
-chart_legend : ChartLegend
-chart_title : JCTitle
-CDV1 : ChartDataView
-CDV2 : ChartDataView
-DS : DataStore
-LineColors : JCVector
-mainFrame : MainFrame
-series1 : ChartDataViewSeries
-series2 : ChartDataViewSeries
-x_value_labels : JCVector
-xaxis : JCAxis
-xtitle : JCTitle
-y1axis : JCAxis
-y1title : JCTitle
-y2axis : JCAxis
-y2title : JCTitle
-yLabelGenerator1 : YLabelGenerator
-yLabelGenerator2 : YLabelGenerator
+addSeries(key : String) : void
+addY2Axis( ) : void
+ChartManager(mainFrame : MainFrame, chart_comp : JCChartComponent, legend : ChartLegend) : void
+checkYAxisTitle(series : int, y1title : JCAxisTitle, y2title : JCAxisTitle) : int
+deleteLastSeries( ) : void
+deleteSeriesAfterFirst( ) : void
+getAddSeriesFlag( ) : boolean
+getChartData( ) : ChartData
+getYAxisTitle(series : int) : String
+initChart( ) : void
+markWhichYAxis(num_series : int) : void
+replotChart( ) : void
+replotSeries( ) : void
+resetChart( ) : void
+setAddSeriesFlag(flag : boolean) : void
+setChartType(type : int) : void
+setDataStore(ds : DataStore) : void
+setStartPeriod(sp : String) : void
+updateChartTitle( ) : void
+updateChartTypes( ) : void
+updateFooter(num_series : int) : void
+updateFootnotes( ) : void
+updateLegend( ) : void
+updatePrecision( ) : void
+updateSeriesStyles(num_series_local : int) : void
+updateXAxis( ) : void
+updateYAxis(num_series_local : int) : void Class methods of a chart manager object in accordance with one implementation consistent with the present invention are described below. ChartManager( ) is a constructor for the chart manager object 714, and "initChart" initializes the chart to be empty, and "getChartData" gets the chart data object 715.

The method "addSeries" adds a series to the chart while "deleteLastSeries" removes the last added series. Similarly, "deleteSeriesAfterFirst" deletes all series beyond the first series.

A series flag is set to "true" if the next series is to be added in addition to the already charted series. A "false" flag tells the chart to erase the last current series and replace it with the new series. The methods "getAddSeriesFlag" and "setAddSeriesFlag" retrieve and set this flag.

The method "getYAxisTitle" returns the y-axis title, and "checkYaxisTitle" checks the current y-axis title to see if the newly plotted series is to be on the current axis, or if a new axis is to be created. "AddY2Axis" adds a second y-axis to the chart if needed. The method "markWhichYAxis" tells the ChartData object which axis the new line item has been plotted on.

The method "resetChart" resets the chart to the state it was in when the data viewer 100 started while "replotChart" updates the physical aspects of the chart. Similarly, "replotSeries" replots a series due to changes.

The "setChartType" method tells the chart manager what chart type to display upon calling replotChart, and "setDataStore" tells the chart manager what data store object 712 it will be dealing with. If the data is a time series, "setStartPeriod" sets the internal variable for the starting period of the chart. Finally, the update methods each update the corresponding aspect of the chart in response to potential manipulations or changes, e.g., "updatePrecision" updates the precision of the chart.

Table 5 shows a class diagram of the chart data object 715.

TABLE 5

ChartData

-chtData : JCVector
-chtHeader : JCVector
-cm : ChartManager
-originalPlottedYear : String
-start_period : String
-zeroData : String[ ][ ]
+addSeriesToChart(ds : DStore, key : String) : void
+decrementNumSeries( ) : void
+deleteLastSeries( ) : void
+deleteSeriesAfterFirst( ) : void
+fillXAxis_CT(rdml_li : RDMLLineItem) : void
+fillXAxis_TS(rdml_li : RDMLLineItem, yearsDiff : int, sizeDiff : int) : void
+fillYAxis_CT( ) : void
+fillYAxis_TS(rdml_li : RDMLLineItem, start : int, yearsDiff : int, sizeDiff : int) : void
+getAddSeriesFlag( ) : boolean
+getChtData( ) : JCVector
+getChtHeader( ) : JCVector
+getChtHeaderElement(series : int, element : String) : String
+getDataInterpretation( ) : int
+getDataItem(row : int, column : int) : Object
+getDifferencesInX(rdml_li : RDMLLineItem, yearsDiff : int[ ], sizeDiff : int[ ]) : void
+getName(series : int) : String
+getNumRows( ) : int
+getNumSeries( ) : int
+getPointLabels( ) : String[ ]
+getRow(row : int) : Vector
+getSeriesLabel(series : int) : String
+getSeriesName(series : int) : String
+getStartPeriod( ) : String
+incrementNumSeries( ) : void
+normalizeValues(rdml_li : RDMLLineItem, xory : int, yearsDiff : int, sizeDiff : int) : JCVector
+setAddSeriesFlag(input : boolean) : void
+setChtData(jcvin : JCVector) : void
+setChtHeader(jcvin : JCVector) : void
+setChtHeaderElement(series : int, element : String, value : String) : void
+setDataItem(row : int, column : int, c : Object) : boolean
+setNumSeries(new_num : int) : void
+setOriginalPlottedPeriod(in : String) : void
+setStartPeriod(in : String) : void
+zeroChtData( ) : void Below are class methods shown in Table 5 of a chart data object in accordance with one implementation consistent with the present invention. Methods having names that are the same as methods in the chart manager are not described because they perform the same function on the data alone.

The chart data object uses the methods "fillXAxis_CT," "fillXAxis_TS," "fillYAxis_CT," and "fillYAxis_TS" to fill the x- and y-axes of time series and chart data sets. The methods "decrementNumSeries" and "incrementNumSeries" change a counter storing the number of series on the chart.

The method "getChtData" returns a vector of chtData, which is a vector of vectors: each element of the outer vector is a vector of data for one line item. The "getChtHeader" method returns a vector of chtHeader, which contains a vector of header information for each line item. This vector is a list of the values of the attributes of a line item, e.g., magnitude, title, etc., and "getChtHeaderElement" gets the value of a particular element from chtHeader for the indicated series.

Operating on data sets, "getName" returns the data set name, and "getNumRows" returns the number of rows in the data set. The method "getRow" returns one row of a series while "getSeriesLabel" returns the label. The "getDifferencesInX" method aligns the time periods for time series charts, and "getNumSeries" returns the number of series in the num_series variable. Many of the get methods have corresponding set methods that set the value instead of receiving it.

The chtData variable is a vector of vectors (each sub-vector is the data for one series), and "getDataItem" returns the data value in a particular row and column of chtData. Used by the constructor, "zeroChtData" posts an empty chart. The "getPointLabels" method returns an array of strings, each of which is a point label of chtData For a time series, "getStartPeriod" retrieves the start period of the time series, and "normalizeValues" normalizes values upon the addition of a series to the chart. The method "getDataInterpretation" returns either "array" or "general" to describe what form the data source structure is in. (A returned value of "array" is for Times Series and Category data—which share x values—, and a returned value of "general" is for XY data, in which X values are generally independent.)

IV.A.6. Tree View

Referring back to FIG. 14A, this screen shot further contains the tree view 720 on the lower half of the screen. The tree view 720 presents a hierarchical view of the data. The tree view 720 serves a different purpose than "datasheet view" of conventional spreadsheets and database management systems. It shows the numbers in their context visually. The user can see the dependency relationships, identify from icons and visual clues how the different line items are related to their parents, peers, and children. The "Units" column 1416 prominently displays the units, scales, magnitudes, etc., of each line item, an important display in mixed data sets, where the unit context changes from line item to line item.

Each line item in the various active RDML documents 102 is displayed in the original order. In the tree view 720, each RDML document 102 begins a new top level node. The information displayed in the tree view 720 is a summary of important data from and about the line item, not a display of all the data points as would be found in a typical spreadsheet view. Instead of presenting a potentially confusing matrix of raw data digits that make the discerning of patterns difficult, the tree view 720 shows, in one implementation, the following information for each line item: legend 1402, units 1416, three user-selectable representative data points 1418, and one or more summary columns 1420. In the example on FIG. 14A, there is some important documentation 1416 (description, units), some representative data 1418 (in this case, three years worth), and a summary data column 1420 (in this case, the sum of all the data points). The first column 1416 displays the legend of the line item. This is the plain language description; it is repeated in each view where identification of the line item must be made by a human.

The representative data columns 1418 in the tree view 720 give the user visual clues as the relative importance, the types, and the format of the line items. The RDML data viewer 100 permits the user to select different fields to be displayed. For example, one user might want to see "1940, 1970, 2000" to get a sense of the long term trends, while another might only wish to see "1998, 1999, 2000" to see the recent trends.

The summary column 1420 allows the user to choose a statistic that is either desired to understand the lines and their context better, or that is desired for purposes of sorting the columns from greatest to least or vice versa. Any of the columns can be sorted simply by clicking on them.

The summary column provides much easier statistics for the user than database or spreadsheet formulas because the RDML data viewer 100 provides one-click selection of statistical methods, thus removing the need to write formulas, adjust for missing values, handle nulls in the denominators, etc. Some examples of summary statistics include: (1) sum, (2) average (3), median, (4) minimum, (5) maximum, (6) moving average, (7) variance/standard deviation, (8) % difference (selected periods or categories), (9) % of parent, (10) % of specified line item, (11) correlation with parent, and (12) custom formulas. For each of these statistical measures, the RDML data viewer 100 provides a dialog box in which the user can adjust the assumptions. For example, the "moving average" can be for one period, five periods, ten periods, and so forth.

The tree view 720 emphasizes that line items are the primary data unit in the RDML data viewer 100, as opposed to single numbers as are found in spreadsheets as cells. Since each line item 1206 is an object, the RDML data viewer 100 may be thought of as an object-oriented spreadsheet. The icons 1422 for each line item identifies that line item's context. For example, a "+" icon 1422 indicates that adding that line item to its peers will produce the parent line item. This feature addresses a shortcoming of spreadsheets and database datasheet views: the inability to view formulas and data at the same time. It shows the user how the numbers are related to one another.

Conventional database management systems, spreadsheet and numerical analysis tools have no built-in indication of how one record is related to another. In relational databases, the position or row may have no relevance to its data. RDML and the tree view 720 changes this by making the position of a line item in a set a usable piece of information by a user, and icons 1422 may visually designate the relationship of a line item to its parent node.

In one implementation consistent with the present invention, the following values are used for relationship icons: (1) plus, (2) minus, (3) times, (4) divide, (5) equals, (6) computed at, (7) member, (8) collection, (9) child, (10) parent, (11) memo, (12) general, (13) note, (14) none, and (15) root.

Sub-line items may add up to the parent line item (or may be modified by other relationships of their sibling line items.) "Plus" may add to siblings while "minus" subtracts from them. For example, a line item called "Net Sales" may have two children: "Total Revenues" and "Cost of Goods Sold." If "Total Revenues" has an li_relationship attribute of "PLUS", and "Cost of Goods Sold" has one of "MINUS", then the treeview 720 can show that Net Sales is equal to Total Revenues minus Cost of Goods Sold. "TIMES" and "DIVIDE" show multiplication and division of line items respectively.

"EQUALS" is the same as "plus," but shows the result of calculations of line items above it in order. "COMPUTED AT" is used for assumptions, such as percentages, interest rates, etc., while "MEMBER" denotes that the line item is simply a member of a collection of line items denoted by the parent line item. In this case, no assumption is made regarding arithmetic relationship, if any.

"COLLECTION" denotes that the line item has child members one level directly below it and denotes the concepts of sets or collections. "CHILD" illustrates that the line item is simply a "child" of the "parent" line item. It implies a sort of descent, derivation, or inheritance. No assumption is made regarding arithmetic relationship, if any.

"MEMO" is a line item that might be of interest to those looking at the sibling line items, but which is not necessarily related to the siblings, while "GENERAL" is a generic designator. "NOTE" is usually used for line items with text values, and "NONE" denotes that no relationship is implied. "ROOT" states that the line item is the root line item.

The tree view 720 also provides other capabilities. It allows the user to chart multiple line items 1206 by holding down the "shift" key. Although number browsing can be done in the data viewer 100 with a mouse, it is also possible for users to graph line items using arrow keys. When the focus is on the tree view 720, navigating up and down with the arrow keys automatically chart the selected line item 1206. If the "shift" key is held down, the succeeding data series will be added to the chart, rather than just replacing the previously selected series.

Figure 14C:
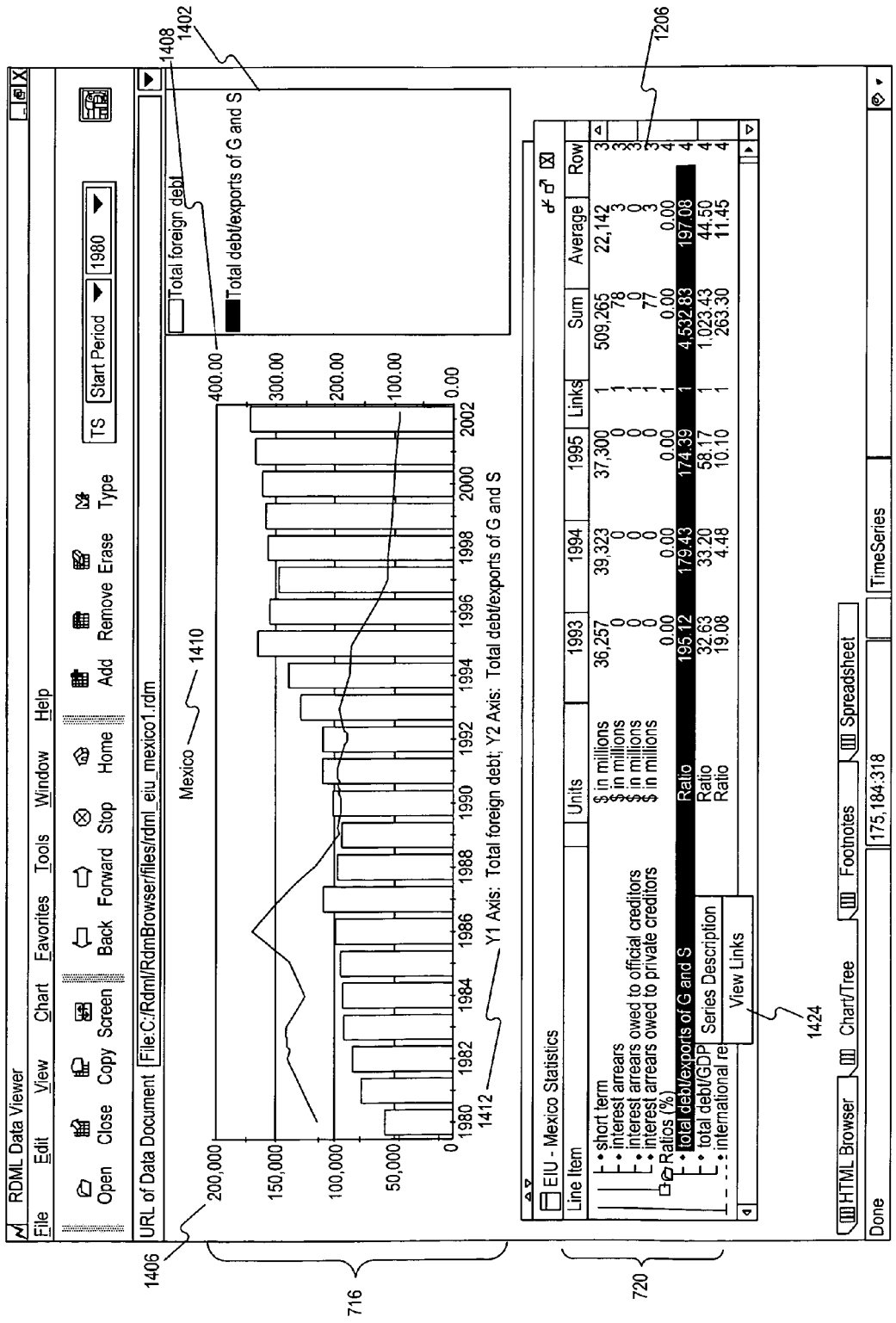
Figure 14D:
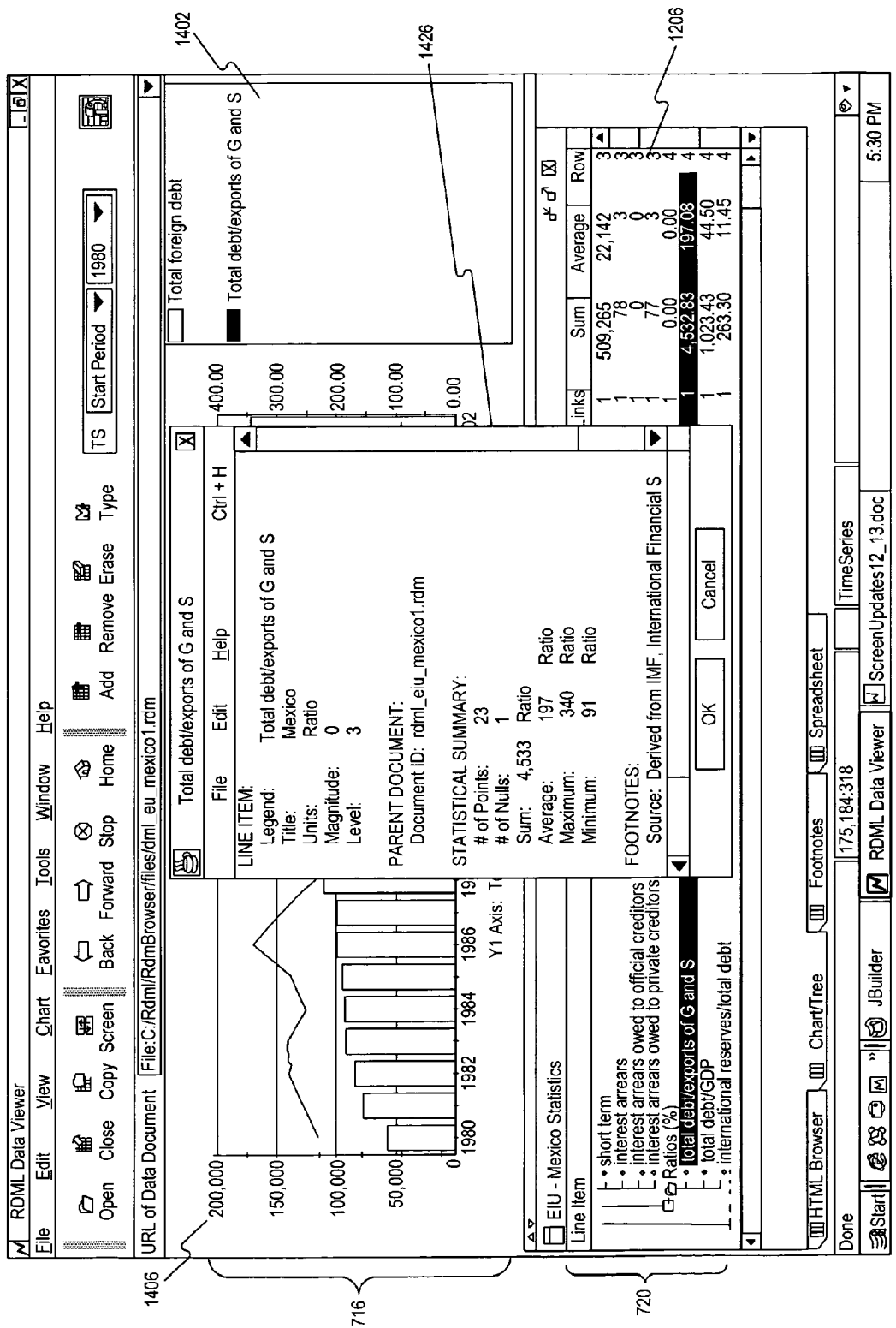
Figure 15C:
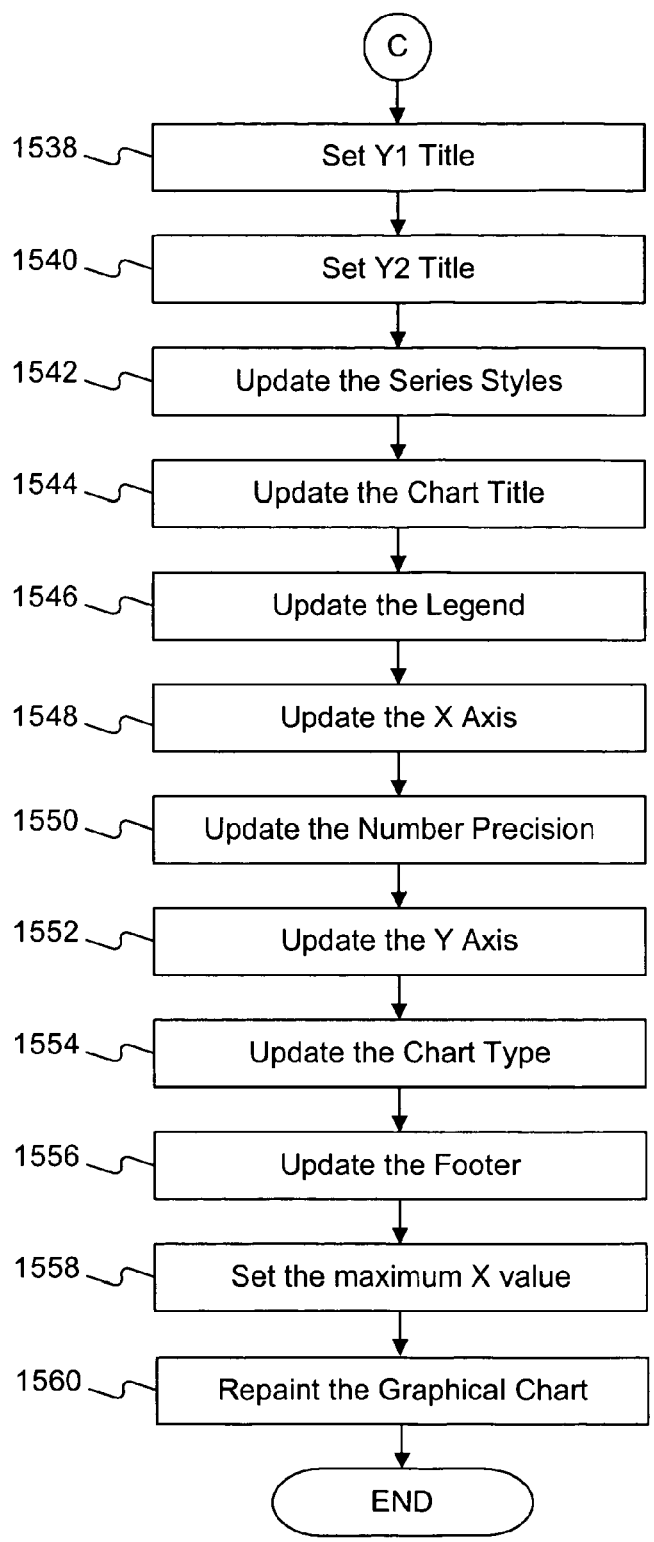

FIG. 14C shows that, in one implementation consistent with the present invention, when a user right-clicks on a selected series, a pop-up menu 1424 is displayed showing the different types of documentation available. As shown in FIG. 14D, selecting "description" shows a window 1426 containing information about the particular series, with the information being transferred from the tag form to a plain language, user-friendly format.

Figure 14E:
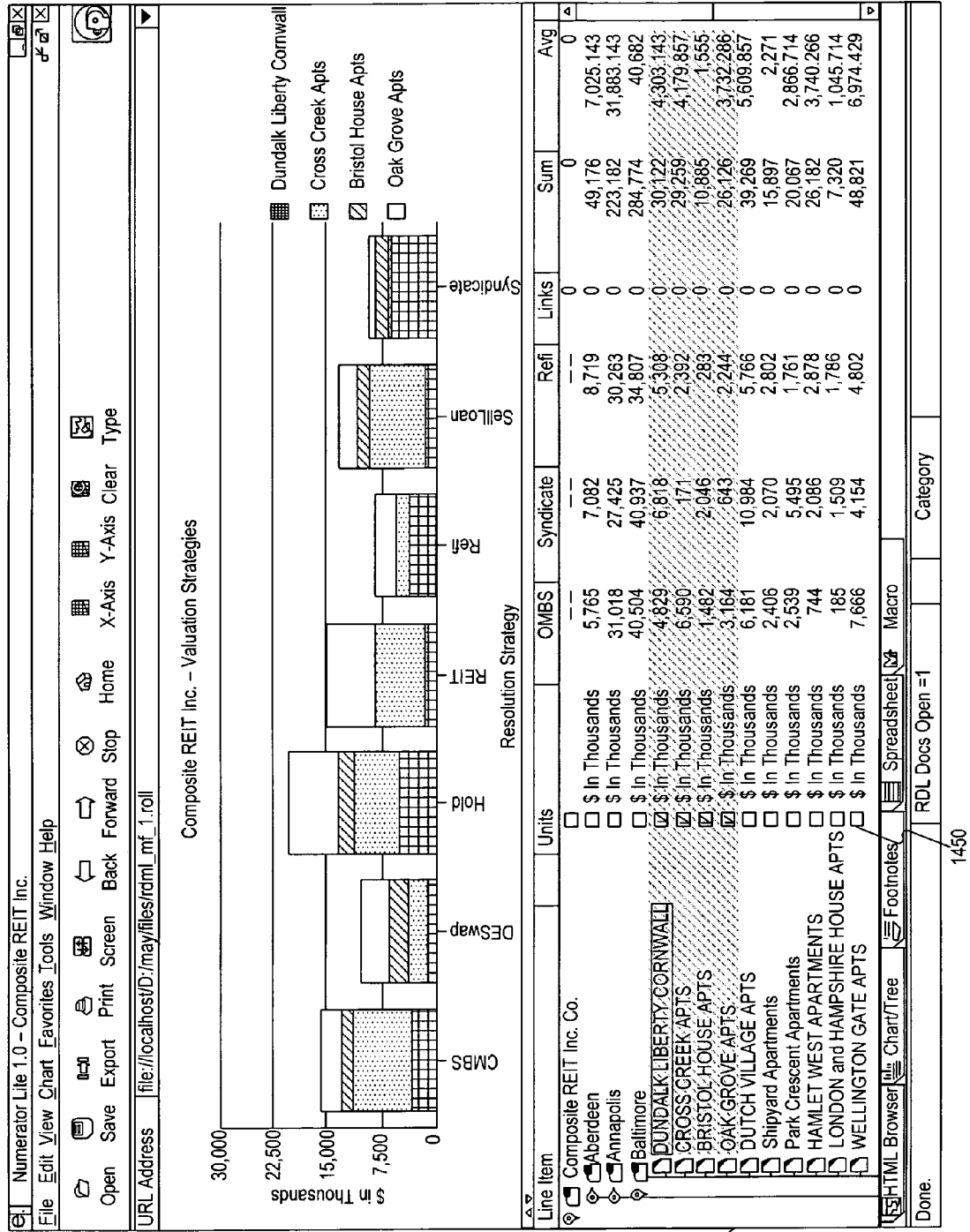

FIG. 14E shows that, in one implementation consistent with the present invention, the user may graph multiple line items simply by selecting different "checkboxes" 1450 in line items in the tree view 720. In this implementation, the collection of selected line items is passed to the chart data object, which is then charted by the chart manager 714.

In one embodiment of the present invention, the selection of a contiguous set of lines that is less than all the lines in the tree view 720 is facilitated through a series of mouse events. First, a mouse down event is performed over a line (e.g., Bristol Center). The mouse is then dragged down (highlighting lines in the process) to the last line to be included in the group (e.g., Hamlet West Center). By delaying the mouse up event while retaining the cursor over the last line to be included, the user is able to signal the system (and the system is able to detect) that all elements in the selected/highlighted group are to be added. Accordingly, the system checks their corresponding check boxes.

The tree view 720 further provides an easy way of creating an RDML document 102 through drag-and-drop techniques. In conventional spreadsheet and DBMS applications, it is possible to create new tables from existing ones by selecting the data rows and cutting and pasting them, or by writing a SQL query. In the tree view 720, creating a new RDML document 102 complete with necessary documentation can be performed by dragging and dropping the desired line items to an icon that represents the new document. Macros may also be created and manipulated in the same manner.

The data viewer 100 may also set macros to be executed automatically as the selected line items are changed. Known as "locking" of macros, this permits browsing through data in a transformed state.

Figure 14F:
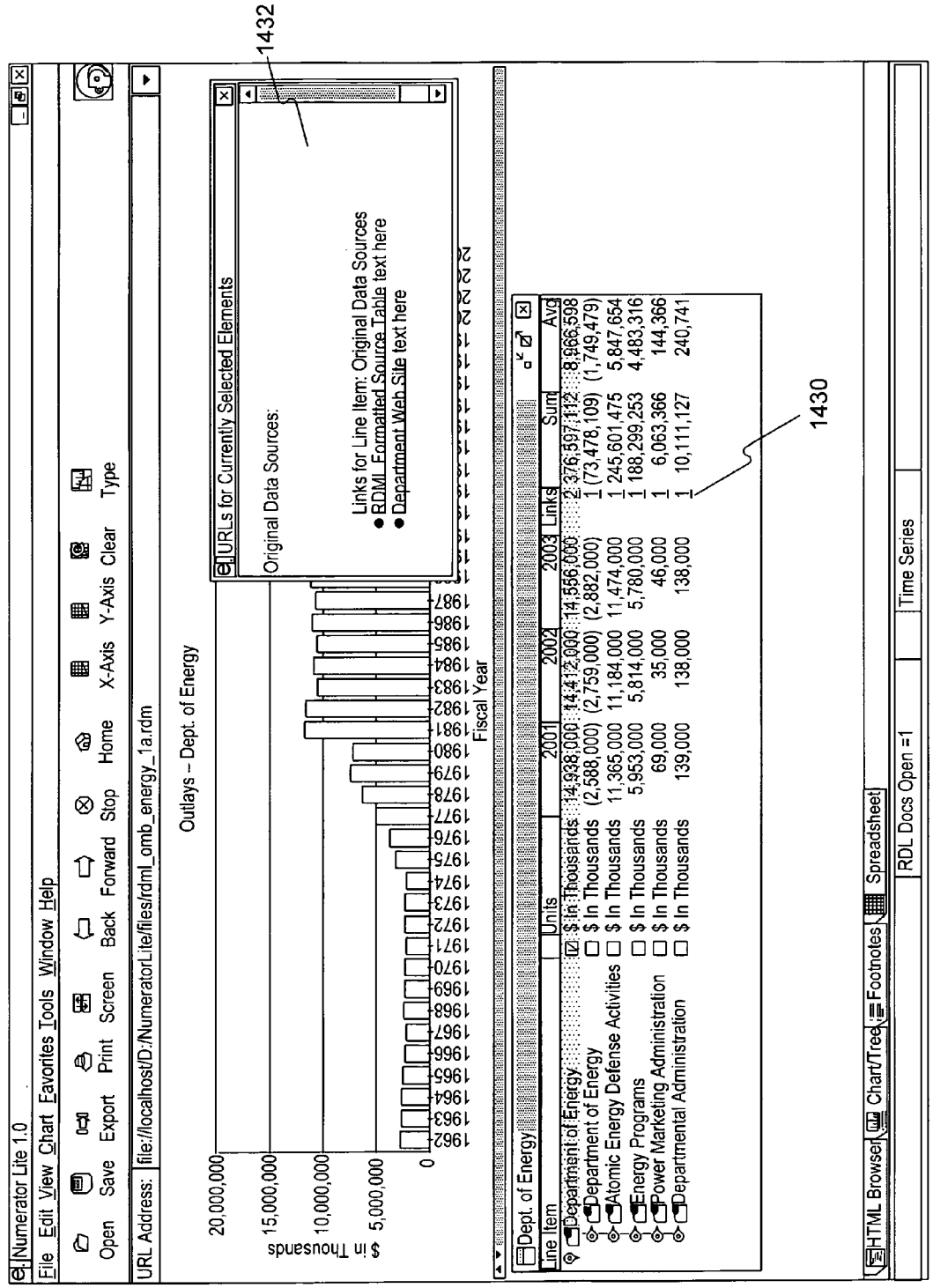

FIG. 14F shows that a line item may have a visual link associated with it that can be activated by a user. Upon activation of the link 1430, a list of associated hyperlinks 1432 is displayed for selection by the user. The link 1430 itself may indicate the number of associated hyperlinks 1432. The user may then select any of the hyperlinks to access the corresponding web site.

IV.A.7. Spreadsheet View

Figure 16:
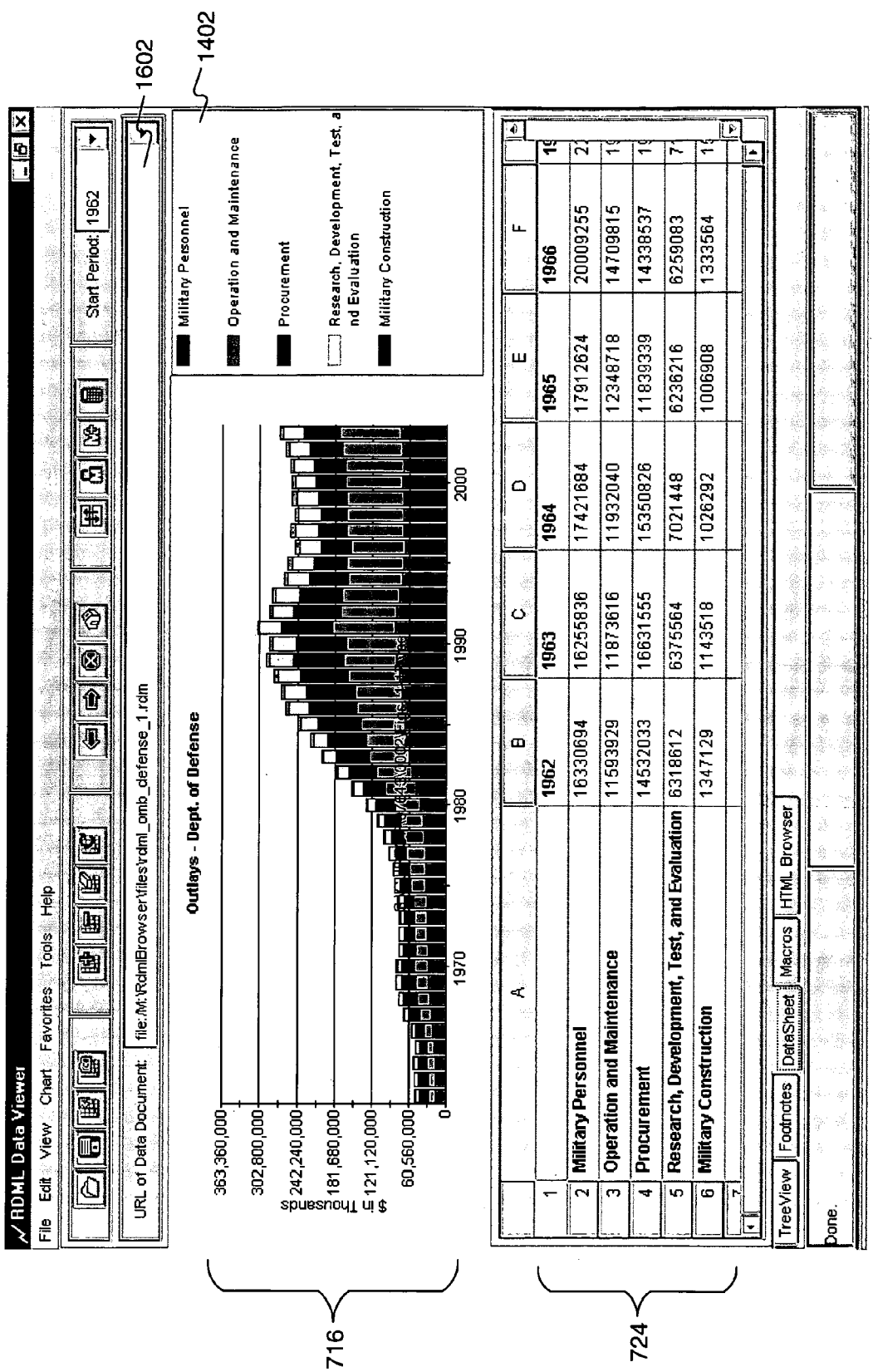
FIG. 16 depicts a spreadsheet view and a chart view of the data viewer in accordance with methods and systems consistent with the present invention.

FIG. 16 depicts a screen shot that shows the spreadsheet view 724 in the lower half and the chart view 716 in the top half. The ultimate goal of many users is to get a set of numbers arranged into a format that will fit into an existing spreadsheet of theirs. While many programs offer cut and paste transfer of numbers from a source application to a target spreadsheet, such an approach still leaves the user with the task of manipulating, normalizing, aligning and transforming the data. A cut-and-paste operation is therefore usually followed by the manual recalculation and retyping of every number. The RDML data viewer 100, by contrast, allows the user to make the necessary data transforms with mouse-driven operations before loading the numbers into a spreadsheet.

Referring to FIG. 16, as line items 1206 are added to and subtracted from the chart view 716 or tree view 724, they are added to and subtracted from the spreadsheet 724. In addition, any changes to the lines plotted on the chart view 716 (as the result of applying a macro or combination of macros) are immediately reflected in the numbers in the spreadsheet 724. This provides one-click addition of information to the spreadsheet view 724. Therefore, the way to copy data into the spreadsheet is simply to add them to the chart 716. It is also possible to copy an entire data document 102 or collection of data documents from the tree view 720 to the spreadsheet view 724, making any desired macro changes in the process.

Furthermore, RDML documents 102 may be created directly from the spreadsheet view 724. Whereas a data table is shown in the spreadsheet 724 (either created from another RDML document 102 or typed in from scratch), an RDML document may be created from that data in from the default specified by the user. This performs a task similar to an XML editor, but does so in a table format for the data, which is a more natural way to enter tabular data, not in the tree structure of current XML editors.

The spreadsheet view 724 may also directly read Internet data using a URL 1602. It will except formulas that use Xpointers (used by Xlink to specify destination of a link) to read in data from remote RDML documents 102. In this manner, data may be incorporated into a single spreadsheet from a number of sources with no need to prepare query or provide custom programming code.

As shown in the class diagram below in Table 6, the spreadsheet manager 722 may be a simple object; the chart manager/chart data 714 and 716 combination may be the actual repositories of the data. The chart manager 714 feeds data to the spreadsheet manager 722, which places the data in the correct cells. The spreadsheet manager 722 communicates directly with a graphical spreadsheet object 724, which in the case of the RDML data viewer 100 may be a third-party component.

TABLE 6

| SpreadSheetManager |
| --- |
| −gridControl : GridDataSheet<br>−chartmanager : ChartManager<br>+fillFromChart( ) : void |

IV.A.8. Footnote View

Figure 17:
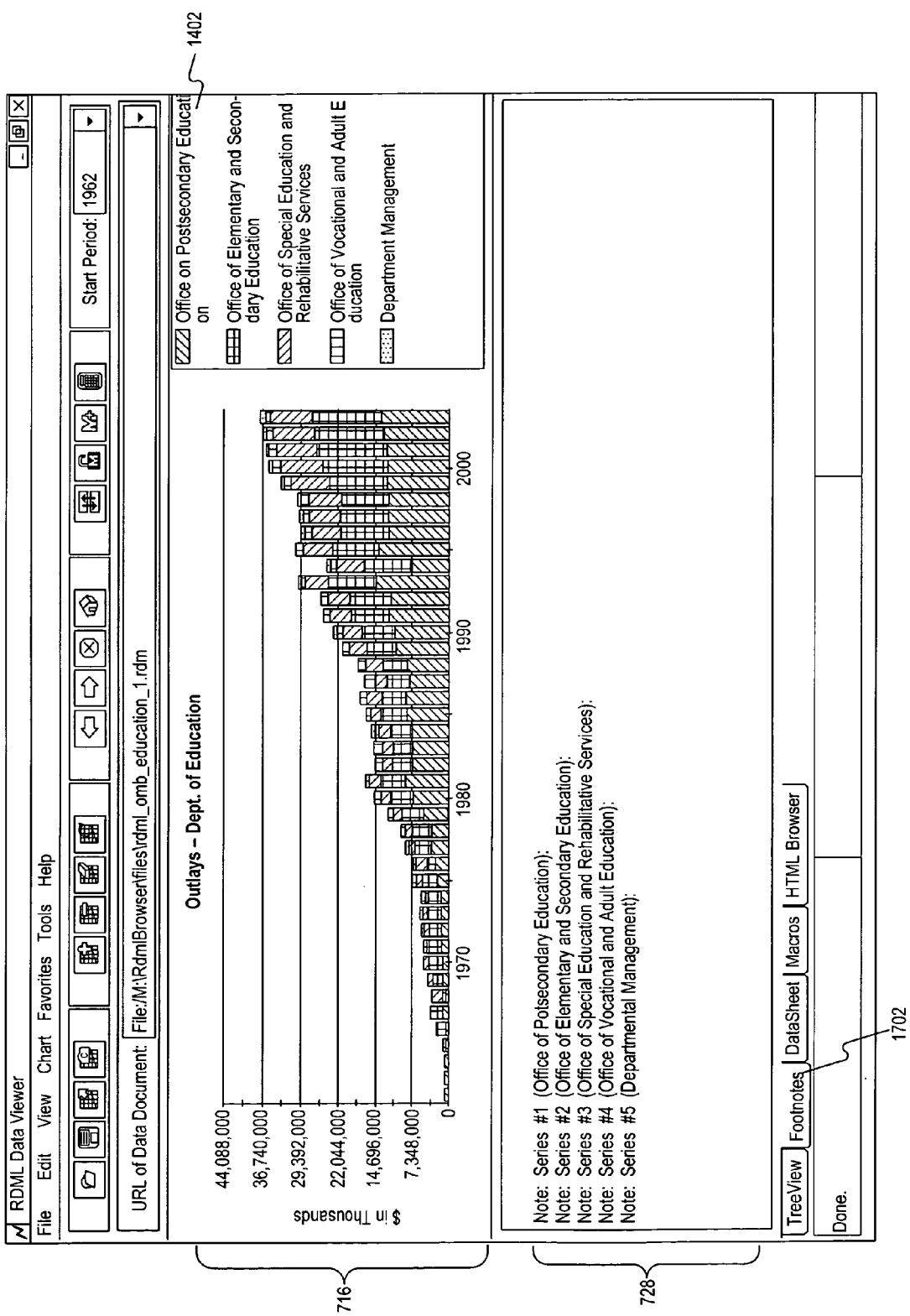
FIG. 17 depicts a footnote view of the data viewer and a chart view in accordance with methods and systems consistent with the present invention.

FIG. 17 is a screenshot which shows the footnote view 728 in the lower half. Generally, footnotes are a type of extended documentation that often get lost in transmitting and displaying numbers. Each line item has, as an attribute, a text string providing short footnotes which may be accessed by a mouse click (that is, by clicking the "Footnotes" tab 1702 at the bottom of the data viewer 100). As with the spreadsheet view 724, the default value is for only the plotted series to have their footnotes displayed. However, it is possible to display all of the footnotes of an RDML document 102 in the spreadsheet or style sheet report views.

The footnotes in the footnotes view 728 are intended to be simple, important reminders about the data. Typically these include usual periods (a fiscal year), adjustments, special problems and so forth. By default, the footnotes view 728 also shows the source of the RDML document 102 and the original underlying data. In one implementation consistent with the present invention, anything requiring more than 255 bytes is represented in an HTML page for which there is a hyperlink in the line item. These longer footnotes may be displayed in the HTML window as HTML documents.

Furthermore, as the user adds and subtracts series from a chart, the footnotes are automatically updated from the source data, even if there are multiple source documents. The footnotes in the RDML "Footnotes" tab also automatically update their numbers and labels to match the chart. This is in contrast to current spreadsheet and charting programs, which require that the user, not an automated lookup routine, supply the footnotes.

The macro manager 730 manipulates and implements macros in the data viewer 100. Macros allow a user to apply transformations or calculations to line items on a one-click basis, instead of having to write formulas or queries.

IV.A.9 Tagging Wizard

The data viewer 100 may also create XML and RDML documents 102 from spreadsheet files. To this end, it may use a spreadsheet "wizard" to create tagged documents from a table of data in a spreadsheet. In one implementation consistent with the present invention, a wizard (using at least one dialog box) is created in a scripting language (e.g., Excel Visual Basic for Applications) allowing tabular data in a spreadsheet (e.g., Excel) to be used as the source for creating a tagged text document in the RDML format.

Figure 21:
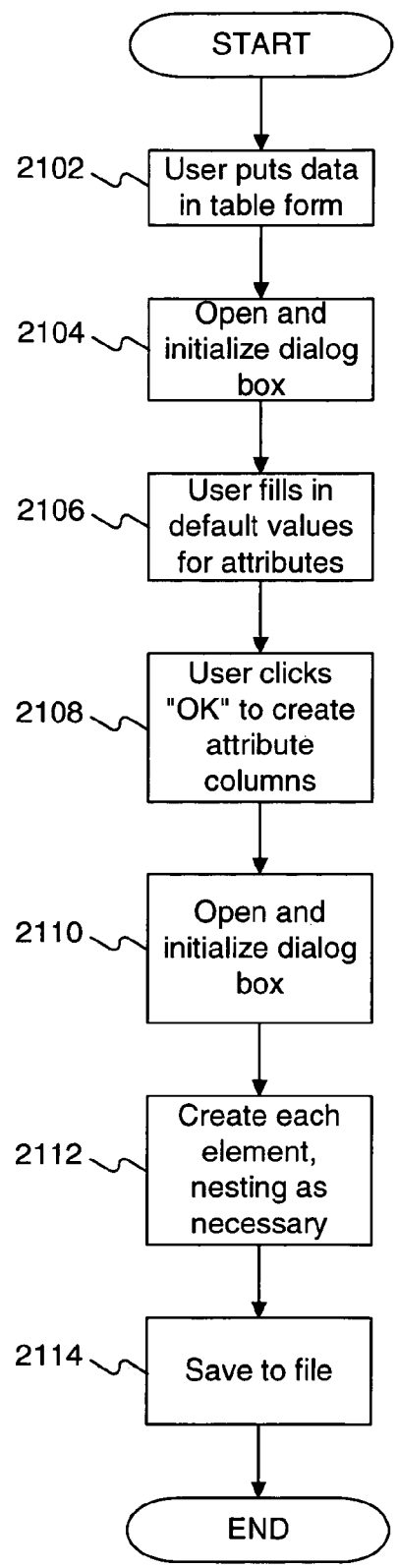
FIG. 21 shows a flowchart illustrating steps used in a method for tagging information from spreadsheets in accordance with the present invention.

FIG. 21 shows a flowchart illustrating steps used in a method for tagging information from spreadsheets in accordance with the present invention. FIGS. 22A-D depict exemplary screen shots for different stages in the document creation process.

FIG. 22A shows that the user makes the data ready in tabular form (step 2102). Each row will become one line item; the first row 2202 will become the data for the "data_x" element 924. The first column 2204 will populate the "li-legend" attributes of the respective line items. Note that most tabular data is already essentially in this form: the category (or time period) descriptions run across the top, the plain-language line item descriptions run down the left, and the values themselves fill the table.

Figure 22B:
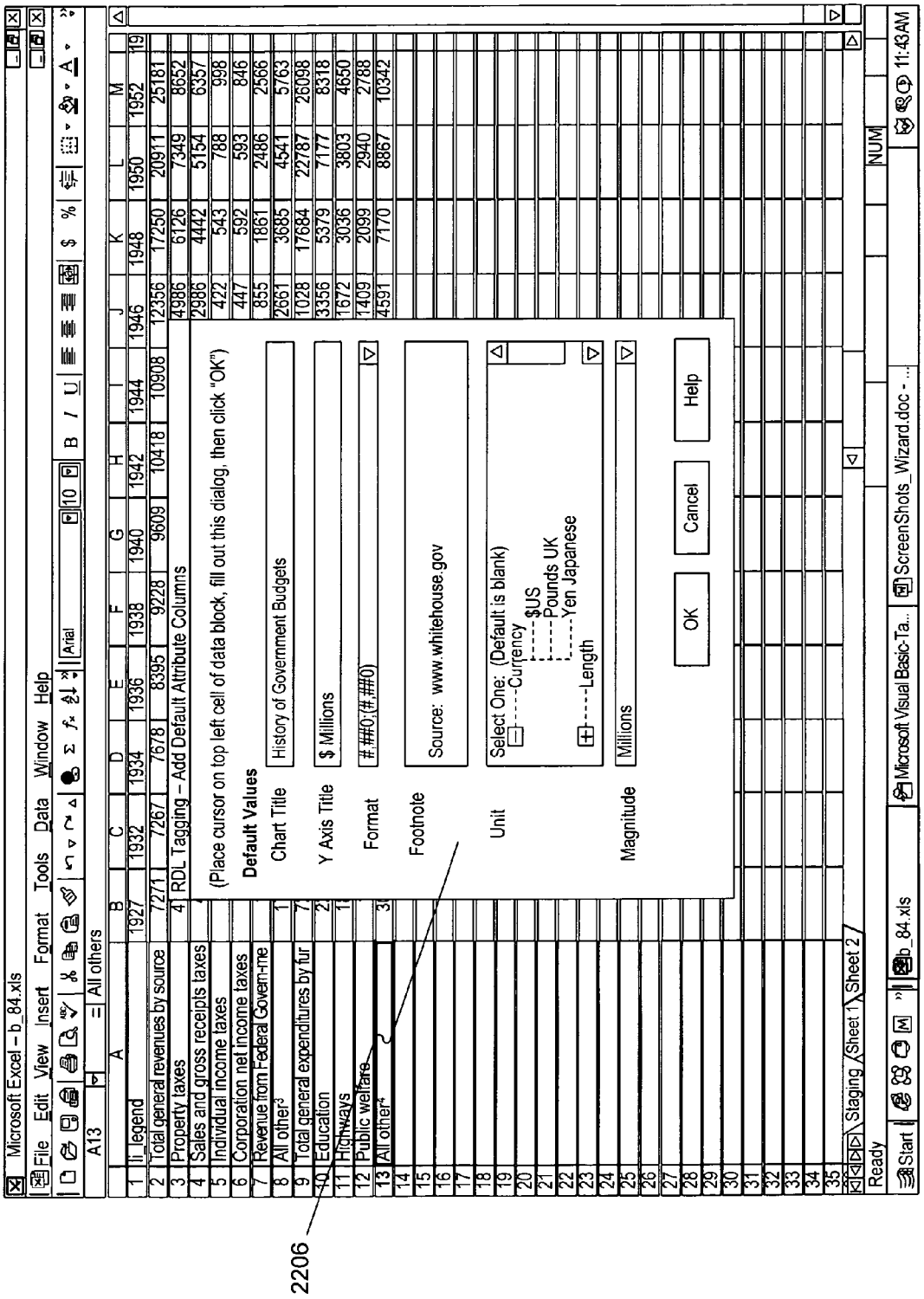

The user then highlights the legends in the left most column 2204 and opens the first dialog box 2206 (step 2104), shown on FIG. 22B, which will insert new columns for information in front of the data table, each column containing one type of attribute (step 2106).

Figure 22C:
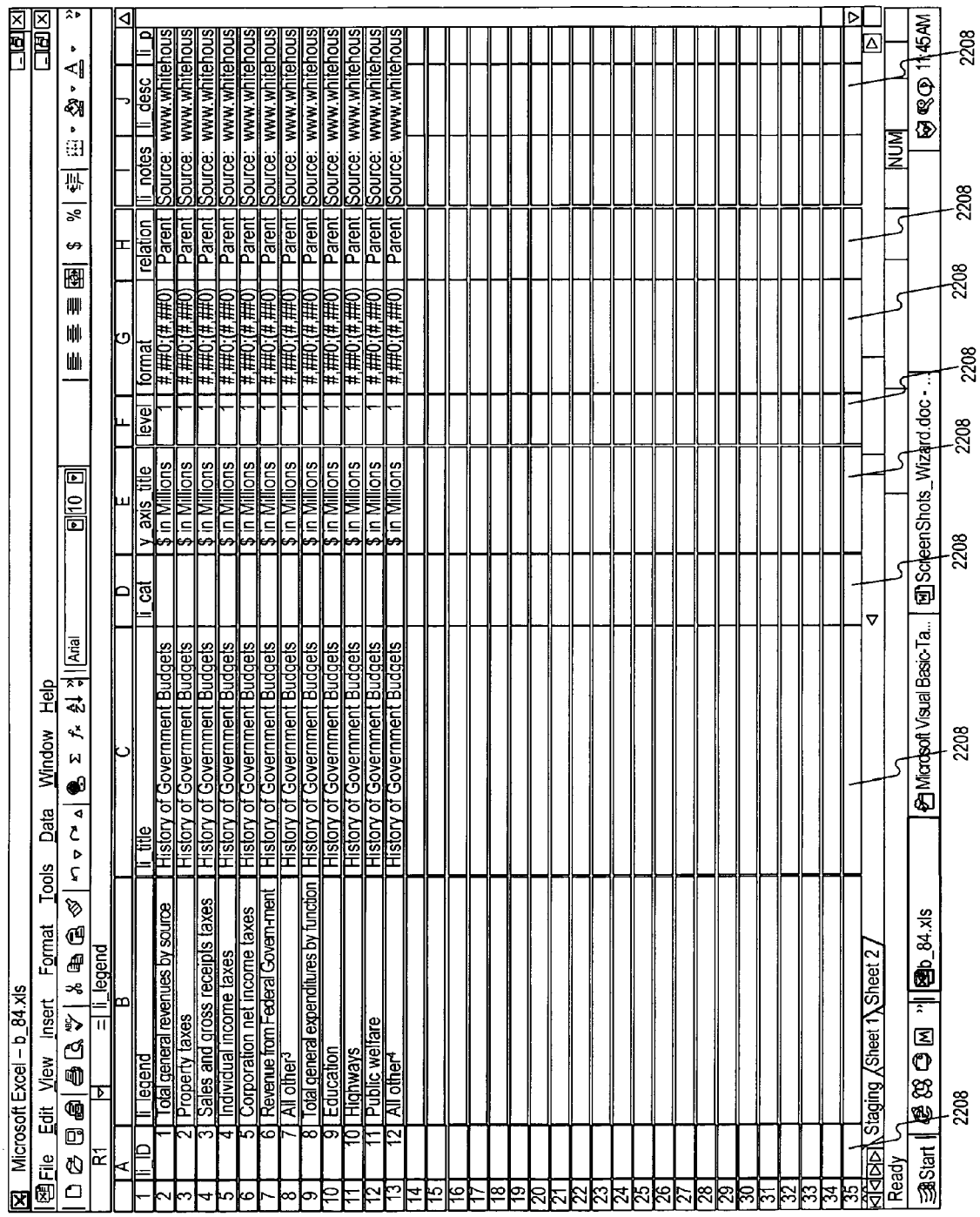

FIG. 22C shows that pressing "OK" on the dialog box 2206 creates the column and fills in the default data (step 2108). The wizard inputs the desired default values, saving most of the tedious typing, and the user checks the columns 2208 to see if changes need to be made. Appendix F shows exemplary code for routines that perform those functions. For each attribute, a column is added to the spreadsheet, the correct value of the attribute is selected (e.g., blank, hand-worded, or taken from the appropriate field in the dialog box), and the correct number of cells are filled with that value in the appropriate column 2208.

Figure 22D:
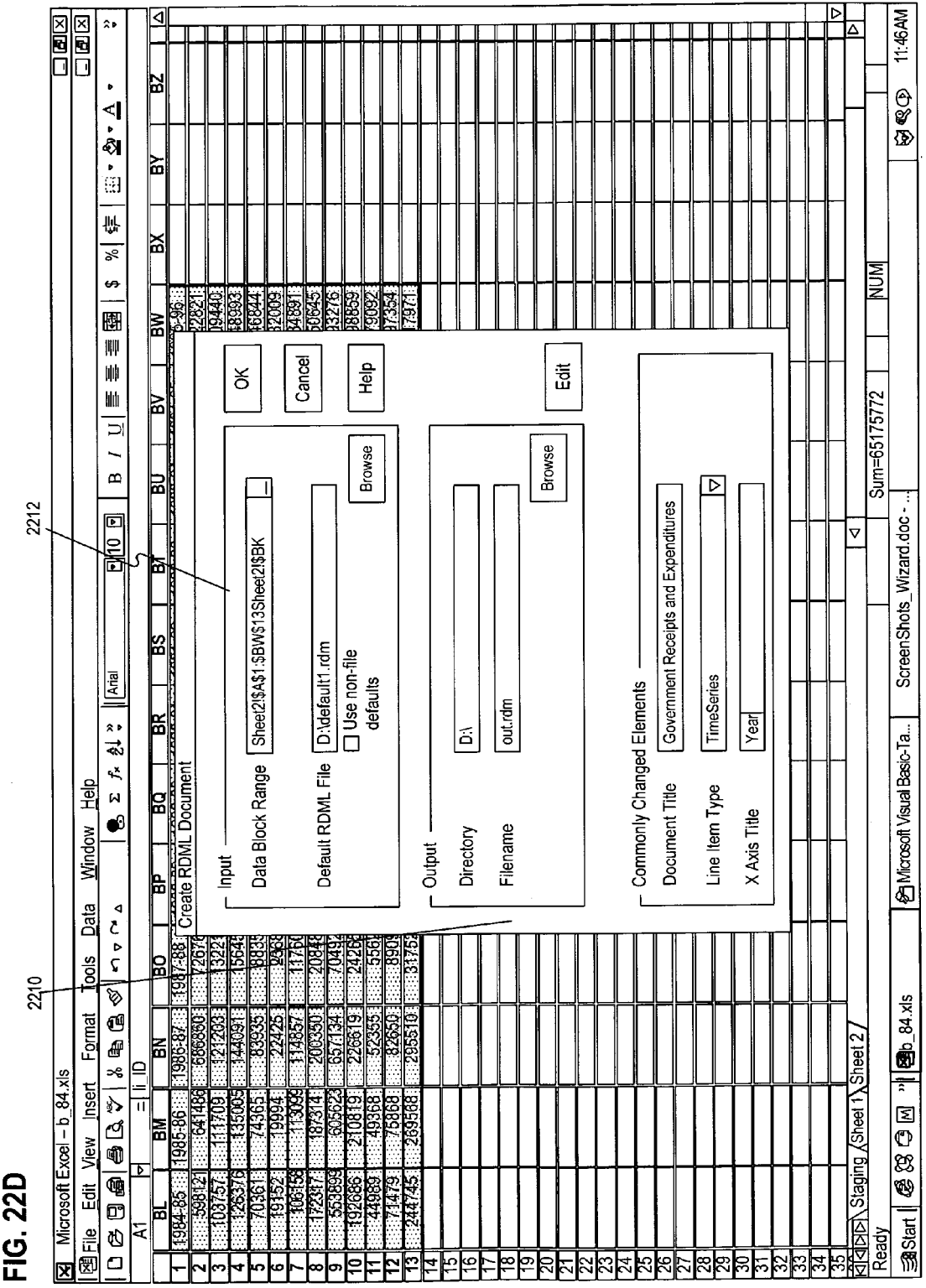

FIG. 22D shows that the user then brings up the document creation dialog 2210 (step 2110). The user first uses the first entry field 2212 to specify the range of the data table (including the attribute columns). The "default" data file will be used to provide defaults for the rdmldoc-header element 904 values, as well as other elements and attribute values in the line_item_set element 906 (step 2112). Finally, the user fills out the remaining fields and presses "OK", which causes the tagged RDML document 102 to be created and saved (step 2114). As would be appreciated by one of ordinary skill in the art from this disclosure, the information gathered in the exemplary dialog boxes could instead be gathered in a single dialog box before creating RDML-compliant data.

Appendix G provides code used in one implementation to create an RDML document 102. Generally, the process comprises steps of: (1) opening file and buffers for writing, (2) calling an element-creation method for each element in the DTD 702 which can be nested within others, and (3) saving and closing the files when finished.

IV.A.10. Aspects of RMDL Markup Documents

RDML is designed to be used to describe numbers across industries and domains. To do so, it provides a basic set of tags and a matching vocabulary to describe six aspects of a table of numbers: (1) value, (2) structure, (3) format, (4) semantics, (5) provenance, and (6) measurement.

Value denotes that numbers are transmitted as strings, with additional tags to define their data type, degrees of precision, handling of missing values, handling of nulls, and other directives to the end application.

Structure refers to a structuring of the data in within a table. RDML permits records to be arranged hierarchically within a table. Although not a standard approach for relational tables, this permits multiple levels of information to be placed in a single two-dimensional table. Users desire this, for example, when viewing financial statements, where a single line item (e.g., "Equipment leasing") may have several sub-components ("Autos," "Trucks," "Office Equipment.")

Format allows the application to present users with numbers in human readable form. The tags specify default formats for numbers, internationalization issues such as comma/decimal point handling, and default legends and chart titles. These formats may be changed by the users at run time.

Semantics refers to the fact that RDML provides generic tags in which indicators of the "meaning" of the numbers, including the vocabularies of other SGML and XML markup languages, can be placed. This allows RDML to act as a "wrapper" for data from other markup language documents. Semantic meaning is also conveyed in text-based attributes: legends, titles, labels, footnotes, etc.

Provenance is the documentation of various elements. RDML elements include information on the source of the data, who marked it up, timestamps and link addresses, and licensing information, etc.

Finally, in the context of generic numbers, "Measurement" refers to the characteristics necessary to describe the measurement aspects of the domain the number is taken from: units ("meters", "feet"), magnitude ("millions", "billions"), modifiers ("Adjusted for inflation, 1997 index"), and so forth. This permits macros to ensure the results of any calculation are adequately derived and described to the end user.

IV.B. Graphical User Interface and HTML Browser

The screen shots of FIGS. 14A-D, 16 and 17 have been of the graphical user interface ("GUI") 734 which has several responsibilities. Generally, it creates itself and other visual components upon start-up of the application, and provides a central storage place for a minimal number of global variables of the application (such as file directories, etc.). Further, it responds to user actions, such as mouse clicks and keyboard shortcuts, and repaints the screen, or portions of the screen, at appropriate moments.

The HTML browser 736 may be a third party component which displays HTML files. Although this browser has been designated as an HTML browser, one of ordinary skill in the art would appreciate from this disclosure that other browsers (e.g., an XML browser) can likewise be used. This component provides basic web-browsing capabilities and a way to view hyperlinks for RDML documents 102. Additionally, it acts as a display window for certain pages generated by the RDML data viewer 100 (such as RDML document source code, chart documentation, etc.)

IV.C. Reusable Macro Markup Language

Figure 18:
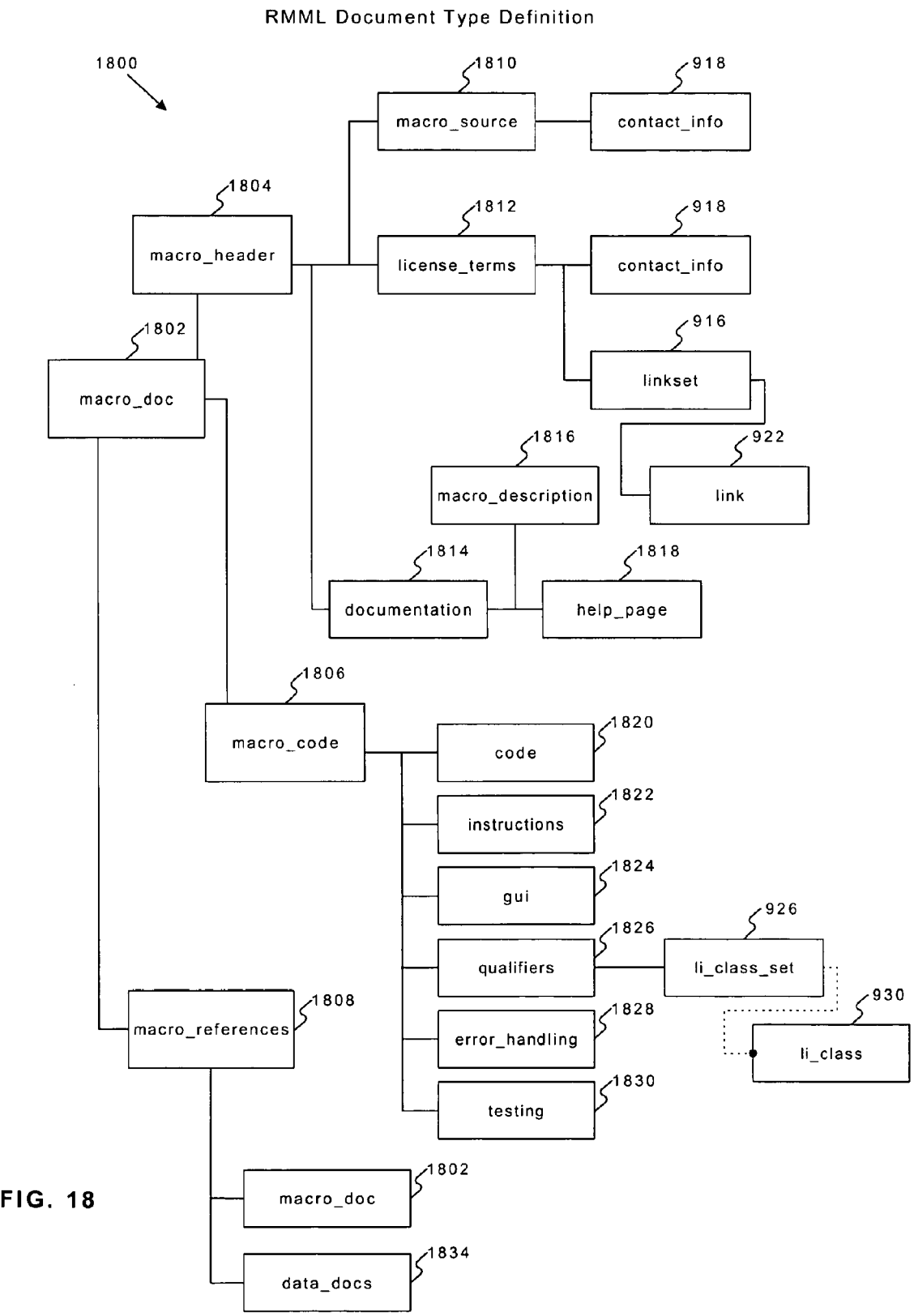
FIG. 18 illustrates elements of a Reusable Macro Markup Language (RMML) Document Type Definition in accordance with the present invention.

FIG. 18 graphically shows elements of the RMML Document Type Definition 1800. In one implementation consistent with the present invention, RMML documents 104 conform to the rules provided by the DTD 1800. In accordance with one implementation of the present invention, an RMML DTD 1800 is shown at Appendix D. Attributes and elements of the DTD 1800 may also be seen in the full sample RMML document 104 in Appendix E. These two Appendices D and E are useful for examining specific attributes and elements of the RMML DTD 1800.

The RMML DTD 1800 data structure is optimized to provide information needed in the order in which it is required, to reduce the learning on the part of new users to RMML Macro development, and to avoid unnecessary duplication. The first line of the DTD 1800 in Appendix D starts with '<?xml encoding="UTF-8"?>' because XML documents start with a line that tells the client application, in this case, the RMML Interpreter 1980 (described below) and the data viewer 100, what type of document it is and the version of XML.

With further reference to FIG. 18, the DTD 1800 used to define RMML macro documents 104 is structured in a hierarchical tree structure of elements. Each element may include a list of attributes (displayed in Appendix D, but not shown on FIG. 18) and/or an association with one or more sub-elements. As with the RDML DTD described above, some attributes may be required while others may be optional, depending on design parameters. At the highest level, the DTD 1800 has three elements descending from a root element, <macrodoc> 1802. The first element, <macro_header> 1804, contains the metadata for the document as a whole. The second, <macro_code> 1806 contains the source code expression to be evaluated, related variables, and instructions to the application regarding the graphical user interfaces for any parameters. The third, <macro_references> 1808 contains elements related to remote data (RDML documents 102) or other macros (RMML documents 104).

The macro_header element 1804 is designed to match, as closely as possible, the rdmldoc_header element of RDML documents 102. This saves learning time for developers and end users, and allows reusable code modules to be built for both purposes.

Nevertheless, in one implementation consistent with the present invention, the <macro_header> element 1804 contains several attributes that are unique. In this implementation, there are 8 unique attributes in the <macro_header> element 1804. The first of these is "macro_type." This attribute tells the application which general capability this particular macro requires within the context of that application. The application uses this attribute in a factory class 1912 to create the correct type of macro object for internal use. Two example types consistent with this implementation are: (1) "TSL" (time series line, a macro that works with time series to create a new line or lines on the chart), and (2) "TSO" (time series overlay, a macro that works with time series to create a new overlay on the chart 716, such as gray backgrounds behind certain time periods.)

The result_type attribute tells the RDML data viewer 100 how to display the results of any transformation created by the macro. There are, in one implementation, five permissible values for this string: "Replace Each," "Replace All," "Replace AB," "Add New," "Add Annotation," and "Add Overlay." Replace Each removes every line on the chart 716 in the RDML data viewer 100, and replaces it with the transformed version. For example, if there are four series on the chart, all denominated in "miles", and user selects a macro "to kilometers", then every line will be converted to kilometers, the miles lines erased, and the kilometers lines placed on the chart in their place.

Replace All is used where all current lines are being replaced by one line. For example, if A and B are charted, a macro called "B as % of A" would replace them with a single line. Replace AB is a special case of Replace All where there are only two lines charted. Add New adds a line to whatever is plotted. For example, a macro called "Average" might draw a line through the existing line at the average level. Add Annotation adds a label with a pointer to a certain value on a chart (e.g., "2-3 Stock Split"). Add Overlay adds a shaded area behind certain regions of the chart.

The attribute "rdmldoc_type" designates the type of RDML Document 102 with which the macro is designed to work. Valid strings for this attribute are TS, CT and XY, corresponding to the types of RDML Documents 102.

The elements <macro_source> 1810 and <license_terms> 1812 are identical to, and play the same role as, <data_source> 908 and <license_terms> 914 in the RDML Document Type Definition 702. The <documentation> 1814 element is a container for two sub-elements: <macro_description> 1816 and <help_page> 1818. The <macro_description> element contains a short string (e.g., under 50 characters) which describes the basic functionality of the macro. It appears in the description label of the parameters panel 1960 (shown in FIGS. 20A-D and described below) For users desiring a more detailed description of the macro, the <help_page> 1818 element contains a text block that provides this information. This text block can be read by the data viewer 100 in an HTML pane as part of the regular help system. This text block is intended to provide information on all aspects of the macro that might be of interest to the user: its use, its code, its parameters, and its inputs.

The second top-level element is <macro_code> 1806. This section contains the actual source code and related variables. The <code> 1820 element contains one or more expressions which evaluate to a transformation of certain numbers in the RDML data viewer 100. In one implementation consistent with this invention, the transformations apply to the chart view 716 in the RDML data viewer 102. But transformations may also be applied to the treeview 720 or other views.

The expression(s) in this element are formulas similar to those seen in spreadsheet formulas: the expression is a series of (1) operators, (2) literals, (3) variables, (4) functions, and (5) miscellaneous expression delimiters. The main difference from traditional spreadsheet formulas is that the variables may stand for either scalars or vectors, depending on the source or the context. A sample expression follows:

$$A*(B+2000)-IF(A>3,12,45)$$

Operators are: addition (+), subtraction (−), multiplication (*), division (/), less than (<), greater than (>), or (|), and (&). The operators have different meanings based on the types of the sub-expressions they work on. Operating on two vectors is interpreted as element-by-element operation on the two vectors. Thus, A*B, where A and B are vectors, is C={a1*b1, . . . an*bn}.

Literals are defined either directly in the expression (e.g., "46"), or assigned to a variable (e.g., "pi=3.14156").

Variables can come from one of six different places in RMML. First, they can be defined as variables directly in the RMML document 104. This is done by creating a <variable> element and assigning it a default value. Second, variables can be associated with graphical components in the parameters panel 1960 in the RDML data viewer 102. In one implementation consistent with this invention, there are four different types of "gui components." These are listed and described below under <gui> element 1824. Third, a variable can be defined from a line item element identical to those found in an RDML document 102. Because they are identical, a line item can be simply cut and pasted from an RDML document 102 to an RMML document 104. Fourth, a variable can be drawn from a remote source. In one implementation consistent with the present invention, that remote source can be a hyperlink to a line item in an RDML document 102. This is accomplished by using an Xpointer hyperlink in the "href" attribute of a variable element. Fifth, a variable can be defined as one of the series of data that is currently plotted on the chart. In one implementation in accordance with the present invention, there can be a maximum of six series on the chart; each can be accessed by using the reserved words A, B, C, D, E, and F. As would be appreciated by one of ordinary skill in the art, any number of uniquely definable series may be used. If the result type attribute of a macro is "Replace All", then the expression is evaluated once for each series, with A being the series currently being transformed. Sixth, variables can be taken from an RDML document 102 that is already loaded in the RDML data viewer 100. In this case, the expression indicates the URL and a class string that can be found in one of the li_class elements of a line item element. The expression then uses that line item as the variable value.

Functions that are built in are provided by the interpreter 1980 in one implementation consistent with the present invention and are a principal means of extending the language. These are in the form "FUNCTION_NAME(expression)". Functions include: IF(x,y,z); SUM(x); AVERAGE(x); COUNT(x); MIN(x); MAX(x) and so forth.

Miscellaneous delimiters are implemented by separating expressions by a semi-colon (;). This indicates that the expressions are to be evaluated in order. Expressions can also be grouped in parentheses to tell the interpreter 1980 how to evaluate sub-expressions.

Any string appearing in the <instructions> element 1822 will be displayed in the parameters panel 1960 to give the user any last minute instructions or suggestions. The <gui> element 1824 contains any number of elements that describe graphical components. These graphical components will appear in the parameters panel 1960 to give the user the ability to make changes to the macro's parameters. Four gui components (not shown) may be: <comp_vector>, <comp_list>, <comp_rbutton>, and <comp_ipanel>. The <comp_vector> is a vector variable, where the individual values of the vector can be viewed in a scrolling list box. A <comp_list> element is a scrolling list; each time the user clicks on a different item, the value of the variable attached to that component is changed to the value associated with that item. A <comp_rbutton> is a collection of radio buttons; each is associated with a different value. As the user clicks on different buttons, the value associated with the component itself is changed, and the macro is re-run. A <comp_ipanel> is an input field that allows the user directly to input changes to the macro.

Generally, macros are not meant to run blindly on all data. First, the interpreter 1980 checks if the macro has any "qualifiers" that must be checked against the data. If there are any strings in the <qualifiers> element 1826 of the RMML document 104, these are checked against strings in the <li_class> element 930 or other elements or attributes of the data. If the data is qualified, the interpreter 1980 will proceed with running the macro. For example, if the <qualifiers> element 1826 of the macro specifies "li_unit=currency", then the macro will only be run if the li_unit attribute of the data being operated on is a currency value.

The <error_handling> element 1828 holds error messages that can be displayed by the RDML data viewer 100 if there are problems of an indicated type. The <testing> element 1830 holds instructions to testing applications regarding automated testing routines. These applications undertake basic unit testing such as checking for out-of-bounds problems, missing value problems, divide-by-zero issues, etc.

The third major section of the RMML document 104, the <macro_references> element 1808 holds references to outside macros and data sets that might be incorporated into the macro by reference. The two sub-elements are, accordingly, the <rmmldocs> element 1832 and the <data_docs> element 1834.

IV.C.1. RMML Macro Package

Figure 19A:
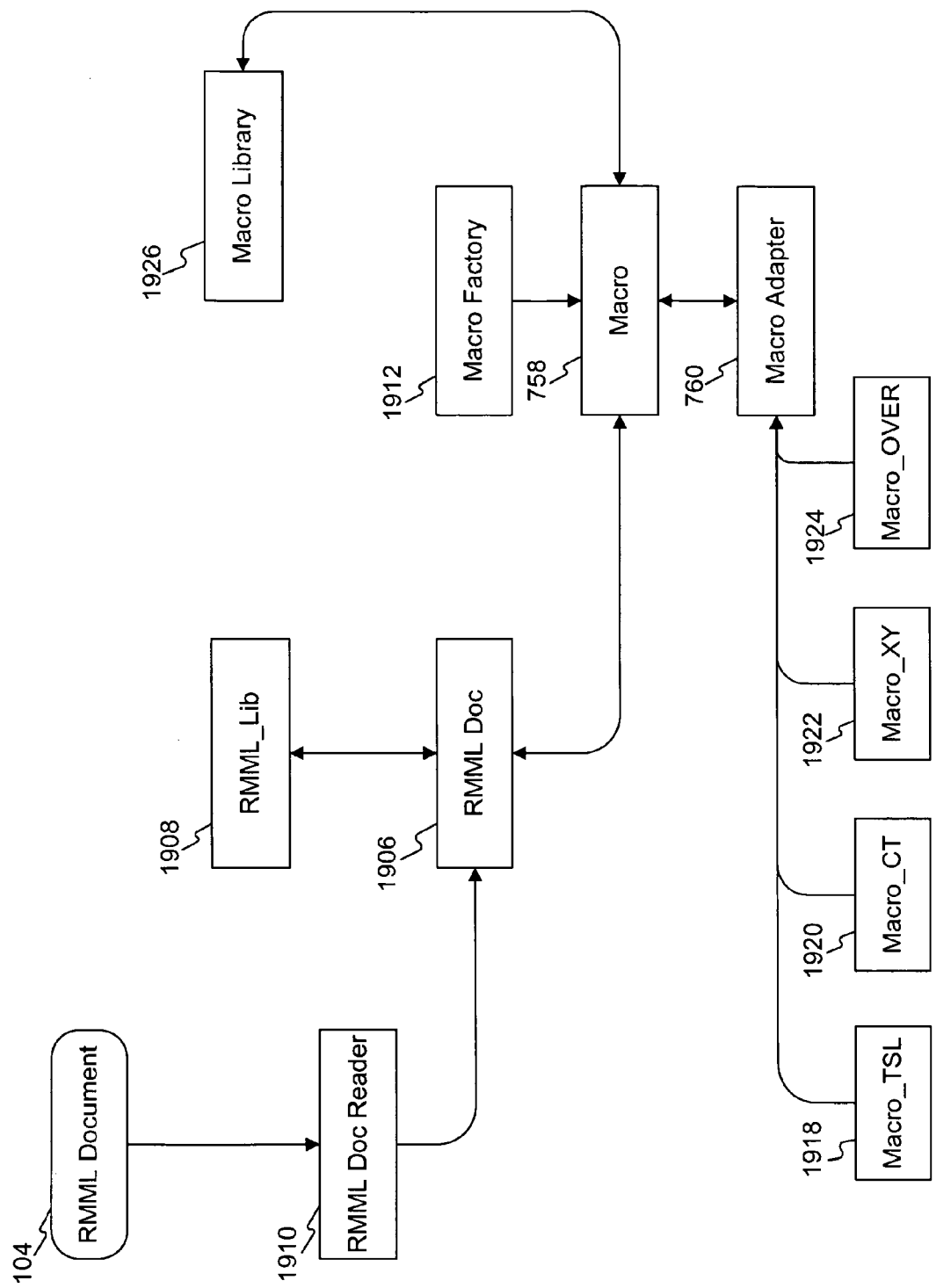
FIGS. 19A-19C depict RMML document handling, an RMML graphical interface, and an RMML macro interpreter, respectively, in accordance with the present invention.
Figure 19B:
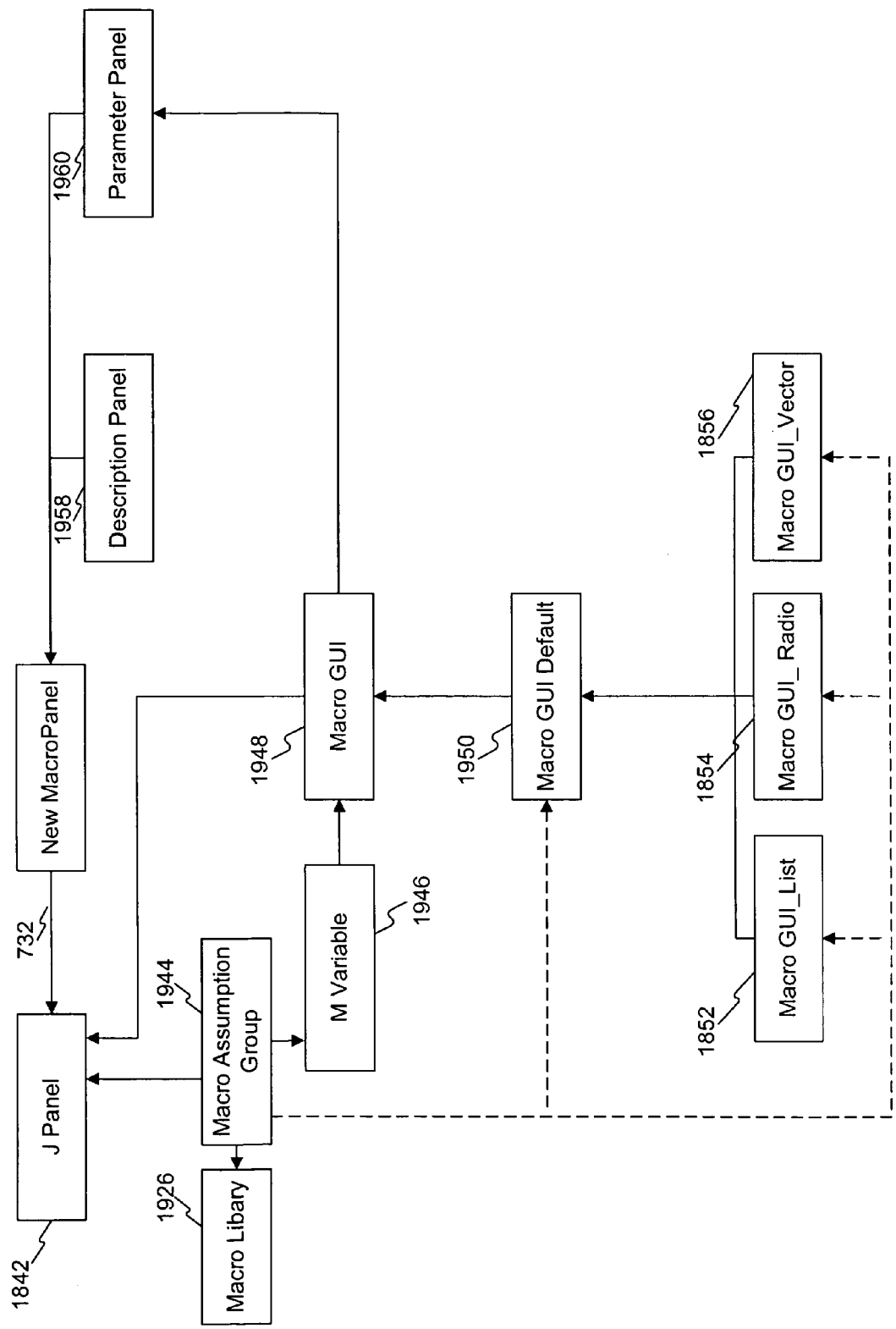
Figure 19C:
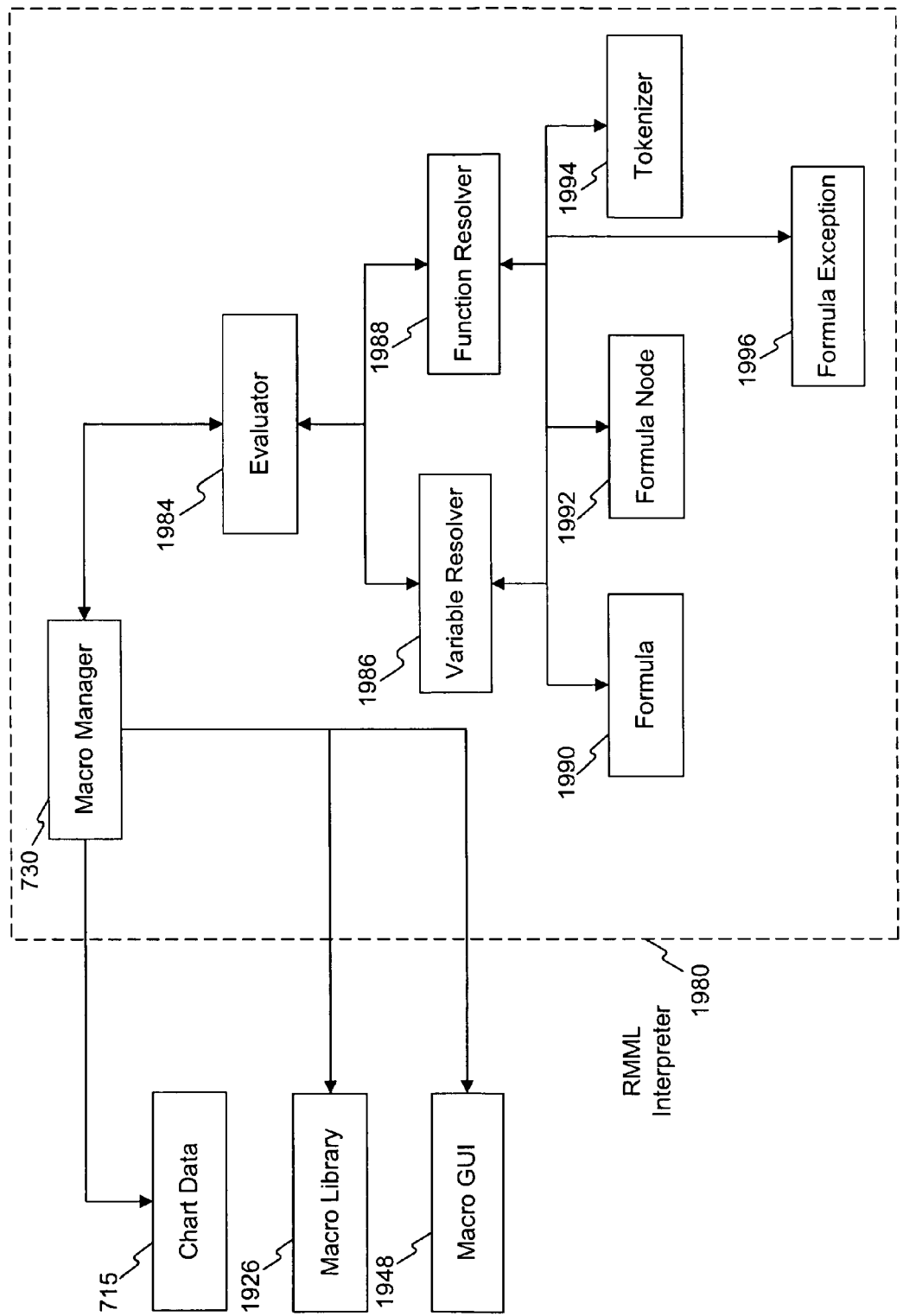

Generally, there are three major areas of the RMML Macro Package: the RMML document handling classes (FIG. 19A), the graphical interface (FIG. 19B), and the macro interpreter (FIG. 19C). In one implementation consistent with the present invention, this package of software classes connects to the RDML data viewer 100 in only a few places: it gets data from the ChartManager 714/ChartData 715 objects, posts its graphical components through the GUI 734 object, and can access the loaded RDML documents 102 in the Primary Data Store 712.

RMML Document Handling

FIG. 19A shows objects responsible for managing the process of RMML document handling: loading documents, creating internal macro objects from them, cataloging them and caching them, and making them ready for use as objects. The RMMLDoc Reader 1910 locates an RMML Document 104 (either locally or over the internet) passes it to an XML Parser 706 (which may be a third-party component), relays error messages if any to the RDML data viewer 100, creates an internal representation of the RMML Document 104 as an RMMLDoc 1906 object, and places a reference to the RMMLDoc 1906 in the RMML_Lib 1908.

The RMMLDoc 1906 can be structured in two ways: either wrapping a TXDocument object to arrive at an RMMLDoc 1906, or creating a new RMMLDoc 1906 object with the data from the TXDocument.

The RMMLDoc 1906 object contains methods for accessing individual elements and attributes of the document in a way that is easy to comprehend in the context of the macro package. The RMML_Lib 1908 object is a cache for loaded and active RMMLDoc objects 1906.

The RMMLDoc 1906 is a raw collection of data about a macro—its formula, its help text, etc.—and generally does not act on data sets to transform them. The macro's capabilities first have to be used to create an internal object (macro interface 758) that is capable of doing the calculations. This internal macro object 758 is created by a collaboration between the MacroLibrary 1926 object (which is a cache of the graphic objects for the active macros) and the MacroFactory 1912 (which determines which type of internal macro to create.)

There are four types of internal macros: time series (TS), category (CT), xy plot (XY) and overlay (OVERLAY). The macro_type attribute is used by the MacroFactory 1912 to create the correct type of internal macro: Macro_TSL 1918, Macro_CT 1920, Macro_XY 1922, and Macro_OVER 1924 respectively. The MacroAdapter 1916 class performs the work of the macros.

TABLE 7

MacroAdapter

-mm : MacroManager
-mem : Memento
-rmmldoc : RMMLDoc
-eval : Evaluator
-mag : MacroAssumptionGroup
-desc : MacroDescription
-isChangedFlag : boolean
-result_type : int
-curr_li : int
-series_label_modifier : String
-series_label_type : String
+createMemento( ) : void
+evaluateFormula(strExpr : String, index : int) : Vector
+initMacro( ) : void
+performTransformation(result_type : int) : void
+replaceVariable(strExpr : String, index : int) : String
+resetMemento(mem : MacroMemento) : void
+undoTransformation( ) : void
+updateChartTitle( ) : void
+updateLabels( ) : void
+updateLegend( ) : void
+updateYAxisTitle( ) : void Described below are class methods shown in Table 7 of a MacroAdapter object 760 in accordance with one implementation consistent with the present invention. First, MacroAdapter( ) is the constructor that creates a MacroAdapter 760 object. Before a macro is run, it has a chance to make a copy of the data that it is about to transform so that undo operations can be performed. The createMemento( ) method takes a snapshot of the data plotted on the chart by copying the ChartData object 715 to a Memento object.

Also, before a macro is run, the method initMacro( ) is run and gives the macro a chance to load any remote data or macro code. The replaceVariable( ) method runs the macro on multiple series on a chart. For example, if the result_type is "Replace Each" and there are four series charted on the chart, the macro will be run four times. The first time, A in the formula represents the first series, the second time it represents the second series and so forth. The method performTransformation( ) evaluates the transformation string, and updates the various titles and legends. An important part of performTransformation( )'s code is to determine the result_ type of the macro and call the evaluateFormula( ) method in the correct manner. For "Replace Each," it is called once for each series, while for "Replace All," it is run only once.

The performTransformation( ) method also calls the four update methods: updateChartTitle( ) updateLabels( ), updateLegend( ) and updateYAxisTitle( ). Each of these modifies the relevant strings in the ChartData object 715 so it can be passed on to the chart.

RMML Graphical Interface

Figure 20A:
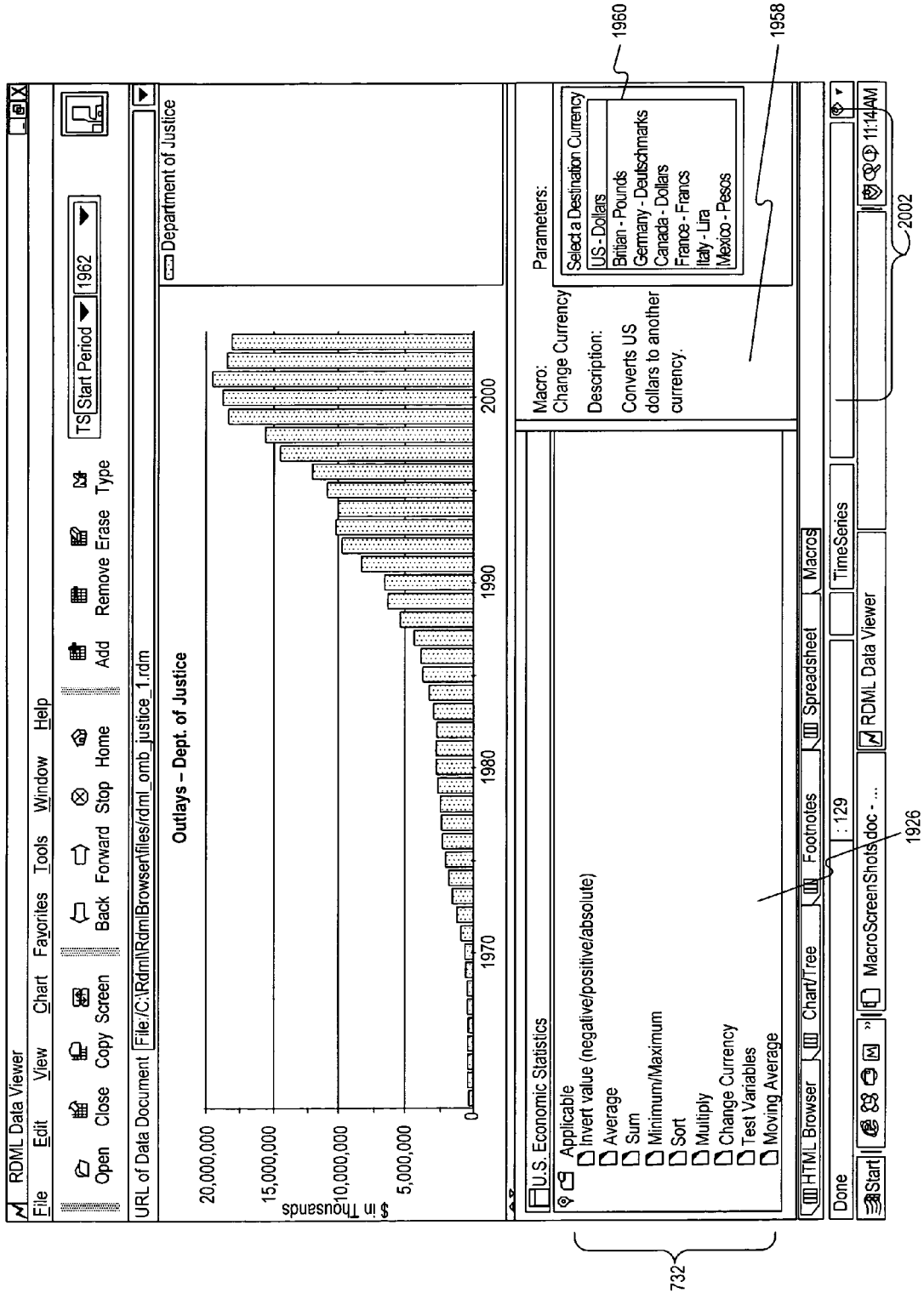
FIGS. 20A-20D illustrates screen shots of RMML macro panels in accordance with the present invention.
Figure 20B:
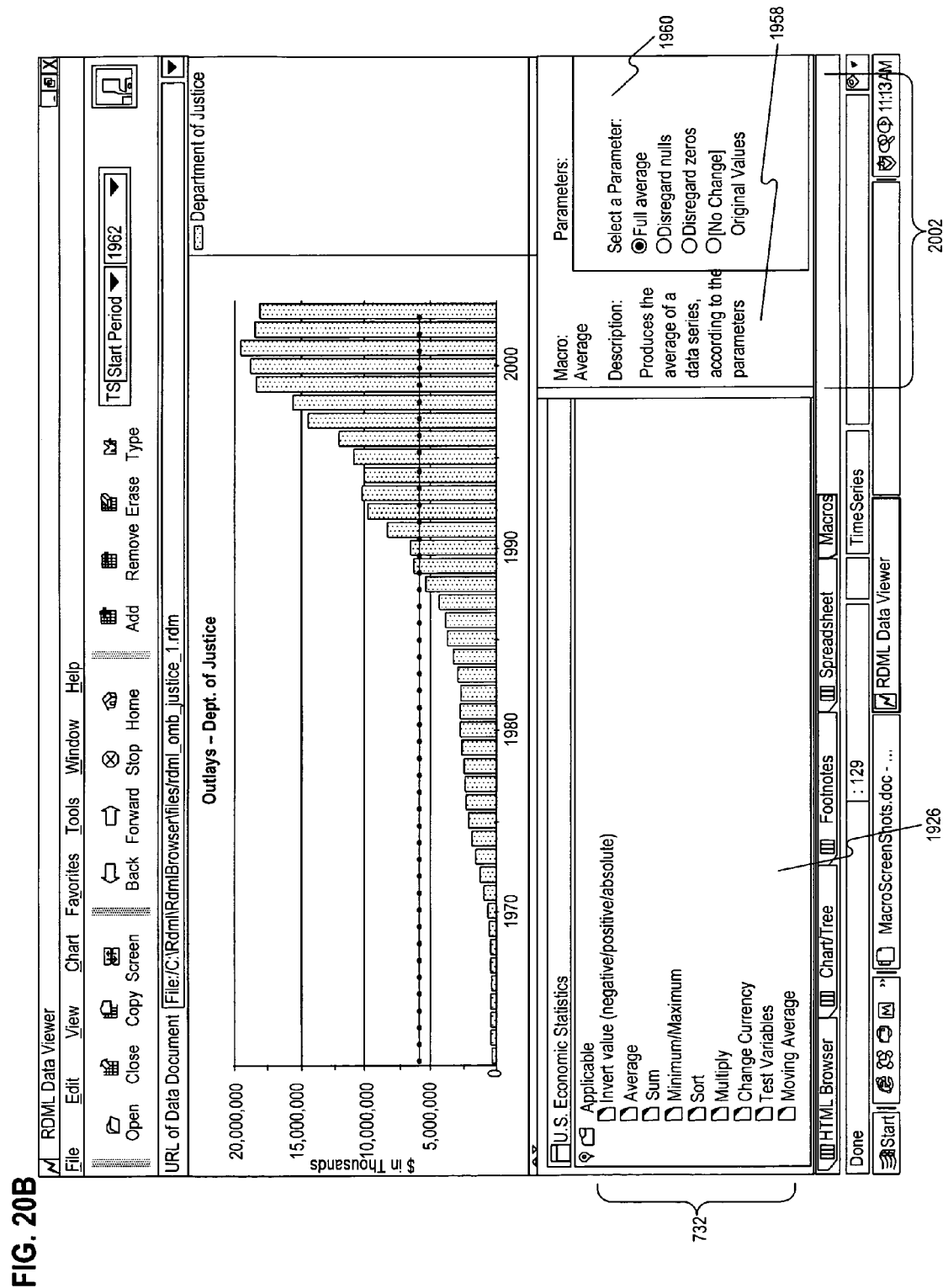
Figure 20C:
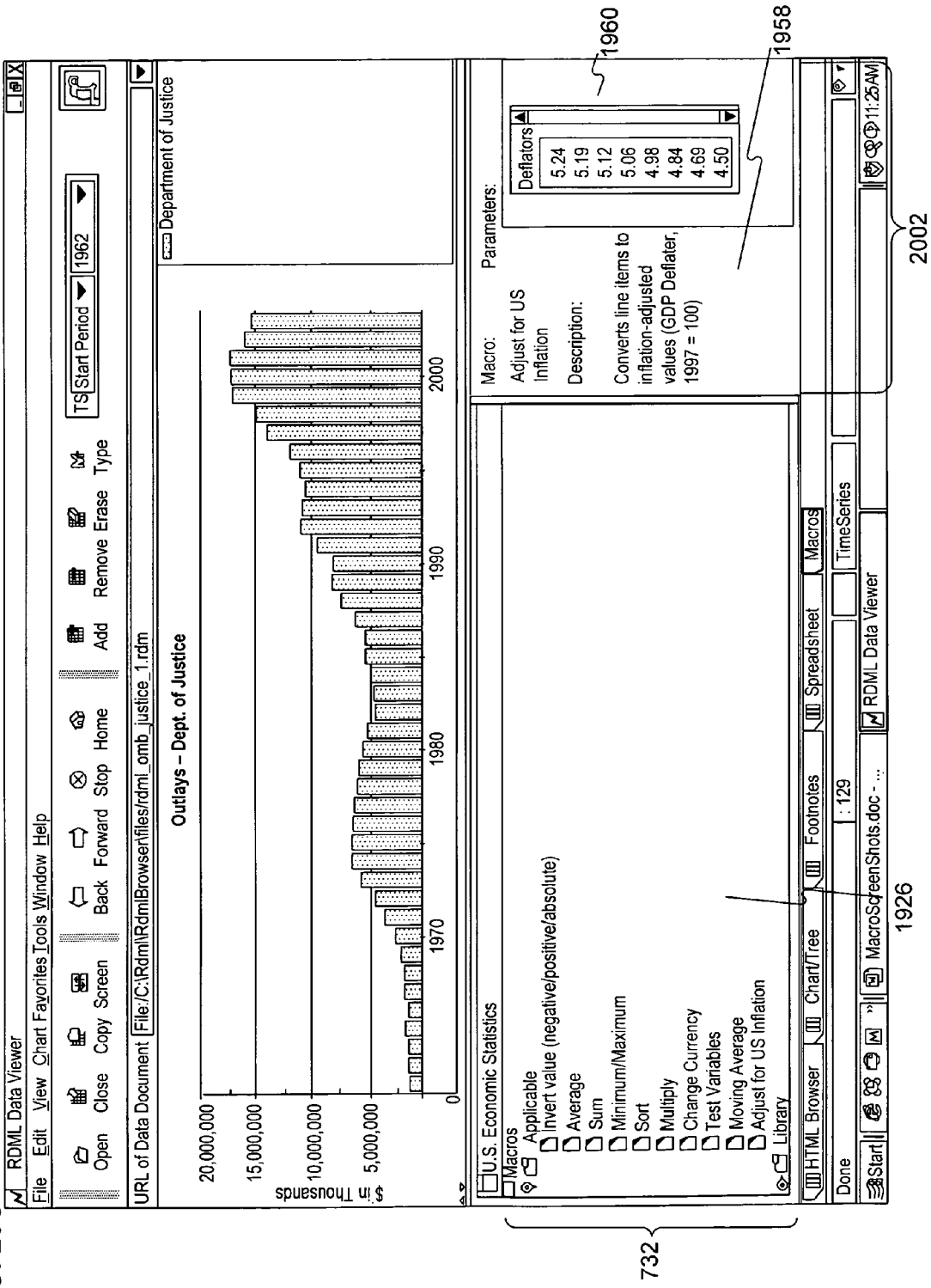
Figure 20D:
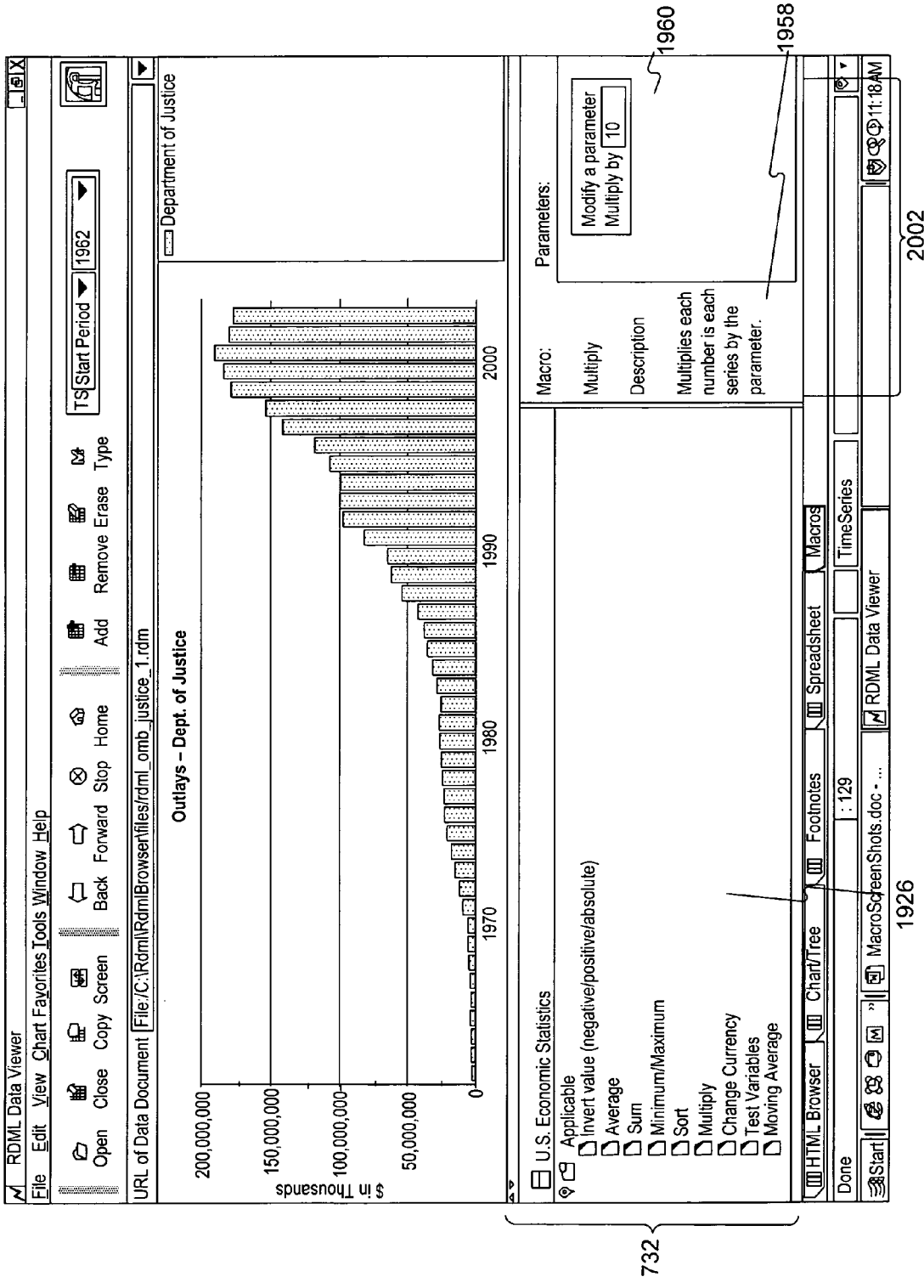

FIG. 19B illustrates objects responsible for managing the process of creating, managing, and handling events from the graphical user interface 734. FIG. 20A shows a screen shot of the RDML data viewer 100; the NewMacroPanel 732 is displayed in the lower half of the screen. The available macros are displayed in individual windows in the MacroLibrary panel 1926 on the left side of the lower panel. The right side of the macro panel 732 is the macro information panel 2002 which holds the macro description panel 1958 and the parameter panel 1960.

The NewMacroPanel 732 may be a subclass of a JPanel 1942 in Java's Swing set of classes. Those skilled in the art will be able to chose the appropriate class to use for other major platforms. The left side of the NewMacroPanel 732 is a frame for a multiple document interface (in this case, a Desktop for JinternalFrame objects from Java's Swing Set). Each MacroLibrary 1926 that is opened created a new internal frame, which allows users to select macros from multiple libraries at the same time.

When a MacroLibrary 1926 is opened, all macros within it are loaded and registered. "Registration" is a series of methods wherein the macro's variables are found in various elements of the RMMLDoc 104, and graphical representations of these variables are built for inclusion in the parameter panel 1960.

The graphical components for all of the variables associated with a set of macros are created in the MacroAssumptionGroup 1944 class. This class has a factory method that examines the attributes of the variables reported by the RMMLDoc 104 (variable name, variable value, gui type, default value, etc.) and creates the appropriate MacroGUI class: MacroGUI_List 1952 (see FIG. 20A), MacroGUI_RadioButton 1954 (see FIG. 20B), MacroGUI_Vector 1956 (see FIG. 20C), or MacroGUI_Default 1950 (see FIG. 20D). Each of these graphical components appears differently in the parameter panel 1960 as shown in the screen shots noted.

The registration of macros by the MacroLibrary 1926 also involves creating an MVariable 1946 object to go with each variable, and adding these to a cache of available Mvariables 1946. These Mvariable 1946 objects are used in the actual evaluation of expressions. The registration process also involves registering the MacroGUI 1948 objects as sources for events that the MacroManager 1980 object can use to trigger the running of a macro. Mvariables 1946 encapsulate the various characteristics of a variable: its value, default, and source.

The description panel 1958 and the parameter panel 1960 are populated with graphical components and text when a particular macro is selected in the treeview 720 listing of a MacroLibrary 1926 internal frame. The macro that is selected provides the description text, the various labels and the MacroGUI 1948 components.

RMML Interpreter

The MacroManager object 730 is responsible for detecting that a macro has been selected or a parameter changed, getting the various data sets and variables called up and made available to an Evaluator object 1984, and that the data set charted (or showing on the treeview 720) is obtained and transformed and sent back to be recharted on the chart 716 or relisted on the treeview.

ChartData 715 contains the data from the current chart 716 (or active treeview 720, depending on the type of the macro). It makes this data available as just another variable to the Evaluator object 1984, and takes the final result of the Evaluator object 1984.

The Evaluator 1984 evaluates the string expression(s) in the <code> element 1920 of the RMML document 104, or the various expressions from the macros that have been selected. The expression is broken up into tokens by the Tokenizer classes 1994. These tokens are the various operators, variables, literals, functions and other control symbols used in the RMML expression language detailed above. From these tokens, the Formula object 1990 builds a parse tree, by recursive descent, made up of FormulaNode 1992 objects created from the tokens. The FormulaNode 1992 objects evaluate themselves using the resolver objects VariableResolver 1986 and FunctionResolver 1988. These resolvers in turn call the Evaluator objects 1984 to give them the current value of a variable or a function. For example, the FormulaNode 1982 evaluation process may have an "A" token; the Evaluator object 1984 knows that this means series A on the chart, and uses the vector of data (it could be an array or other data structure) currently found in the chart 716. The formula exception 1996 relays errors associated with the processing of a function.

The foregoing description of an implementation of the present invention has been presented for purposes of illustration and description. It is not exhaustive and does not limit the present invention to the precise form disclosed. Modifications and variations are possible in light of the above teaching or may be acquired from practicing of the present invention. The scope of the present invention is defined by the claims and their equivalents.

APPENDIX A: RDML Document Type Definition ("DTD")

```
<?xml encoding="UTF-8"?>

<!-- The root element: a whole portfolio of data is an "rdmldoc" -->
<!ELEMENT rdmldoc (rdmldoc_header, line_item_set)>

<!-- RDMLDOC_HEADER -->

<!-- Information about the rdmldoc.  An rdmldoc consists of an rdmldoc_header
     and a line_item_set.  Line items in the line_item_set share a
     common data structure.
-->

<!ELEMENT rdmldoc_header (data_source?, formatting_source?, rdmldoc_source?,
          license_terms?, linkset?)>
<!ATTLIST rdmldoc_header
          rdmldoc_ID        CDATA       #REQUIRED
          doc_title         CDATA       #REQUIRED
          timestamp         CDATA       #REQUIRED
          version           CDATA       #IMPLIED
          expiration        CDATA       #IMPLIED
          freq_of_update    CDATA       #IMPLIED
          num_line_items    CDATA       #IMPLIED
          num_datapoints    CDATA       #IMPLIED
          x_indexes         CDATA       #IMPLIED
          first_li_withdata CDATA       #IMPLIED >

<!ELEMENT data_source (contact_info+)>

<!ELEMENT formatting_source (contact_info+)>

<!ELEMENT rdmldoc_source (contact_info+)>

<!ELEMENT license_terms (contact_info?, linkset?)>
<!ATTLIST license_terms
          copyright_cite    CDATA       #REQUIRED
          holder            CDATA       #REQUIRED
          license_type      CDATA       #IMPLIED
          warranty          CDATA       #IMPLIED
          disclaimer        CDATA       #IMPLIED
          terms             CDATA       #IMPLIED
          date              CDATA       #IMPLIED
          email             CDATA       #IMPLIED
          state             CDATA       #IMPLIED
```

```
                country         CDATA           #IMPLIED >

<!ELEMENT contact_info (#PCDATA)>
<!ATTLIST contact_info
        role            CDATA           #REQUIRED
        name            CDATA           #IMPLIED
        company         CDATA           #IMPLIED
        address         CDATA           #IMPLIED
        city            CDATA           #IMPLIED
        state           CDATA           #IMPLIED
        zip             CDATA           #IMPLIED
        country         CDATA           #IMPLIED
        email           CDATA           #IMPLIED
        form            CDATA           #IMPLIED
        href            CDATA           #IMPLIED
        comments        CDATA           #IMPLIED >

<!ELEMENT linkset (link*)>
<!ATTLIST linkset
        form            CDATA           #FIXED 'extended'
        href            CDATA           #IMPLIED >

<!ELEMENT link (#PCDATA) >
<!ATTLIST link
        form            CDATA           #FIXED 'simple'
        href            CDATA           #REQUIRED
        behavior        CDATA           #IMPLIED
        content-role    CDATA           #IMPLIED
        content-title   CDATA           #IMPLIED
        role            CDATA           #IMPLIED
        title           CDATA           #IMPLIED
        show            CDATA           #FIXED 'new'
        actuate         CDATA           #FIXED 'user' >

<!-- LINE_ITEM_SET -->

<!-- Information about the collection of line items -->

<!ELEMENT line_item_set (data_x, li_class_set?, linkset?, line_item+) >
<!ATTLIST line_item_set
        line_item_set_type      CDATA   #REQUIRED
        time_period             CDATA   #REQUIRED
        character_set           CDATA   #IMPLIED
        missing_values          CDATA   #IMPLIED
```

```
        null_values        CDATA        #IMPLIED
        zero_values        CDATA        #IMPLIED
        dates_values       CDATA        #IMPLIED
        percentages        CDATA        #IMPLIED >

<!ELEMENT data_x (#PCDATA) >
<!ATTLIST data_x
        x_title            CDATA        #REQUIRED
        format             CDATA        #REQUIRED
        x_notes            CDATA        #IMPLIED
        x_desc             CDATA        #IMPLIED
        x_prec             CDATA        #REQUIRED
        x_unit             CDATA        #REQUIRED
        x_mag              CDATA        #REQUIRED
        x_mod              CDATA        #REQUIRED
        x_measure          CDATA        #REQUIRED
        x_scale            CDATA        #REQUIRED
        x_adjustment       CDATA        #REQUIRED
        x_links            CDATA        #REQUIRED >

<!ELEMENT li_class_set (li_class+)>

<!ELEMENT li_class (#PCDATA)>
<!ATTLIST li_class
        class_name         CDATA        #REQUIRED
        parent_class       CDATA        #REQUIRED
        form               CDATA        #FIXED 'simple'
        href               CDATA        #IMPLIED
        description        CDATA        #IMPLIED >

<!-- LINE_ITEM -->

<!-- Information about the Line Item -->

<!ELEMENT line_item (data_x?, data_y, linkset?, note_set?) >
<!ATTLIST line_item
        li_ID              CDATA        #REQUIRED
        li_legend          CDATA        #REQUIRED
        li_title           CDATA        #REQUIRED
        li_cat             CDATA        #IMPLIED
        y_axis_title       CDATA        #REQUIRED
        level              CDATA        #REQUIRED
        format             CDATA        #REQUIRED
        relation           CDATA        #REQUIRED
```

| | | |
|---|---|---|
| li_notes | CDATA | #REQUIRED |
| li_desc | CDATA | #REQUIRED |
| li_prec | CDATA | #REQUIRED |
| li_unit | CDATA | #REQUIRED |
| li_mag | CDATA | #REQUIRED |
| li_mod | CDATA | #REQUIRED |
| li_measure | CDATA | #REQUIRED |
| li_scale | CDATA | #REQUIRED |
| li_adjustment | CDATA | #REQUIRED |
| li_aggregation | CDATA | #IMPLIED > |

<!ELEMENT data_y (#PCDATA)>

<!ELEMENT analysis (linkset?)>

<!ELEMENT note_set (note+)>

<!ELEMENT note (#PCDATA)>
<!ATTLIST note

| | | |
|---|---|---|
| note_type | CDATA | #IMPLIED > |

APPENDIX B: Sample RDML Document

```
<rdmldoc>
 <rdmldoc_header
      rdmldoc_ID = "rdml_thomson_cs1"
      doc_title = "Computer Services Companies"
      timestamp = "1999-01-19T23:00:00"
      version = "1.0.0"
      expiration = "2000-01-19T23:00:00"
      freq_of_update = "Annual"
      num_line_items = "0"
      num_datapoints = "0"
      x_indexes = "-9, -8, -7"
      first_li_withdata = "3" >

<data_source>
 <contact_info
      role = "Data Source"
      name = "Russell T. Davis"
      company = "RDML, Inc."
      address = "2 Wisconsin Circle, Suite 700"
      city = "Chevy Chase"
      state = "MD"
      zip = "20815"
      country = "USA"
      email = "rt_davis@sprynet.com"
      xlink:form = "simple"
      href = "http://www.rdml.com"
      comments = "" >
</contact_info>
</data_source>
<formatting_source>
<contact_info
      role = "Formatting Source"
      name = "Russell T. Davis"
      company = "RDML, Inc."
      address = "2 Wisconsin Circle, Suite 700"
      city = "Chevy Chase"
      state = "MD"
      zip = "20815"
      country = "USA"
      email = "rt_davis@sprynet.com"
      xlink:form = "simple"
      href = "http://www.rdml.com"
      comments = "" >
```

```
</contact_info>
</formatting_source>
<rdmldoc_source>
 <contact_info
        role = "RDMLDoc Source"
        name = "Russell T. Davis"
        company = "RDML, Inc."
        address = "2 Wisconsin Circle, Suite 700"
        city = "Chevy Chase"
        state = "MD"
        zip = "20815"
        country = "USA"
        email = "rt_davis@sprynet.com"
        xlink:form = "simple"
        href = "http://www.rdml.com"
        comments = "" >
 </contact_info>
</rdmldoc_source>
<license_terms
        copyright_cite = "Copyright 1998, RDML, Inc.  All Rights Reserved"
        holder = "RDML, Inc."
        license_type = "Payment Per Download"
        warranty = "No warranty is expressed or implied.  Use this data at your own risk."
        disclaimer = "This data is provided 'as-is'.  The provider assumes no
responsibility for its use or misuse."
        terms = "$1 per RDMLDoc download"
        date = "1999.0123000000.00"
        email = "license@rdml.com"
        href = "http://www.rdml.com"        state = "MD"        country = "USA" >

<contact_info
        role = "RDMLDoc Source"
        name = "Russell T. Davis"
        company = "RDML, Inc."
        address = "2 Wisconsin Circle, Suite 700"
        city = "Chevy Chase"
        state = "MD"
        zip = "20815"
        country = "USA"
        email = "rt_davis@sprynet.com"
        xlink:form = "simple"
        href = "http://www.rdml.com"
        comments = "" >
  </contact_info>
</license_terms>
```

```
</rdmldoc_header>
<line_item_set
        line_item_set_type = "Category"
        time_period = ""
        character_set = ""
        missing_values = ""
        null_values = ""
        zero_values = ""
        dates_values = ""
        percentages = "" >

<data_x
        x_title = "Company"
        format = ""
        x_notes = ""
        x_desc = ""
        x_prec = ""
        x_unit = ""
        x_mag = ""
        x_mod = ""
        x_measure = ""
        x_scale = ""
        x_adjustment = ""
        x_links = "" >
AUD, BSYS, CEN, CSC, CVG, DST, EDS, FISV, GLC, PAYX, TSG, SDS   </data_x>
  <li_class_set>
  <li_class
        class_name = ""
        parent_class = ""
        xlink:form = "simple"
        href = ""
        description = "" >     </li_class>
  </li_class set>
  <linkset>
  <link
        xlink:form = "simple"
        href = "http://www.rdml.com"
        behavior = ""
        content-role = ""
        content-title = ""
        role = "Original Data Sources"
        title = "RDML Formatted Source Table"
        show = "new"
        actuate = "user" >     </link>
```

```
</linkset>

<line_item
        li_ID = "1"
        li_legend = "Computer Services Companies"
        li_title = ""
        li_cat = ""
        y_axis_title = ""
        level = "1"
        format = ""
        relation = "Parent"
        li_notes = ""
        li_desc = ""
        li_prec = ""
        li_unit = ""
        li_mag = ""
        li_mod = ""
        li_measure = ""
        li_scale = ""
        li_adjustment = "">
    <data_y>

' ' ' ' ' ' ' ' ' ' '

</data_y>
    <linkset>
    <link
        xlink:form = "simple"
        href = "http://www.rdml.com"
        behavior = ""
        content-role = ""
        content-title = ""
        role = "Original Data Sources"
        title = "RDML Formatted Source Table"
        show = "new"
        actuate = "user" >    </link>
        </linkset>

</line_item>
<line_item
        li_ID = "2"
        li_legend = "Stock Performance"
        li_title = "Stock Overview"
        li_cat = ""
        y_axis_title = ""
        level = "2"
```

```
            format = ""
            relation = "Parent"
            li_notes = ""
            li_desc = ""
            li_prec = ""
            li_unit = ""
            li_mag = ""
            li_mod = ""
            li_measure = ""
            li_scale = ""
            li_adjustment = "">
    <data_y>
' ' ' ' ' ' ' ' ' '
    </data_y>
    <linkset>
     <link
            xlink:form = "simple"
            href = "http://www.rdml.com"
            behavior = ""
            content-role = ""
            content-title = ""
            role = "Original Data Sources"
            title = "RDML Formatted Source Table"
            show = "new"
            actuate = "user" >    </link>

</linkset>

</line_item>
<line_item
        li_ID = "3"
        li_legend = "Stock Price (12/31/98)"
        li_title = "Stock Overview"
        li_cat = ""
        y_axis_title = "$ per share (12/31/98)"
        level = "3"
        format = "#,##0.00; (#,##0.00)"
        relation = "ChildStyle"
        li_notes = ""
        li_desc = ""
        li_prec = "2"
        li_unit = "$"
        li_mag = "0"
        li_mod = "per"
```

```
            li_measure = "share"
            li_scale = ""
            li_adjustment = "">
        <data_y>
40.1, 51.63, 69.81, 64.44, 22.13, 67.06, 50.19, 51.44, 43.5, 51.44, 44.5, 39.69,
        </data_y>
        <linkset>
         <link
             xlink:form = "simple"
             href = "http://www.rdml.com"
             behavior = ""
             content-role = ""
             content-title = ""
             role = "Original Data Sources"
             title = "RDML Formatted Source Table"
             show = "new"
             actuate = "user" >      </link>

</linkset>

</line_item>
    <line_item
            li_ID = "4"
            li_legend = "Shares Outstanding"
            li_title = "Stock Overview"
            li_cat = ""
            y_axis_title = "Shares outstanding"
            level = "3"
            format = "#, ##0; (#, ##0)"
            relation = "ChildStyle"
            li_notes = ""
            li_desc = ""
            li_prec = "0"
            li_unit = "shares"
            li_mag = "6"
            li_mod = ""
            li_measure = ""
            li_scale = ""
            li_adjustment = "">
        <data_y>
627, 27, 74, 162, 145, 64, 494, 85, 105, 166, 131, 107,
        </data_y>
        <linkset>
         <link
             xlink:form = "simple"
```

```
        href = "http://www.rdml.com"
        behavior = ""
        content-role = ""
        content-title = ""
        role = "Original Data Sources"
        title = "RDML Formatted Source Table"
        show = "new"
        actuate = "user" >    </link>

</linkset>

</line_item>
    <line_item
        li_ID = "5"
        li_legend = "% Institutional Holdings"
        li_title = "Stock Overview"
        li_cat = ""
        y_axis_title = "% of outstanding shares"
        level = "3"
        format = "0.00%; (0.00%)"
        relation = "ChildStyle"
        li_notes = ""
        li_desc = ""
        li_prec = "2"
        li_unit = "%"
        li_mag = "0"
        li_mod = "of"
        li_measure = "outstanding shares"
        li_scale = ""
        li_adjustment = "">
    <data_y>
0.65, 0.8, 0.75, 0.64, 0, 0.44, 0.49, 0.67, 0.25, 0.53, 0.13, 0.71,
    </data_y>
    <linkset>
    <link
        xlink:form = "simple"
        href = "http://www.rdml.com"
        behavior = ""
        content-role = ""
        content-title = ""
        role = "Original Data Sources"
        title = "RDML Formatted Source Table"
        show = "new"
        actuate = "user" >    </link>
```

\</linkset>

\</line_item>
<line_item
    li_ID = "6"
    li_legend = "Market Capitalization"
    li_title = "Stock Overview"
    li_cat = ""
    y_axis_title = "$ in Millions"
    level = "3"
    format = "#, ##0; (#, ##0)"
    relation = "ChildStyle"
    li_notes = ""
    li_desc = ""
    li_prec = "0"
    li_unit = "$"
    li_mag = "6"
    li_mod = "in"
    li_measure = ""
    li_scale = ""
    li_adjustment = "">
<data_y>
25142.7, 1394.01, 5165.94, 10439.28, 3208.85, 4291.84, 24793.86, 4372.4, 4567.5, 8539.04, 5829.5, 4246.83,
\</data_y>
<linkset>
<link
    xlink:form = "simple"
    href = "http://www.rdml.com"
    behavior = ""
    content-role = ""
    content-title = ""
    role = "Original Data Sources"
    title = "RDML Formatted Source Table"
    show = "new"
    actuate = "user" >     \</link>

\</linkset>

\</line_item>
<line_item
    li_ID = "7"
    li_legend = "Reported EPS"
    li_title = "Stock Overview"
    li_cat = ""

```
            y_axis_title = "Earnings per share"
            level = "3"
            format = "#, ##0.00; (#,##0.00)"
            relation = "ChildStyle"
            li_notes = ""
            li_desc = ""
            li_prec = "2"
            li unit = "$"
            li_mag = "0"
            li_mod = "per"
            li_measure = "share"
            li_scale = ""
            li_adjustment = "">
        <data_y>
1.13, 2.05, 1.9, 2.1, 0.71, 1.48, 1.7, 1.35, 1.86, 0.82, 1.72, 1.17,
        </data_y>
        <linkset>
        <link
            xlink:form = "simple"
            href = "http://www.rdml.com"
            behavior = ""
            content-role = ""
            content-title = ""
            role = "Original Data Sources"
            title = "RDML Formatted Source Table"
            show = "new"
            actuate = "user" >      </link>

</linkset>

</line_item>
    <line_item
        li_ID = "8"
        li_legend = "Earnings"
        li_title = "Stock Overview"
        li_cat = ""
        y_axis_title = "$ in Millions"
        level = "3"
        format = "#, ##0; (#,##0)"
        relation = "ChildStyle"
        li_notes = ""
        li_desc = ""
        li_prec = "0"
        li_unit = "$"
        li_mag = "6"
```

```
            li_mod = "in"
            li_measure = ""
            li_scale = ""
            li_adjustment = "">
    <data_y>
708.51, 55.35, 140.6, 340.2, 102.95, 94.72, 839.8, 114.75, 195.3, 136.12,
225.32, 125.19,
    </data_y>
    <linkset>
     <link
         xlink:form = "simple"
         href = "http://www.rdml.com"
         behavior = ""
         content-role = ""
         content-title =
         role = "Original Data Sources"
         title = "RDML Formatted Source Table"
         show = "new"
         actuate = "user" >     </link>

</linkset>

</line_item>
<line_item
        li_ID = "9"
        li_legend = "Cash Flow per share"
        li_title = "Stock Overview"
        li_cat = ""
        y_axis_title = "$ per share"
        level = "3"
        format = "#, ##0; (#,##0)"
        relation = "ChildStyle"
        li_notes = ""
        li_desc = ""
        li_prec = "2"
        li_unit = "$"
        li_mag = "0"
        li_mod = "per"
        li_measure = "share"
        li_scale = ""
        li_adjustment = "">
<data_y>
1.41, 2.13, 3.71, 4.95, 1.39, 3.18, 4, 1.98, 3.44, 0.96, 3.2, 2.5,
    </data_y>
    <linkset>
```

```
<link
    xlink:form = "simple"
    href = "http://www.rdml.com"
    behavior = ""
    content-role = ""
    content-title = ""
    role = "Original Data Sources"
    title = "RDML Formatted Source Table"
    show = "new"
    actuate = "user" >    </link>

</linkset>

</line_item>

<line_item
    li_ID = "10"
    li_legend = "Cash Flow"
    li_title = "Stock Overview"
    li_cat = ""
    y_axis_title = "$ in Millions"
    level = "3"
    format = "#, ##0; (#, ##0)"
    relation = "ChildStyle"
    li_notes = ""
    li_desc = ""
    li_prec = "0"
    li_unit = "$"
    li_mag = "6"
    li_mod = "in"
    li_measure = ""
    li_scale = ""
    li_adjustment = "">
<data_y>
884.07, 57.51, 274.54, 801.9, 201.55, 203.52, 1976, 168.3, 361.2, 159.36, 419.2, 267.5,
</data_y>
<linkset>
 <link
    xlink:form = "simple"
    href = "http://www.rdml.com"
    behavior = ""
    content-role = ""
    content-title = ""
    role = "Original Data Sources"
```

```
                title = "RDML Formatted Source Table"
                show = "new"
                actuate = "user" >    </link>

</linkset>

</line_item>
<line_item
        li_ID = "11"
        li_legend = "Price/Earnings Ratio (PE)"
        li_title = "Stock Overview"
        li_cat = ""
        y_axis_title = "P/E Ratio"
        level = "3"
        format = "#, ##0; (#,##0)"
        relation = "ChildStyle"
        li_notes = ""
        li_desc = ""
        li_prec = "2"
        li_unit = "P/E Ratio"
        li_mag = "0"
        li_mod = ""
        li_measure = ""
        li_scale = ""
        li_adjustment = "">
    <data_y>
35.4867256637168,  25.1853658536585,  36.7421052631579,  30.6857142857143,
31.169014084507,   45.3108108108108,  29.5235294117647,  38.1037037037037,
23.3870967741935,  62.7317073170732,  25.8720930232558,  33.9230769230769,
    </data_y>
    <linkset>
     <link
        xlink:form = "simple"
        href = "http://www.rdml.com"
        behavior = ""
        content-role = ""
        content-title = ""
        role = "Original Data Sources"
        title = "RDML Formatted Source Table"
        show = "new"
        actuate = "user" >    </link>

</linkset>
```

```
</line_item>
<line_item
        li_ID = "12"
        li_legend = "Estimated 5-year growth"
        li_title = "Stock Overview"
        li_cat = ""
        y_axis_title = "% growth"
        level = "3"
        format = "0.00%; (0.00%)"
        relation = "ChildStyle"
        li_notes = ""
        li_desc = ""
        li_prec = "2"
        li_unit = "%"
        li_mag = "0"
        lit_mod = ""
        li_measure = ""
        li_scale = ""
        li_adjustment = "">
    <data_y>
0.15, 0.18, 0.2, 0.22, 0.23, 0.22, 0.15, 0.2, 0.15, 0.3, 0.13, 0.2,
    </data_y>
    <linkset>
      <link
            xlink:form = "simple"
            href = "http://www.rdml.com"
            behavior = ""
            content-role = ""
            content-title = ""
            role = "Original Data Sources"
            title = "RDML Formatted Source Table"
            show = "new"
            actuate = "user" >      </link>

</linkset>
```

```
</line_item>
<line_item
    li_ID = "13"
    li_legend = "Return on Equity"
    li_title = "Stock Overview"
    li_cat = ""
    y_axis_title = "Earnings as % of Book Value"
    level = "3"
    format = "0.00%; (0.00%)"
    relation = "ChildStyle"
    li_notes = ""
    li_desc = ""
    li_prec = "2"
    li_unit = "%"
    li_mag = "0"
    li_mod = ""
    li_measure = ""
    li_scale = ""
    li_adjustment = "">
  <data_y>

' ' ' ' ' ' ' ' ' '

</data_y>
  <linkset>
   <link
      xlink:form = "simple"
      href = "http://www.rdml.com"
      behavior = ""
      content-role = ""
      content-title = ""
      role = "Original Data Sources"
      title = "RDML Formatted Source Table"
      show = "new"
      actuate = "user" >    </link>

</linkset>
 </line_item>
 </line_item_set>
</rdmldoc>
```

APPENDIX C: UnitList XML document

```xml
<?xml version="1.0" encoding="utf-8" ?>
<unitlist>
<unit name="inch">
    <conversion
        conv_target = "centimeter"
        conv_factor = "2.5400050"
        conv_constant = ""
        conv_log = ""
        conv_source = "FGM"
        conv_href = "">
    </conversion>
    <type>Length</type>
    <subtype>Linear</subtype>
    <plural>inches</plural>
    <alias>in</alias>
    <desc>Approximately the width of a man's thumb.</desc>
    <icon href="inch.gif"></icon>
</unit>

<unit name="foot">
    <conversion
        conv_target = "meter"
        conv_factor = "0.30480060"
        conv_constant = ""
        conv_log = ""
        conv_source = "ISO"
        conv_href = "">
    </conversion>
    <type>length</type>
    <subtype>Linear</subtype>
    <plural>feet</plural>
    <alias>ft</alias>
    <desc>Originally, the average length of a human foot</desc>
    <icon href="foot.gif"></icon>
</unit>

<unit name="yard">
    <conversion
        conv_target = "meter"
        conv_factor = "1.082"
        conv_constant = ""
        conv_log = ""
        conv_source = "ISO"
```

```xml
        conv_href = "">
    </conversion>
    <type>length</type>
    <subtype>Linear</subtype>
    <plural>yards</plural>
    <alias></alias>
    <desc>Three feet</desc>
    <icon href="yard.gif"></icon>
</unit>

<unit name="meter">
    <conversion
        conv_target = "meter"
        conv_factor = "1.0"
        conv_constant = ""
        conv_log = "".
        conv_source = "ISO"
        conv_href = "">
    </conversion>
    <type>length</type>
    <subtype>Linear</subtype>
    <plural>meters</plural>
    <alias>m,mtr</alias>
    <desc>One thousandth of a kilometer</desc>
    <icon href="meter.gif"></icon>
</unit>

<unit name="mile">
    <conversion
        conv_target = "kilometer"
        conv_factor = "1.6093472"
        conv_constant = ""
        conv_log = ""
        conv_source = "FGM"
        conv_href = "">
    </conversion>
    <type>length</type>
    <subtype>Linear</subtype>
    <plural>miles</plural>
    <alias></alias>
    <desc>English surveying unit, set to be equal to 8 furlongs.</desc>
    <icon href="mile.gif"></icon>
</unit>

<unit name="dollar">
```

```
<conversion
    conv_target = "pound"
    conv_factor = "1.312"
    conv_constant = ""
    conv_log = ""
    conv_source = "ISO"
    conv_href = "">
</conversion>
<type>currency</type>
<plural>pounds</plural>
<alias>sterling</alias>
<desc>British pound sterling. </desc>
<icon href="pound.gif"></icon>
</unit>

<unit name="Deutschmark">
<conversion
    conv_target = "dollar"
    conv_factor = "1.732"
    conv_constant = ""
    conv_log = ""
    conv_source = "ISO"
    conv_href = "">
</conversion>
<type>currency</type>
<plural>Duetschmarks</plural>
<alias>Marks</alias>
<desc>German Deutschmarks</desc>
<icon href="marks.gif"></icon>
</unit>

<unit name="Francs">
<conversion
    conv_target = "dollar"
    conv_factor = "0.812"
    conv_constant = ""
    conv_log = ""
    conv_source = "ISO"
    conv_href = "">
</conversion>
<type>currency</type>
<plural>francs</plural>
<alias>ff</alias>
<desc>French francs</desc>
<icon href="francs.gif"></icon>
```

```
</unit>

<unit name="acres">
    <conversion
        conv_target = "square meter"
        conv_factor = "5125"
        conv_constant = ""
        conv_log = ""
        conv_source = "ISO"
        conv_href = "">
    </conversion>
    <type>area</type>
    <plural>acres</plural>
    <alias>acr</alias>
    <desc>In medieval times, the amount of land one man could plow in one day.</desc>
    <icon href="acre.gif"></icon>
</unit>

<unit name="square foot">
    <conversion
        conv_target = "square meter"
        conv_factor = "0.15"
        conv_constant = ""
        conv_log = ""
        conv_source = "ISO"
        conv_href = "">
    </conversion>
    <type>area</type>
    <plural>square feet</plural>
    <alias>sq ft</alias>
    <desc>An area one foot by one foot.</desc>
    <icon href="sqfoot.gif"></icon>
</unit>

</unitlist>
```

APPENDIX D: RMML Document Type Definition ("DTD")

```
<?xml encoding="UTF-8"?>

<!-- The root element: a whole macro is a "macrodoc".
A macrodoc consists of three elements:
    a macro_header, a macro_code, and a macro_references element.
-->
<!ELEMENT macrodoc (macro_header, macro_code, macro_references)>

<!-- MACRO_HEADER -->
<!-- Information about the macro.
-->

<!ELEMENT macro_header (macro_source, license_terms, linkset?, documentation)>
<!ATTLIST macro_header
    macrodoc_ID     CDATA       #REQUIRED
    macro_title     CDATA       #REQUIRED
    macro_type      CDATA       #REQUIRED
    result_type     CDATA       #REQUIRED
    rdmldoc_type    CDATA       #REQUIRED
    timestamp       CDATA       #IMPLIED
    version         CDATA       #IMPLIED
    expiration      CDATA       #IMPLIED
    freq_of_update  CDATA       #IMPLIED >

<!ELEMENT macro_source (contact_info+)>

<!ELEMENT license_terms (contact_info, linkset?)>
<!ATTLIST license_terms
    copyright_cite  CDATA       #REQUIRED
    holder          CDATA       #IMPLIED
    license_type    CDATA       #IMPLIED
    warranty        CDATA       #IMPLIED
    disclaimer      CDATA       #IMPLIED
    terms           CDATA       #IMPLIED
    date            CDATA       #IMPLIED
    email           CDATA       #IMPLIED
    state           CDATA       #IMPLIED
    country         CDATA       #IMPLIED >

<!ELEMENT contact_info (#PCDATA)>
<!ATTLIST contact_info
    role            CDATA       #IMPLIED
    name            CDATA       #IMPLIED
```

```
    company      CDATA          #IMPLIED
    address      CDATA          #IMPLIED
    city         CDATA          #IMPLIED
    state        CDATA          #IMPLIED
    zip          CDATA          #IMPLIED
    country      CDATA          #IMPLIED
    email        CDATA          #IMPLIED
    xlink:form   CDATA          #IMPLIED
    href         CDATA          #IMPLIED
    comments     CDATA          #IMPLIED >
```

<!ELEMENT linkset (link*)>
<!ATTLIST linkset
```
    xlink_form   CDATA          #FIXED 'extended'
    href         CDATA          #IMPLIED >
```

<!ELEMENT link (#PCDATA) >
<!ATTLIST link
```
    xlink_form    CDATA         #FIXED 'simple'
    href          CDATA         #REQUIRED
    behavior      CDATA         #IMPLIED
    content-role  CDATA         #IMPLIED
    content-title CDATA         #IMPLIED
    role          CDATA         #IMPLIED
    title         CDATA         #IMPLIED
    show          CDATA         #FIXED 'new'
    actuate       CDATA         #FIXED 'user' >
```

<!ELEMENT documentation (macro_description, help_page*)>

<!ELEMENT macro_description (#PCDATA)>

<!ELEMENT help_page (#PCDATA)>

<!ELEMENT macro_code (code, instructions, gui, variable_set?, qualifiers, error_handling, testing)>

<!ELEMENT code (#PCDATA)>

<!ELEMENT instructions (#PCDATA)>

<!ELEMENT gui (comp_rpanel? | comp_ipanel? | comp_list? | comp_vector?)>

<!ELEMENT comp_rpanel (comp_rbutton*)>
<!ATTLIST comp_rpanel

```
    variable_name    CDATA           #REQUIRED
    intro_label      CDATA           #IMPLIED
    visible          CDATA           #IMPLIED
    legend           CDATA           #IMPLIED
    legend_type      CDATA           #IMPLIED >

<!ELEMENT comp_rbutton (#PCDATA)>
<!ATTLIST comp_rbutton
    label            CDATA           #REQUIRED
    value            CDATA           #REQUIRED
    isDefault        CDATA           #REQUIRED
    icon             CDATA           #IMPLIED
    desc             CDATA           #IMPLIED
    legend           CDATA           #IMPLIED
    legend_type      CDATA           #IMPLIED >

<!ELEMENT comp_ipanel (comp_ifield*)>

<!ELEMENT comp_ifield (#PCDATA)>
<!ATTLIST comp_ifield
    variable_name    CDATA           #REQUIRED
    variable_label   CDATA           #REQUIRED
    intro_label      CDATA           #REQUIRED
    default_value    CDATA           #REQUIRED
    desc             CDATA           #IMPLIED
    legend           CDATA           #IMPLIED
    legend_type      CDATA           #IMPLIED >

<!ELEMENT comp_list (comp_listitem*)>
<!ATTLIST comp_list
    variable_name    CDATA           #REQUIRED
    intro_label      CDATA           #REQUIRED
    default_item     CDATA           #REQUIRED
    legend           CDATA           #IMPLIED
    legend_type      CDATA           #IMPLIED >

<!ELEMENT comp_listitem (#PCDATA)>
<!ATTLIST comp_listitem
    label            CDATA           #REQUIRED
    value            CDATA           #REQUIRED
    icon             CDATA           #IMPLIED
    desc             CDATA           #IMPLIED
    legend           CDATA           #IMPLIED
    legend_type      CDATA           #IMPLIED >
```

```
<!ELEMENT comp_vector (line_item)>
<!ATTLIST comp_vector
    variable_name   CDATA       #REQUIRED
    intro_label     CDATA       #REQUIRED
    default_item    CDATA       #REQUIRED
    desc            CDATA       #IMPLIED
    legend          CDATA       #IMPLIED
    legend_type     CDATA       #IMPLIED >

<!ELEMENT variable_set (variable*)>

<!ELEMENT variable (#PCDATA | line_item)*>
<!ATTLIST variable
    variable_name   CDATA       #REQUIRED
    variable_type   CDATA       #REQUIRED
    value           CDATA       #REQUIRED
    href            CDATA       #IMPLIED
    subref          CDATA       #IMPLIED >

<!ELEMENT qualifiers (#PCDATA)>

<!ELEMENT error_handling (#PCDATA)>

<!ELEMENT testing (#PCDATA)>

<!ELEMENT macro_references (macrodocs?, datadocs?)>

<!ELEMENT macrodocs (#PCDATA)>

<!ELEMENT datadocs (#PCDATA)>

<!ELEMENT line_item (data_x?, data_y, linkset?, note_set?) >
<!ATTLIST line_item
    li_ID           CDATA       #REQUIRED
    li_legend       CDATA       #REQUIRED
    li_title        CDATA       #REQUIRED
    li_cat          CDATA       #IMPLIED
    y_axis_title    CDATA       #REQUIRED
    level           CDATA       #REQUIRED
    format          CDATA       #REQUIRED
    relation        CDATA       #REQUIRED
    li_notes        CDATA       #REQUIRED
    li_desc         CDATA       #REQUIRED
    li_prec         CDATA       #REQUIRED
    li_unit         CDATA       #REQUIRED
```

```
    li_mag              CDATA           #REQUIRED
    li_mod              CDATA           #REQUIRED
    li_measure          CDATA           #REQUIRED
    li_scale            CDATA           #REQUIRED
    li_adjustment       CDATA           #REQUIRED
    li_aggregation      CDATA           #IMPLIED >

<!ELEMENT data_y (#PCDATA)>

<!ELEMENT note_set (note+)>

<!ELEMENT note (#PCDATA)>
<!ATTLIST note
    note_type           CDATA           #IMPLIED >

<!ELEMENT data_x (#PCDATA) >
<!ATTLIST data_x
    x_title             CDATA           #REQUIRED
    format              CDATA           #REQUIRED
    x_notes             CDATA           #IMPLIED
    x_desc              CDATA           #IMPLIED
    x_prec              CDATA           #REQUIRED
    x_unit              CDATA           #REQUIRED
    x_mag               CDATA           #REQUIRED
    x_mod               CDATA           #REQUIRED
    x_measure           CDATA           #REQUIRED
    x_scale             CDATA           #REQUIRED
    x_adjustment        CDATA           #REQUIRED
    x_links             CDATA           #REQUIRED >
```

APPENDIX E: Sample RMML document

```xml
<?xml version="1.0" encoding="UTF-8" standalone="no"?>
<!DOCTYPE macrodoc PUBLIC "-//.." "RMML1.dtd" >

<macrodoc>
 <macro_header
    macrodoc_ID = "rmml_sort"
    macro_title = "Sort"
    macro_type = "TSL"
    result_type = "replace_each"
    rdmldoc_type = "TS"
    timestamp = "1999-01-19T23:00:00"
    version = "1.0.0"
    expiration = "2000-01-19T23:00:00"
    freq_of_update = "Annual" >

<macro_source>
  <contact_info
    role = "Macro Source"
    name = "Russell T. Davis"
    company = "RDML, Inc."
    address = "2 Wisconsin Circle, Suite 700"
    city = "Chevy Chase"
    state = "MD"
    zip = "20815"
    country = "USA"
    email = "rt_davis@sprynet.com"
    href = "http://www.rdml.com"
    comments = "" >
  </contact_info>
 </macro_source>

<license_terms
    copyright_cite = "Copyright 1998, RDML, Inc. All Rights Reserved"
    holder = "RDML, Inc."
    license_type = "Payment Per Download"
    warranty = "No warranty is expressed or implied. Use this data at your own risk."
    disclaimer = "This data is provided 'as-is'. The provider assumes no responsibility for its use or misuse."
    terms = "$1 per RMMLDoc download"
    date = "1999.0123000000.00"
    email = "license@rdml.com"
    state = "MD"
    country = "USA" >
```

```
  <contact_info
    role = "Licensee"
    name = "Russell T. Davis"
    company = "RDML, Inc."
    address = "2 Wisconsin Circle, Suite 700"
    city = "Chevy Chase"
    state = "MD"
    zip = "20815"
    country = "USA"
    email = "rt_davis@sprynet.com"
    href = "http://www.rdml.com"
    comments = "" >
  </contact_info>
</license_terms>

<linkset
    xlink_form = "extended"
    href = "http://www.rdml.com" >
  <link
    xlink_form = "simple"
    href = "http://www.rdml.com"
    behavior = ""
    content-role = ""
    content-title = ""
    role = ""
    title = ""
    show = "new"
    actuate = "user" >
  </link>
</linkset>

<documentation>
  <macro_description>
Adds a line showing the minimum or maximum, according to the parameters
  </macro_description>
  <help_page>
    No Help Page is currently available
  </help_page>
</documentation>

</macro_header>

<macro_code>

<code>
```

```
    IF(ichoice=0, SORT(A,0), IF(ichoice=1, SORT(A,1), A))
</code>

<instructions>
</instructions>

<gui>
  <comp_rpanel
      variable_name = "ichoice"
      intro_label = "Select a parameter:" >

<comp_rbutton
      label = "Ascending"
      value = "0"
      isDefault = "true"
      icon = "" >
    </comp_rbutton>

<comp_rbutton
      label = "Descending"
      value = "1"
      isDefault = "false"
      icon = "" >
    </comp_rbutton>

</comp_rpanel>
</gui>

<qualifiers>
</qualifiers>
<error_handling>
</error_handling>
<testing>
</testing>
</macro_code>

<macro_references>
 <macrodocs>
 </macrodocs>
 <datadocs>
 </datadocs>
</macro_references>

</macrodoc>
```

Appendix F: MS Excel Visual Basic routine for adding "attribute value columns" to a data table

```vb
Private Sub UserForm_Initialize()

cmdOK.SetFocus
    txtChartTitle.Text = ""
    txtYAxisTitle.Text = ""
    cboFormat.AddItem ("#,##0;(#,##0)")
    cboFormat.AddItem ("#,##0.00;(#,##0.00)")
    cboFormat.AddItem ("0.00%;(0.00%)")
    cboFormat.ListIndex = 0
    txtFootnote.Text = "Source: "

Dim NodeX As Node
    Set NodeR = treeUnit.Nodes.Add(, , "r", "Select One: (Default is blank)")
    'Currency
    Set NodeA = treeUnit.Nodes.Add("r", tvwChild, "c", "Currency")
    Set Nodes = treeUnit.Nodes.Add("c", tvwChild, "dus", "$ US")
    Set NodeX = treeUnit.Nodes.Add("c", tvwChild, "puk", "Pounds UK")
    Set NodeX = treeUnit.Nodes.Add("c", tvwChild, "yjp", "Yen Japanese")

'Length
    Set NodeX = treeUnit.Nodes.Add("r", tvwChild, "l", "Length")
    Set NodeX = treeUnit.Nodes.Add("l", tvwChild, "Feet", "Feet")
    Set NodeX = treeUnit.Nodes.Add("l", tvwChild, "Meters", "Meters")

'Area
    Set NodeX = treeUnit.Nodes.Add("r", tvwChild, "a", "Area")
    Set NodeX = treeUnit.Nodes.Add("a", tvwChild, "SqFeet", "Square Feet")
    Set NodeX = treeUnit.Nodes.Add("a", tvwChild, "SqMeters", "Square Meters")

'tree formatting
    NodeA.EnsureVisible

'Magnitude ComboBox
    cboMagnitude.AddItem ("As-Is")
    cboMagnitude.AddItem ("Thousands")
    cboMagnitude.AddItem ("Millions")
    cboMagnitude.AddItem ("Billions")
    cboMagnitude.ListIndex = 0

End Sub

Private Sub cmdCancel_Click()
```

End
End Sub

Private Sub cmdOK_Click()

rcount = Selection.Rows.Count

'li_ID
Selection.EntireColumn.Insert
ActiveCell.Select
ActiveCell.FormulaR1C1 = "li_ID"
ActiveCell.Offset(1, 0).Range("A1").Select
ActiveCell.FormulaR1C1 = "1"
ActiveCell.Offset(1, 0).Range("A1").Select
ActiveCell.FormulaR1C1 = "=R[-1]C+1"
ActiveCell.Select
Selection.Copy
r = "A1:A" & (rcount - 3)
ActiveCell.Offset(1, 0).Range(r).Select
ActiveSheet.Paste
Application.CutCopyMode = False 'li_legend
ActiveCell.Offset(-3, 1).Range("A1").Select
ActiveCell.FormulaR1C1 = "li_legend"

'li_title
ActiveCell.Offset(0, 1).Columns("A:A").EntireColumn.Select
Selection.Insert Shift:=xlToRight
ActiveCell.Select
ActiveCell.FormulaR1C1 = "li_title"
ActiveCell.Offset(1, 0).Range("A1").Select
ActiveCell.FormulaR1C1 = txtChartTitle.Text
ActiveCell.Select
Selection.Copy
r = "A1:A" & (rcount - 2)
ActiveCell.Offset(1, 0).Range(r).Select
ActiveSheet.Paste
Application.CutCopyMode = False 'li_cat
ActiveCell.Offset(0, 1).Columns("A:A").EntireColumn.Select
Selection.Insert Shift:=xlToRight
ActiveCell.Select
ActiveCell.FormulaR1C1 = "li_cat"

```
'y_axis_title
ActiveCell.Offset(0, 1).Columns("A:A").EntireColumn.Select
Selection.Insert Shift:=xlToRight
ActiveCell.Select
ActiveCell.FormulaR1C1 = "y_axis_title"
ActiveCell.Offset(1, 0).Range("A1").Select
ActiveCell.FormulaR1C1 = txtYAxisTitle.Text
ActiveCell.Select
Selection.Copy
r = "A1:A" & (rcount - 2)
Selection.ColumnWidth = 8
ActiveCell.Offset(1, 0).Range(r).Select
ActiveSheet.Paste
Application.CutCopyMode = False 'level
ActiveCell.Offset(0, 1).Columns("A:A").EntireColumn.Select
Selection.Insert Shift:=xlToRight
ActiveCell.Select
ActiveCell.FormulaR1C1 = "level"
ActiveCell.Offset(1, 0).Range("A1").Select
ActiveCell.FormulaR1C1 = "1"
ActiveCell.Select
Selection.Copy
r = "A1:A" & (rcount - 2)
Selection.ColumnWidth = 8
ActiveCell.Offset(1, 0).Range(r).Select
ActiveSheet.Paste
Application.CutCopyMode = False 'format
ActiveCell.Offset(0, 1).Columns("A:A").EntireColumn.Select
Selection.Insert Shift:=xlToRight
ActiveCell.Select
ActiveCell.FormulaR1C1 = "format"
ActiveCell.Offset(1, 0).Range("A1").Select
ActiveCell.FormulaR1C1 = cboFormat.value
ActiveCell.Select
Selection.Copy
r = "A1:A" & (rcount - 2)
ActiveCell.Offset(1, 0).Range(r).Select
ActiveSheet.Paste
Application.CutCopyMode = False
```

```
'relation
ActiveCell.Offset(0, 1).Columns("A:A").EntireColumn.Select
Selection.Insert Shift:=xlToRight
ActiveCell.Select
ActiveCell.FormulaR1C1 = "relation"
ActiveCell.Offset(1, 0).Range("A1").Select
ActiveCell.FormulaR1C1 = "Parent"
ActiveCell.Select
Selection.Copy
r = "A1:A" & (rcount - 2)
ActiveCell.Offset(1, 0).Range(r).Select
ActiveSheet.Paste
Application.CutCopyMode = False 'li_notes
ActiveCell.Offset(0, 1).Columns("A:A").EntireColumn.Select
Selection.Insert Shift:=xlToRight
ActiveCell.Select
ActiveCell.FormulaR1C1 = "li_notes"
ActiveCell.Offset(1, 0).Range("A1").Select
ActiveCell.FormulaR1C1 = txtFootnote.Text
ActiveCell.Select
Selection.Copy
r = "A1:A" & (rcount - 2)
Selection.ColumnWidth = 8
ActiveCell.Offset(1, 0).Range(r).Select
ActiveSheet.Paste
Application.CutCopyMode = False 'li_desc
ActiveCell.Offset(0, 1).Columns("A:A").EntireColumn.Select
Selection.Insert Shift:=xlToRight
ActiveCell.Select
ActiveCell.FormulaR1C1 = "li_desc"

'li_prec
ActiveCell.Offset(0, 1).Columns("A:A").EntireColumn.Select
Selection.Insert Shift:=xlToRight
ActiveCell.Select
ActiveCell.FormulaR1C1 = "li_prec"

'li_unit
ActiveCell.Offset(0, 1).Columns("A:A").EntireColumn.Select
Selection.Insert Shift:=xlToRight
ActiveCell.Select
```

```
ActiveCell.FormulaR1C1 = "li_unit"
ActiveCell.Offset(1, 0).Range("A1").Select
u = ""
On Error Resume Next
u = treeUnit.SelectedItem.Text
ActiveCell.FormulaR1C1 = u
ActiveCell.Select
Selection.Copy
r = "A1:A" & (rcount - 2)
ActiveCell.Offset(1, 0).Range(r).Select
ActiveSheet.Paste
Application.CutCopyMode = False 'li_mag
'first calculate the value to put in
If (StrComp(cboMagnitude.value, "As-Is") = 0) Then
    m = 0
End If
If (StrComp(cboMagnitude.value, "Thousands") = 0) Then
    m = 3
End If
If (StrComp(cboMagnitude.value, "Millions") = 0) Then
    m = 6
End If
If (StrComp(cboMagnitude.value, "Billions") = 0) Then
    m = 9
End If ActiveCell.Offset(0, 1).Columns("A:A").EntireColumn.Select
Selection.Insert Shift:=xlToRight
ActiveCell.Select
ActiveCell.FormulaR1C1 = "li_mag"
ActiveCell.Offset(1, 0).Range("A1").Select
ActiveCell.FormulaR1C1 = m
ActiveCell.Select
Selection.Copy
r = "A1:A" & (rcount - 2)
ActiveCell.Offset(1, 0).Range(r).Select
ActiveSheet.Paste
Application.CutCopyMode = False 'li_mod
ActiveCell.Offset(0, 1).Columns("A:A").EntireColumn.Select
Selection.Insert Shift:=xlToRight
ActiveCell.Select
```

```
ActiveCell.FormulaR1C1 = "li_mod"

'li_measure
ActiveCell.Offset(0, 1).Columns("A:A").EntireColumn.Select
Selection.Insert Shift:=xlToRight
ActiveCell.Select
ActiveCell.FormulaR1C1 = "li_measure"

'li_scale
ActiveCell.Offset(0, 1).Columns("A:A").EntireColumn.Select
Selection.Insert Shift:=xlToRight
ActiveCell.Select
ActiveCell.FormulaR1C1 = "li_scale"

'li_adjustment
ActiveCell.Offset(0, 1).Columns("A:A").EntireColumn.Select
Selection.Insert Shift:=xlToRight
ActiveCell.Select
ActiveCell.FormulaR1C1 = "li_adjustment"

'li_aggregation
ActiveCell.Offset(0, 1).Columns("A:A").EntireColumn.Select
Selection.Insert Shift:=xlToRight
ActiveCell.Select
ActiveCell.FormulaR1C1 = "li_aggregation"

End
End Sub
```

Appendix G: MS Excel Visual Basic routine creating a tagged document from a spreadsheet data table

```
Private Sub Frame1_Click()

End Sub

Private Sub UserForm_Initialize()

cmdOK.SetFocus
    RefEdit_data.value = "Sheet1!$A$1:$AB$51"
    txtDefaultFile.Text = "D:\default1.rdm"
    txtOutputDir.Text = "D:\"
    txtOutputFile.Text = "out.rdm"
    cboLineItemType.AddItem ("TimeSeries")
    cboLineItemType.AddItem ("Category")
    cboLineItemType.AddItem ("XYPlot")
    cboLineItemType.ListIndex = 0
    cbNonFileDefaults.value = False End Sub Private Sub cmdCancel_Click()
    End
End Sub Private Sub cmdOK_Click()
    Dim buff As String
    buff = createIntro
    buff = buff & createHeader
    buff = buff & createLISet
    buff = buff & createLineItems
    buff = buff & "</line_item_set>" & Chr(10)
    buff = buff & createEnding
    replaceAttribute buff, "rdmldoc_header", "rdmldoc_ID", txtOutputFile.value
    replaceAttribute buff, "rdmldoc_header", "doc_title", txtDocTitle.value
    replaceAttribute buff, "line_item_set", "line_item_set_type", cboLineItemType.SelText
    replaceAttribute buff, "data_x", "x_title", txtXAxisTitle.value
    fillXData buff
    CreateFile (buff)
    End
End Sub Private Sub cmdBrowseDefault_Click()
```

```
CommonDialog1.ShowOpen
txtDefaultFile.Text = CommonDialog1.Filename

End Sub

Private Sub cmdBrowseOutputDir_Click()
  CommonDialog1.ShowOpen
  txtOutputFile.Text = CommonDialog1.Filename End Sub Private Sub UserForm_Click()

End Sub

Private Sub getConfiguration()

End Sub

Private Function createHeader()

'buff will be the buffer that collects the string
  Dim buff As String

'If user wants the program to create a default
  If cbNonFileDefaults.value = True Then
     buff = buff & defHeader
  End If 'Or get the default header values from a file
  buff = createDefHeader 'return
  createHeader = buff End Function Private Function createDefHeader()

'Declarations
  Dim h As String
  Dim wholefile As String

'open the default file
  Dim Def_file As String
```

```
Def_file = txtDefaultFile.Text
Open Def_file For Input As #2
wholefile = Input$(LOF(2), 2)
Close #2

'put the rdmldoc_header into a string
h = getElementByTagName(wholefile, "rdmldoc_header")
createDefHeader = h End Function Private Function createLISet()

'Declarations
    Dim h As String
    Dim wholefile As String

'open the default file
    Dim Def_file As String
    Def_file = txtDefaultFile.Text
    Open Def_file For Input As #2
    wholefile = Input$(LOF(2), 2)
    Close #2

'put the the line item set overall tags into a string
    h = getOpeningElementTag(wholefile, "line_item_set")
    h = h & getElementByTagName(wholefile, "data_x")
    h = h & getElementByTagName(wholefile, "li_class_set")
    h = h & getElementByTagName(wholefile, "linkset")
    createLISet = h End Function Public Function getElementByTagName(str As String, el As String)

startPos = InStr(1, str, "<" & el, 1)
    endPos = InStr(1, str, "</" & el, 1)
    element = Mid(str, startPos, endPos - startPos + Len(el) + 4)
    getElementByTagName = element End Function Public Function getOpeningElementTag(str As String, el As String)

startPos = InStr(1, str, "<" & el, 1)
```

```
    endPos = InStr(startPos, str, ">", 1)
    element = Mid(str, startPos, endPos - startPos + 5)
    getOpeningElementTag = element End Function Private Sub CreateFile(buff)

Dim Outfile As String
    Outfile = txtOutputDir.Text & txtOutputFile.Text

Open Outfile For Output As #1
    Print #1, buff
    Close #1

End Sub

Private Function createIntro()

buff = ""

'Header Information
    buff = buff & "<?xml version=" & Chr(34) & "1.0" & Chr(34)
    buff = buff & " encoding=" & Chr(34) & "UTF-8" & Chr(34)
    buff = buff & " standalone=" & Chr(34) & "no" & Chr(34)
    buff = buff & "?>" & Chr(10)

'DTD Declaration
    buff = buff & "<!DOCTYPE rdmldoc PUBLIC "
    buff = buff & Chr(34) & "-//.." & Chr(34) & " "
    buff = buff & Chr(34) & "RDML1.dtd" & Chr(34)
    buff = buff & " > " & Chr(10)

'begin rdmldoc tag
    buff = buff & "<rdmldoc>" & Chr(10)

'return
    createIntro = buff

End Function

Private Function createEnding()

buff = ""
``` buff = buff & "</rdmldoc>" & Chr(10)

'return
createEnding = buff

End Function

Private Function defHeader()

buff = ""

'return
defHeader = buff

End Function

Private Function createLineItems()

Dim data As Range
t = RefEdit_data.value
createLineItems = fillLineItems(Range(t), cboLineItemType.value)

End Function

'----------------------------------------------------------------
' Procedure:    Fill_line_item()
'
' Purpose:    Prepare the line_item element
'             This element contains information about the line_item
'
' From DTD:
'<!ELEMENT line_item (data_x?, data_y, li_class_set?, analysis?,
'link_set?, note_set?) >
'<!ATTLIST line_item
'    li_ID           CDATA       #REQUIRED
'    li_legend       CDATA       #REQUIRED
'    li_title        CDATA       #REQUIRED
'    li_table        CDATA       #IMPLIED
'    y_axis_title            CDATA       #REQUIRED
'    level           CDATA       #REQUIRED
'    format          CDATA       #REQUIRED
'    relation        CDATA       #REQUIRED
'    li_notes        CDATA       #REQUIRED
'    li_desc         CDATA       #REQUIRED

```
'    li_prec         CDATA    #REQUIRED
'    li_unit         CDATA    #REQUIRED
'    li_mag          CDATA    #REQUIRED
'    li_mod          CDATA    #REQUIRED
'    li_measure      CDATA    #REQUIRED
'    li_scale        CDATA    #REQUIRED
'    li_adjustment   CDATA    #REQUIRED >
'-----------------------------------------------------------------
Public Function fillLineItems(data As Range, litype As String)

'Declarations
Dim J, K As Integer
Dim Max As Integer

'If this is an XYPlot, use the other routine
If litype = "XYPlot" Then
    'Fill_line_item_xy
Else 'Initializations
K = 1
buff = ""
NumLI = data.Rows.Count 'Cycle through all the line items
For N = 2 To NumLI 'Insert opening tag
buff = buff & "   <line_item" & Chr(10)

'Insert the Attributes
addAttribute buff, "li_ID", data.Cells(N, 1), 6, 0
addAttribute buff, "li_legend", data.Cells(N, 2), 6, 0
addAttribute buff, "li_title", data.Cells(N, 3), 6, 0
addAttribute buff, "li_cat", data.Cells(N, 4), 6, 0
addAttribute buff, "y_axis_title", data.Cells(N, 5), 6, 0
addAttribute buff, "level", data.Cells(N, 6), 6, 0
addAttribute buff, "format", data.Cells(N, 7), 6, 0
addAttribute buff, "relation", data.Cells(N, 8), 6, 0
addAttribute buff, "li_notes", data.Cells(N, 9), 6, 0
addAttribute buff, "li_desc", data.Cells(N, 10), 6, 0
addAttribute buff, "li_prec", data.Cells(N, 11), 6, 0
addAttribute buff, "li_unit", data.Cells(N, 12), 6, 0
addAttribute buff, "li_mag", data.Cells(N, 13), 6, 0
addAttribute buff, "li_mod", data.Cells(N, 14), 6, 0
```

```
addAttribute buff, "li_measure", data.Cells(N, 15), 6, 0
addAttribute buff, "li_scale", data.Cells(N, 16), 6, 0
addAttribute buff, "li_adjustment", data.Cells(N, 17), 6, 1

'Fill the body of the tag with a comma-delimited string of the y-data numbers
buff = buff & "   <data_y>" & Chr(10)
MaxLI = NumLI - 2
MaxDP = data.Columns.Count - 17
For K = 1 To MaxDP
   buff = buff & data.Cells(N, 18 + K) & ", "
   If (K Mod 10) = 0 Then
      buff = buff & Chr(10)
   End If
Next K
buff = buff & Chr(10) & "   </data_y>" & Chr(10)

'Insert ELEMENT: analysis
'Insert ELEMENT: li_class_set
'Insert ELEMENT: 'linkset'
'Call FillTag("linkset")
'Insert ELEMENT: note_set 'Insert closing tag for that line item
buff = buff & Chr(10) & "   </line_item>" & Chr(10)

'Every 10 line items, flush the buffer
'If N Mod 5 = 0 Then
'    Call SaveToFile(buff)
'End If Next N 'Closes the test for XYPlot at beginning of routine
End If fillLineItems = buff End Function
'---------------------------------------------------------------
'  Procedure:   addAttribute(name, value)
'
'  Purpose:     Adds an attribute line to "buff"
'
'---------------------------------------------------------------
Public Sub addAttribute(buff, name, value, indent, last)
```

```
' Build the indentation
Dim strIndent As String
strIndent = ""
For J = 1 To indent
    strIndent = strIndent & " "
Next J ' Build the string
buff = buff & strIndent & name & " = " & Chr(34) & value & Chr(34)

'Add an ending '>' tag if "last" is 1; else simple add a carriage return
If last = 1 Then
    buff = buff & " >" & Chr(10)
Else
    buff = buff & Chr(10)
End If End Sub Private Sub replaceAttribute(f As String, el As String, att As String, val As String)

f = Replace(f, att & " = " & Chr(34) & Chr(34), att & " = " & Chr(34) & val & Chr(34))

End Sub

Private Sub fillXData(f As String)

'build the string of X values
    'Dim data As Range
    Dim v As String
    t = RefEdit_data.value
    v = Chr(10) & Range(t).Cells(1, 19)
    For J = 20 To Range(t).Columns.Count
        v = v & ", " & Range(t).Cells(1, J)
    Next J
    v = v & Chr(10)

'replace the current x data element text
    f = Replace(f, "></data_x>", ">" & v & " </data_x>")

End Sub
```

The invention claimed is:

1. A computer program product embodied on a non-transitory computer-readable medium comprising:
   code for identifying a first markup document including first numerical values and first tags reflecting first characteristics of the first numerical values associated with a first unit of measure, and a second markup document including second numerical values and second tags reflecting second characteristics of the second numerical values associated with a second unit of measure, wherein the first tags and the second tags each include computer-readable semantic tags that describe a semantic meaning of a corresponding one of at least one of the first numerical values or the second numerical values, via a computer-readable tagging association therebetween, where the first characteristics of the first numerical values associated with the first unit of measure are different from the second characteristics of the second numerical values associated with the second unit of measure;
   code for causing automatic transformation of at least a portion of the first or second numerical values of at least one of the first markup document or the second markup document, so that at least some of the first numerical values of the first markup document and at least some of the second numerical values of the second markup document have a common unit of measure;
   code for processing at least a part of the first markup document and at least a part of the second markup document, resulting in a single markup document; and
   code for causing a display of at least a portion of the single markup document.

2. The computer program product of claim 1, wherein the computer program product is configured for allowing a user to edit a mapping of one or more of the computer-readable semantic tags to a corresponding one of the at least one of the first numerical values or the second numerical values.

3. The computer program product of claim 1, wherein the computer program product is operable such that the first unit of measure includes a first currency and the second unit of measure includes a second currency.

4. The computer program product of claim 1, and further comprising code for manipulating the display of the single markup document using at least one of the first tags reflecting the first characteristics of the first numerical values associated with the first unit of measure, or the second tags reflecting the second characteristics of the second numerical values associated with the second unit of measure.

5. The computer program product of claim 1, wherein the computer program product is configured such that the first markup document and the second markup document each include a XML-compliant data document that includes multiple hierarchical relationships between two line items of corresponding numerical values, and is further capable of including computer-readable semantic tags that each describe a semantic meaning of one or more of corresponding numerical values.

6. The computer program product of claim 5, wherein the computer program product is configured such that the computer-readable semantic tags are each computer-readably coupled to the one or more of the corresponding numerical values.

7. The computer program product of claim 1, wherein the computer program product is configured such that the single markup document includes a XML-compliant data document that includes multiple hierarchical relationships between two line items of corresponding numerical values, and is further capable of including computer-readable semantic tags that each describe a semantic meaning of one or more of corresponding numerical values.

8. The computer program product of claim 1, wherein the computer program product is operable such that the single markup document includes a XML-compliant data document that is capable of including at least one of: multiple hierarchical relationships between two line items of corresponding numerical values, or computer-readable semantic tags that each describe a semantic meaning of one or more of corresponding numerical values.

9. The computer program product of claim 8, wherein the computer program product is configured for utilizing a plurality of computer-readable rules for processing the XML-compliant data document, the computer-readable rules including:
   a computer-readable datatype rule for validation of a value type,
   a computer-readable calculation rule for validation of a value calculation, and
   a computer-readable unit rule for validation of a value unit.

10. The computer program product of claim 8, wherein the computer program product is configured for validating the XML-compliant data document by:
    identifying at least a subset of a plurality of computer-readable rules including at least one of:
       a computer-readable datatype rule for validation of a value type,
       a computer-readable calculation rule for validation of a value calculation, or
       a computer-readable unit rule for validation of a value unit; and
    processing at least a portion of the XML-compliant data document, utilizing the at least subset of the computer-readable rules.

11. The computer program product of claim 8, wherein the computer program product is configured such that the XML-compliant data document includes an extensible semantic tag-equipped markup language component and a hypertext markup language (HTML) component.

12. The computer program product of claim 11, wherein the computer program product is configured such that at least one XML-compliant data document is capable of being displayed utilizing a network browser for allowing review of the HTML component in addition to access the extensible semantic tag-equipped markup language component.

13. The computer program product of claim 1, wherein the computer program product is configured for storing at least one object including at least one reference to an original value of at least one of the first numerical values or the second numerical values.

14. The computer program product of claim 13, wherein the computer program product is configured for outputting a presentation or report that is based on at least a portion of the at least one object, the presentation or report capable of including at least one of the first numerical values or the second numerical values, including the original value, such that, based on the at least one reference of the at least one object, a change to the original value results in a corresponding change in an instance of the presentation or report.

15. The computer program product of claim 13, wherein the computer program product is configured such that the single markup document includes a XML-compliant data document that includes multiple hierarchical relationships between two line items of corresponding numerical values, and is further capable of including computer-readable semantic tags that each describe a semantic meaning of one or more of the corresponding numerical values, wherein the computer program product is further configured for outputting the XML-compliant data document based on at least a portion of the at least one object, the XML-compliant data document capable of including at least a portion of at least one of the first numerical values or the second numerical values, including the original value, such that, based on the at least one reference of the at least one object, a change to the original value results in a corresponding change in an instance of the XML-compliant data document.

16. The computer program product of claim 1, wherein the computer program product is configured such that at least one of:

said code for causing the automatic transformation is capable of automatically transforming the at least portion of the numerical values of the first markup document the second markup document;
said identifying includes receiving;
said first tags or second tags result from tagging;
said characteristics include at least one of a magnitude, scale, modifier, unit, and measurement;
said tags reflect structure;
said processing includes merging or combining;
said processing results in a single data set, and said code for causing the display causes display of the single data set;
said single markup document is caused to be displayed on a single graphical display;
said single markup document includes an RDML document;
said single markup document is caused to be displayed without requiring a user to make manual adjustments; or
said at least portion of the single markup document includes the numerical values thereof.

17. A method comprising:
identifying a first markup document including first numerical values and first tags reflecting first characteristics of the first numerical values associated with a first unit of measure, and a second markup document including second numerical values and second tags reflecting second characteristics of the second numerical values associated with a second unit of measure, wherein the first tags and the second tags each include computer-readable semantic tags that describe a semantic meaning of a corresponding one of at least one of the first numerical values or the second numerical values, via a computer-readable tagging association therebetween, where the first characteristics of the first numerical values associated with the first unit of measure are different from the second characteristics of the second numerical values associated with the second unit of measure;
automatically transforming at least a portion of the first or second numerical values of at least one of the first markup document or the second markup document, so that at least some of the first numerical values of the first markup document and at least some of the second numerical values of the second markup document have a common unit of measure;
processing at least a part of the first markup document and at least a part of the second markup document, resulting in a single markup document; and
causing a display of at least a portion of the single markup document.

18. An apparatus, comprising:
means for identifying a first markup document including first numerical values and first tags reflecting first characteristics of the first numerical values associated with a first unit of measure, and a second markup document including second numerical values and second tags reflecting second characteristics of the second numerical values associated with a second unit of measure, wherein the first tags and the second tags each include computer-readable semantic tags that describe a semantic meaning of a corresponding one of at least one of the first numerical values or the second numerical values, via a computer-readable tagging association therebetween, where the first characteristics of the first numerical values associated with the first unit of measure are different from the second characteristics of the second numerical values associated with the second unit of measure;
means for automatically transforming at least a portion of the first or second numerical values of at least one of the first markup document or the second markup document, so that at least some of the first numerical values of the first markup document and at least some of the second numerical values of the second markup document have a common unit of measure;
means for processing at least a part of the first markup document and at least a part of the second markup document, resulting in a single markup document;
means for causing a display of at least a portion of the single markup document.

* * * * *